US012561138B2

(12) United States Patent
Cséfalvay

(10) Patent No.: US 12,561,138 B2
(45) Date of Patent: Feb. 24, 2026

(54) PERFORMING AN OPERATION ON AN ARRAY OF VALUES AT A PROCESSING UNIT

(71) Applicant: Imagination Technologies Limited, Kings Langley (GB)

(72) Inventor: Szabolcs Cséfalvay, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 145 days.

(21) Appl. No.: 18/392,053

(22) Filed: Dec. 21, 2023

(65) Prior Publication Data

US 2024/0231826 A1      Jul. 11, 2024

(30) Foreign Application Priority Data

Dec. 21, 2022   (GB) ...................................... 2219374
Dec. 21, 2022   (GB) ...................................... 2219375

(51) Int. Cl.
  *G06F 9/30*          (2018.01)
  *G06F 9/50*          (2006.01)
(52) U.S. Cl.
  CPC ........ *G06F 9/3009* (2013.01); *G06F 9/30043* (2013.01); *G06F 9/5016* (2013.01)
(58) Field of Classification Search
  None
  See application file for complete search history.

(56) References Cited

U.S. PATENT DOCUMENTS 7,584,342 B1 *    9/2009   Nordquist ........... G06F 9/38885
                                                    712/22
7,836,116 B1    11/2010   Goodnight et al.
                        (Continued)

FOREIGN PATENT DOCUMENTS

EP              1717753 A2    11/2006

OTHER PUBLICATIONS

Anonymous, "Memory Statistics—Shared," NVIDIA® Nsight™ Development Platform, Visual Studio Edition 4.7 User Guide, 2015.
(Continued)

*Primary Examiner* — Michael Sun
(74) *Attorney, Agent, or Firm* — Potomac Law Group, PLLC; Vincent M DeLuca

(57)          ABSTRACT

A computer-implemented method of performing an operation on an array of values at a processing unit so as to perform a phase of the operation. For each of one or more one-dimensional sequences of values of the array of values a respective section of values of the one-dimensional sequence of values is assigned to each of a plurality of threads, and a first thread of the plurality of threads determines at least one contribution, from the section of values assigned to the first thread, to the phase of the operation that is to be completed by a second thread of the plurality of threads for a neighbouring section of values of the one-dimensional sequence of values. The at least one contribution is written to a memory, and a second thread of the plurality of threads reads the at least one contribution from the memory. and completes the phase of the operation for the neighbouring section of values assigned to the second thread in dependence on the at least one contribution read from the memory in order to generate a section of processed values.

20 Claims, 15 Drawing Sheets

(56)     References Cited

U.S. PATENT DOCUMENTS

| | | | | |
|---|---|---|---|---|
| 9,436,760 | B1 * | 9/2016 | Tacchi | G06F 16/9024 |
| 9,558,265 | B1 * | 1/2017 | Tacchi | G06F 16/338 |
| 9,710,544 | B1 * | 7/2017 | Smith | G06F 16/36 |
| 2008/0120298 | A1 * | 5/2008 | Duffy | G06F 8/456 |
| 2008/0120299 | A1 * | 5/2008 | Duffy | G06F 8/452 |
| 2010/0325187 | A1 | 12/2010 | Juffa et al. | |
| 2011/0238955 | A1 | 9/2011 | Nickolls et al. | |
| 2019/0278593 | A1 | 9/2019 | Elango et al. | |
| 2020/0241844 | A1 | 7/2020 | Koeplinger et al. | |

OTHER PUBLICATIONS

Jonas Larsson, "A case study of parallel bilateral filtering on the GPU." (2015), pp. 1-52.
Van Werkhoven et al. "Optimizing convolution operations on GPUs using adaptive tiling." Future Generation Computer Systems 30 (2014): 14-26.

* cited by examiner

| T1 | T9 | T17 | T25 |
|----|----|-----|-----|
| T2 | T10 | T18 | T26 |
| T3 | T11 | T19 | T27 |
| T4 | T12 | T20 | T28 |
| T5 | T13 | T21 | T29 |
| T6 | T14 | T22 | T30 |
| T7 | T15 | T23 | T31 |
| T8 | T16 | T24 | T32 |
| T33 | T41 | T49 | T57 |
| T34 | T42 | T50 | T58 |
| T35 | T43 | T51 | T59 |
| T36 | T44 | T52 | T60 |
| T37 | T45 | T53 | T61 |
| T38 | T46 | T54 | T62 |
| T39 | T47 | T55 | T63 |
| T40 | T48 | T56 | T64 |
| T65 | T73 | T81 | T89 |
| T66 | T74 | T82 | T90 |
| T67 | T75 | T83 | T91 |
| T68 | T76 | T84 | T92 |
| T69 | T77 | T85 | T93 |
| T70 | T78 | T86 | T94 |
| T71 | T79 | T87 | T95 |
| T72 | T80 | T88 | T96 |
| T97 | T105 | T113 | T121 |
| T98 | T106 | T114 | T122 |
| T99 | T107 | T115 | T123 |
| T100 | T108 | T116 | T124 |
| T101 | T109 | T117 | T125 |
| T102 | T110 | T118 | T126 |
| T103 | T111 | T119 | T127 |
| T104 | T112 | T120 | T128 |

400

500

| T1 | T9 | T17 | T25 |

| | | | |
|---|---|---|---|
| T25 | T17 | T9 | T1 |
| T26 | T18 | T10 | T2 |
| T27 | T19 | T11 | T3 |
| T28 | T20 | T12 | T4 |
| T29 | T21 | T13 | T5 |
| T30 | T22 | T14 | T6 |
| T31 | T23 | T15 | T7 |
| T32 | T24 | T16 | T8 |
| T57 | T49 | T41 | T33 |
| T58 | T50 | T42 | T34 |
| T59 | T51 | T43 | T35 |
| T60 | T52 | T44 | T36 |
| T61 | T53 | T45 | T37 |
| T62 | T54 | T46 | T38 |
| T63 | T55 | T47 | T39 |
| T64 | T56 | T48 | T40 |
| T89 | T81 | T73 | T65 |
| T90 | T82 | T74 | T66 |
| T91 | T83 | T75 | T67 |
| T92 | T84 | T76 | T68 |
| T93 | T85 | T77 | T69 |
| T94 | T86 | T78 | T70 |
| T95 | T87 | T79 | T71 |
| T96 | T88 | T80 | T72 |
| T121 | T113 | T105 | T97 |
| T122 | T114 | T106 | T98 |
| T123 | T115 | T107 | T99 |
| T124 | T116 | T108 | T100 |
| T125 | T117 | T109 | T101 |
| T126 | T118 | T110 | T102 |
| T127 | T119 | T111 | T103 |
| T128 | T120 | T112 | T104 |

800

900

FIG. 12A (106)

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| T1/P1 | T1/P2 | T1/P3 | T1/P4 | T1/P5 | T1/P6 | T1/P7 | T1/P8 | T2/P1 | T2/P2 | T2/P3 | T2/P4 | T2/P5 | T2/P6 | T2/P7 | T2/P8 |
| T3/P1 | T3/P2 | T3/P3 | T3/P4 | T3/P5 | T3/P6 | T3/P7 | T3/P8 | T4/P1 | T4/P2 | T4/P3 | T4/P4 | T4/P5 | T4/P6 | T4/P7 | T4/P8 |
| T5/P1 | T5/P2 | T5/P3 | T5/P4 | T5/P5 | T5/P6 | T5/P7 | T5/P8 | T6/P1 | T6/P2 | T6/P3 | T6/P4 | T6/P5 | T6/P6 | T6/P7 | T6/P8 |
| T7/P1 | T7/P2 | T7/P3 | T7/P4 | T7/P5 | T7/P6 | T7/P7 | T7/P8 | T8/P1 | T8/P2 | T8/P3 | T8/P4 | T8/P5 | T8/P6 | T8/P7 | T8/P8 |
| ⋮ | | | | | | | | | | | | | | | |
| T127/P1 | T127/P2 | T127/P3 | T127/P4 | T127/P5 | T127/P6 | T127/P7 | T127/P8 | T128/P1 | T128/P2 | T128/P3 | T128/P4 | T128/P5 | T128/P6 | T128/P7 | T128/P8 |

FIG. 12B (106)

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| T1/P1 | T2/P1 | T3/P1 | T4/P1 | T5/P1 | T6/P1 | T7/P1 | T8/P1 | T1/P2 | T2/P2 | T3/P2 | T4/P2 | T5/P2 | T6/P2 | T7/P2 | T8/P2 |
| T1/P3 | T2/P3 | T3/P3 | T4/P3 | T5/P3 | T6/P3 | T7/P3 | T8/P3 | T1/P4 | T2/P4 | T3/P4 | T4/P4 | T5/P4 | T6/P4 | T7/P4 | T8/P4 |
| T1/P5 | T2/P5 | T3/P5 | T4/P5 | T5/P5 | T6/P5 | T7/P5 | T8/P5 | T1/P6 | T2/P6 | T3/P6 | T4/P6 | T5/P6 | T6/P6 | T7/P6 | T8/P6 |
| T1/P7 | T2/P7 | T3/P7 | T4/P7 | T5/P7 | T6/P7 | T7/P7 | T8/P7 | T1/P8 | T2/P8 | T3/P8 | T4/P8 | T5/P8 | T6/P8 | T7/P8 | T8/P8 |
| T9/P1 | T10/P1 | T11/P1 | T12/P1 | T13/P1 | T14/P1 | T15/P1 | T16/P1 | T9/P2 | T10/P2 | T11/P2 | T12/P2 | T13/P2 | T14/P2 | T15/P2 | T16/P2 |
| ⋮ | | | | | | | | | | | | | | | |
| T121/P7 | T122/P7 | T123/P7 | T124/P7 | T125/P7 | T126/P7 | T127/P7 | T128/P8 | T121/P8 | T122/P8 | T123/P8 | T124/P8 | T125/P8 | T126/P8 | T127/P8 | T128/P8 |

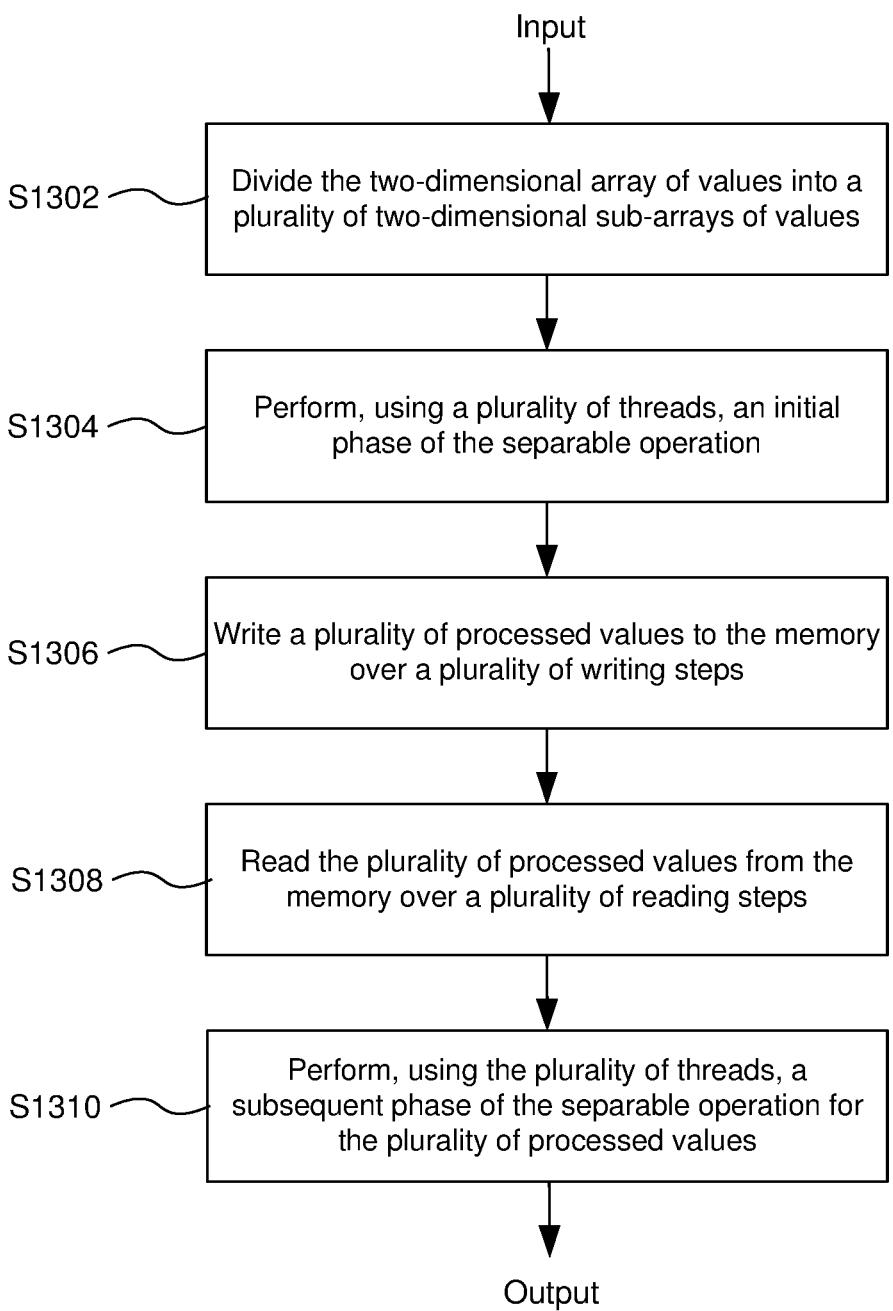

Input

S1302 — Divide the two-dimensional array of values into a plurality of two-dimensional sub-arrays of values S1304 — Perform, using a plurality of threads, an initial phase of the separable operation S1306 — Write a plurality of processed values to the memory over a plurality of writing steps S1308 — Read the plurality of processed values from the memory over a plurality of reading steps S1310 — Perform, using the plurality of threads, a subsequent phase of the separable operation for the plurality of processed values Output

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| T1/P1 | T1/P2 | T1/P3 | T1/P4 | T1/P5 | T1/P6 | T1/P7 | T1/P8 | X | T2/P1 | T2/P2 | T2/P3 | T2/P4 | T2/P5 | T2/P6 | T2/P7 |
| T2/P8 | X | T3/P1 | T3/P2 | T3/P3 | T3/P4 | T3/P5 | T3/P6 | T3/P7 | T3/P8 | X | T4/P1 | T4/P2 | T4/P3 | T4/P4 | T4/P5 |
| T4/P6 | T4/P7 | T4/P8 | X | T5/P1 | T5/P2 | T5/P3 | T5/P4 | T5/P5 | T5/P6 | T5/P7 | T5/P8 | X | T6/P1 | T6/P2 | T6/P3 |
| T6/P4 | T6/P5 | T6/P6 | T6/P7 | T6/P8 | X | T7/P1 | T7/P2 | T7/P3 | T7/P4 | T7/P5 | T7/P6 | T7/P7 | T7/P8 | X | T8/P1 |
| T8/P2 | T8/P3 | T8/P4 | T8/P5 | T8/P6 | T8/P7 | T8/P8 | X | T9/P1 | T9/P2 | T9/P3 | T9/P4 | T9/P5 | T9/P6 | T9/P7 | T9/P8 |
| X | T10/P1 | T10/P2 | T10/P3 | T10/P4 | T10/P5 | T10/P6 | T10/P7 | T10/P8 | X | T11/P1 | T11/P2 | T11/P3 | T11/P4 | T11/P5 | T11/P6 |
| T11/P7 | T11/P8 | X | T12/P1 | T12/P2 | T12/P3 | T12/P4 | T12/P5 | T12/P6 | T12/P7 | T12/P8 | X | T13/P1 | T13/P2 | T13/P3 | T13/P4 |
| T13/P5 | T13/P6 | T13/P7 | T13/P8 | X | T14/P1 | T14/P2 | T14/P3 | T14/P4 | T14/P5 | T14/P6 | T14/P7 | T14/P8 | X | T15/P1 | T15/P2 |
| T15/P3 | T15/P4 | T15/P5 | T15/P6 | T15/P7 | T15/P8 | X | T16/P1 | T16/P2 | T16/P3 | T16/P4 | T16/P5 | T16/P6 | T16/P7 | T16/P8 | X |
| T17/P1 | T17/P2 | T17/P3 | T17/P4 | T17/P5 | T17/P6 | T17/P7 | T17/P8 | X | T18/P1 | T18/P2 | T18/P3 | T18/P4 | T18/P5 | T18/P6 | T18/P7 |
| | | | | | | | | ⋮ | | | | | | | |
| T127/P3 | T127/P4 | T127/P5 | T127/P6 | T127/P7 | T127/P8 | X | T128/P1 | T128/P2 | T128/P3 | T128/P4 | T128/P5 | T128/P6 | T128/P7 | T128/P8 | X |

FIG. 15A

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| T1 P1 | T1 P2 | T1 P3 | T1 P4 | T1 P5 | T1 P6 | T1 P7 | T1 P8 | T2 P1 | T2 P2 | T2 P3 | T2 P4 | T2 P5 | T2 P6 | T2 P7 | T2 P8 |
| X | T3 P1 | T3 P2 | T3 P3 | T3 P4 | T3 P5 | T3 P6 | T3 P7 | T3 P8 | T4 P1 | T4 P2 | T4 P3 | T4 P4 | T4 P5 | T4 P6 | T4 P7 |
| T4 P8 | X | T5 P1 | T5 P2 | T5 P3 | T5 P4 | T5 P5 | T5 P6 | T5 P7 | T5 P8 | T6 P1 | T6 P2 | T6 P3 | T6 P4 | T6 P5 | T6 P6 |
| T6 P7 | T6 P8 | X | T7 P1 | T7 P2 | T7 P3 | T7 P4 | T7 P5 | T7 P6 | T7 P7 | T7 P8 | T8 P1 | T8 P2 | T8 P3 | T8 P4 | T8 P5 |
| T8 P6 | T8 P7 | T8 P8 | X | T9 P1 | T9 P2 | T9 P3 | T9 P4 | T9 P5 | T9 P6 | T9 P7 | T9 P8 | T10 P1 | T10 P2 | T10 P3 | T10 P4 |
| T10 P5 | T10 P6 | T10 P7 | T10 P8 | X | T11 P1 | T11 P2 | T11 P3 | T11 P4 | T11 P5 | T11 P6 | T11 P7 | T11 P8 | T12 P1 | T12 P2 | T12 P3 |
| T12 P4 | T12 P5 | T12 P6 | T12 P7 | T12 P8 | X | T13 P1 | T13 P2 | T13 P3 | T13 P4 | T13 P5 | T13 P6 | T13 P7 | T13 P8 | T14 P1 | T14 P2 |
| T14 P3 | T14 P4 | T14 P5 | T14 P6 | T14 P7 | T14 P8 | X | T15 P1 | T15 P2 | T15 P3 | T15 P4 | T15 P5 | T15 P6 | T15 P7 | T15 P8 | T16 P1 |
| T16 P2 | T16 P3 | T16 P4 | T16 P5 | T16 P6 | T16 P7 | T16 P8 | X | T17 P1 | T17 P2 | T17 P3 | T17 P4 | T17 P5 | T17 P6 | T17 P7 | T17 P8 |
| ⋮ | | | | | | | | | | | | | | | |
| T127 P2 | T127 P3 | T127 P4 | T127 P5 | T127 P6 | T127 P7 | T127 P8 | T128 P1 | T128 P2 | T128 P3 | T128 P4 | T128 P5 | T128 P6 | T128 P7 | T128 P8 | X |

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| T1/P1 | T1/P2 | T1/P3 | T1/P4 | T1/P5 | T1/P6 | T1/P7 | T1/P8 | T2/P1 | T2/P2 | T2/P3 | T2/P4 | T2/P5 | T2/P6 | T2/P7 | T2/P8 |
| T3/P1 | T3/P2 | T3/P3 | T3/P4 | T3/P5 | T3/P6 | T3/P7 | T3/P8 | T4/P1 | T4/P2 | T4/P3 | T4/P4 | T4/P5 | T4/P6 | T4/P7 | T4/P8 |
| X | T5/P1 | T5/P2 | T5/P3 | T5/P4 | T5/P5 | T5/P6 | T5/P7 | T5/P8 | T6/P1 | T6/P2 | T6/P3 | T6/P4 | T6/P5 | T6/P6 | T6/P7 |
| T6/P8 | T7/P1 | T7/P2 | T7/P3 | T7/P4 | T7/P5 | T7/P6 | T7/P7 | T7/P8 | T8/P1 | T8/P2 | T8/P3 | T8/P4 | T8/P5 | T8/P6 | T8/P7 |
| T8/P8 | X | T9/P1 | T9/P2 | T9/P3 | T9/P4 | T9/P5 | T9/P6 | T9/P7 | T9/P8 | T10/P1 | T10/P2 | T10/P3 | T10/P4 | T10/P5 | T10/P6 |
| T10/P7 | T10/P8 | T11/P1 | T11/P2 | T11/P3 | T11/P4 | T11/P5 | T11/P6 | T11/P7 | T11/P8 | T12/P1 | T12/P2 | T12/P3 | T12/P4 | T12/P5 | T12/P6 |
| T12/P7 | T12/P8 | X | T13/P1 | T13/P2 | T13/P3 | T13/P4 | T13/P5 | T13/P6 | T13/P7 | T13/P8 | T14/P1 | T14/P2 | T14/P3 | T14/P4 | T14/P5 |
| T14/P6 | T14/P7 | T14/P8 | T15/P1 | T15/P2 | T15/P3 | T15/P4 | T15/P5 | T15/P6 | T15/P7 | T15/P8 | T16/P1 | T16/P2 | T16/P3 | T16/P4 | T16/P5 |
| T16/P6 | T16/P7 | T16/P8 | X | T17/P1 | T17/P2 | T17/P3 | T17/P4 | T17/P5 | T17/P6 | T17/P7 | T17/P8 | T18/P1 | T18/P2 | T18/P3 | T18/P4 |
| T18/P5 | T18/P6 | T18/P7 | T18/P8 | T19/P1 | T19/P2 | T19/P3 | T19/P4 | T19/P5 | T19/P6 | T19/P7 | T19/P8 | T20/P1 | T20/P2 | T20/P3 | T20/P4 |
| T20/P5 | T20/P6 | T20/P7 | T20/P8 | X | T21/P1 | T21/P2 | T21/P3 | T21/P4 | T21/P5 | T21/P6 | T21/P7 | T21/P8 | T22/P1 | T22/P2 | T22/P3 |
| T22/P4 | T22/P5 | T22/P6 | T22/P7 | T22/P8 | T23/P1 | T23/P2 | T23/P3 | T23/P4 | T23/P5 | T23/P6 | T23/P7 | T23/P8 | T24/P1 | T24/P2 | T24/P3 |
| T24/P4 | T24/P5 | T24/P6 | T24/P7 | T24/P8 | X | T25/P1 | T25/P2 | T25/P3 | T25/P4 | T25/P5 | T25/P6 | T25/P7 | T25/P8 | T26/P1 | T26/P2 |
| T26/P3 | T26/P4 | T26/P5 | T26/P6 | T26/P7 | T26/P8 | T27/P1 | T27/P2 | T27/P3 | T27/P4 | T27/P5 | T27/P6 | T27/P7 | T27/P8 | T28/P1 | T28/P2 |
| T28/P3 | T28/P4 | T28/P5 | T28/P6 | T28/P7 | T28/P8 | X | T29/P1 | T29/P2 | T29/P3 | T29/P4 | T29/P5 | T29/P6 | T29/P7 | T29/P8 | T30/P1 |
| T30/P2 | T30/P3 | T30/P4 | T30/P5 | T30/P6 | T30/P7 | T30/P8 | T31/P1 | T31/P2 | T31/P3 | T31/P4 | T31/P5 | T31/P6 | T31/P7 | T31/P8 | T32/P1 |
| T32/P2 | T32/P3 | T32/P4 | T32/P5 | T32/P6 | T32/P7 | T32/P8 | X | T33/P1 | T33/P2 | T33/P3 | T33/P4 | T33/P5 | T33/P6 | T33/P7 | T33/P8 |
| T127/P2 | T127/P3 | T127/P4 | T127/P5 | T127/P6 | T127/P7 | T127/P8 | T128/P1 | T128/P2 | T128/P3 | T128/P4 | T128/P5 | T128/P6 | T128/P7 | T128/P8 | X |

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| T1/P1 | T2/P1 | T3/P1 | T4/P1 | T5/P1 | T6/P1 | T7/P1 | T8/P1 | T1/P2 | T2/P2 | T3/P2 | T4/P2 | T5/P2 | T6/P2 | T7/P2 | T8/P2 |
| X | T1/P3 | T2/P3 | T3/P3 | T4/P3 | T5/P3 | T6/P3 | T7/P3 | T8/P3 | T1/P4 | T2/P4 | T3/P4 | T4/P4 | T5/P4 | T6/P4 | T7/P4 |
| T8/P4 | X | T1/P5 | T2/P5 | T3/P5 | T4/P5 | T5/P5 | T6/P5 | T7/P5 | T8/P5 | T1/P6 | T2/P6 | T3/P6 | T4/P6 | T5/P6 | T6/P6 |
| T7/P6 | T8/P6 | X | T1/P7 | T2/P7 | T3/P7 | T4/P7 | T5/P7 | T6/P7 | T7/P7 | T8/P7 | T1/P8 | T2/P8 | T3/P8 | T4/P8 | T5/P8 |
| T6/P8 | T7/P8 | T8/P8 | X | T9/P1 | T10/P1 | T11/P1 | T12/P1 | T13/P1 | T14/P1 | T15/P1 | T16/P1 | T9/P2 | T10/P2 | T11/P2 | T12/P2 |
| T13/P2 | T14/P2 | T15/P2 | T16/P2 | X | T9/P3 | T10/P3 | T11/P3 | T12/P3 | T13/P3 | T14/P3 | T15/P3 | T16/P3 | T9/P4 | T10/P4 | T11/P4 |
| T12/P4 | T13/P4 | T14/P4 | T15/P4 | T16/P4 | X | T9/P5 | T10/P5 | T11/P5 | T12/P5 | T13/P5 | T14/P5 | T15/P5 | T16/P5 | T9/P6 | T10/P6 |
| T11/P6 | T12/P6 | T13/P6 | T14/P6 | T15/P6 | T16/P6 | X | T9/P7 | T10/P7 | T11/P7 | T12/P7 | T13/P7 | T14/P7 | T15/P7 | T16/P7 | T9/P8 |
| T10/P8 | T11/P8 | T12/P8 | T13/P8 | T14/P8 | T15/P8 | T16/P8 | X | T17/P1 | T18/P1 | T19/P1 | T20/P1 | T21/P1 | T22/P1 | T23/P1 | T24/P1 |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| T122/P7 | T123/P7 | T124/P7 | T125/P7 | T126/P7 | T127/P7 | T128/P7 | T121/P8 | T122/P8 | T123/P8 | T124/P8 | T125/P8 | T126/P8 | T127/P8 | T128/P8 | X |

FIG. 15D

PERFORMING AN OPERATION ON AN ARRAY OF VALUES AT A PROCESSING UNIT

CROSS-REFERENCE TO RELATED APPLICATIONS AND CLAIM OF PRIORITY

This application claims foreign priority under 35 U.S.C. 119 from United Kingdom patent application Nos. 2219374.2 and 2219375.9, both filed on 21 Dec. 2022, which are incorporated by reference herein in their entirety.

FIELD

The present disclosure is directed to performing an operation on an array of values at a processing unit.

BACKGROUND

FIG. 1A shows an example graphics processing unit (GPU) 100 and global memory 108. Work to be performed by a GPU can be arranged into "workgroups", "warps" and "threads". A workgroup may comprise one or more warps. A warp may comprise a plurality of threads, where that plurality of threads can be processed in parallel at a single core 102 of the GPU 100.

GPU 100 can perform operations on arrays of values. FIG. 2 shows an example operation. In FIG. 2, the operation is a one-dimensional Gaussian filter operation, in which a value 204 is filtered in dependence on a one-dimensional kernel 202 of values including the value 204 to be filtered and three values on either side of that value 204. A filtered output for the value 204 is determined by performing a weighted sum of the values in the kernel 202. The respective weight for each value in the kernel 202 is determined in dependence on a Gaussian function 200 centred on the value 204 to be filtered.

A separable two-dimensional Gaussian filter operation can be implemented by performing an initial phase in which a one-dimensional Gaussian filter operation is performed horizontally across each row of a two-dimensional array of values, followed by performing a subsequent phase in which the same one-dimensional Gaussian filter operation is performed vertically along each column of the horizontally filtered two-dimensional array of values—or vice versa (i.e. vertically, followed by horizontally).

In a simple approach, a phase of a separable two-dimensional Gaussian filter operation can be performed on an array of values by assigning each value of the array of values to be filtered to a thread for processing. As an illustrative example, consider a separable two-dimensional Gaussian filter operation to be performed on a two-dimensional array of values comprising 1024 values (e.g. arranged as a 32×32 array of values). In this example, in order to perform the initial (e.g. horizontal) phase of said operation, each of said 1024 values could be assigned to a respective one of 1024 threads. In order to filter each value, each thread can read all of the values included in the one-dimensional filter kernel used to filter that value (e.g. the value to be filtered and the three values on either side of that value) from global memory 108. Each thread can then generate a filtered value for its value by performing a weighted sum of the values in the kernel, and write that filtered value back to global memory 108, such that the global memory 108 stores a once-filtered (e.g. horizontally filtered) value for each value of the two-dimensional array of values. In order to perform the subsequent (e.g. vertical) phase of said operation, each of said 1024 once-filtered values could be assigned to a respective one of 1024 threads. In order to further filter each once-filtered value, each thread can read all of the once-filtered values included in the one-dimensional filter kernel used to further filter that once-filtered value (e.g. the once-filtered value to be further filtered and the three once-filtered values on either side of that value) from global memory 108. The one-dimensional filter kernels used in the subsequent (e.g. vertical) phase are perpendicular to the one-dimensional filter kernels used in the initial (e.g. horizontal) phase. Each thread can then generate a further filtered value for its once-filtered value by performing a weighted sum of the once-filtered values in the kernel, and write that further filtered value back to global memory 108, such that the global memory 108 stores a further filtered (e.g. horizontally and vertically filtered) value for each value of the two-dimensional array of values.

Performing a separable two-dimensional Gaussian filter operation on a graphics processing unit 100 in this way is relatively slow, as it involves performing two sets of reads and two sets of writes to global memory 108. Further, in each phase of the separable filter operation, each value is read from memory many times (e.g. seven times in the example given above). This is because, in each phase, each value is read from memory (e.g. global memory 108) by the thread that is assigned to filter that value, and also read from memory (e.g. a cache memory into which it is written after being read from global memory 108) by each of the threads that are assigned to filter other values using a filter kernel that includes that value.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to a first aspect of the present invention there is provided a computer-implemented method of performing an operation on an array of values at a processing unit, the method comprising: so as to perform a phase of the operation: for each of one or more one-dimensional sequences of values of the array of values: assigning a respective section of values of the one-dimensional sequence of values to each of a plurality of threads; and a first thread of the plurality of threads: determining at least one contribution, from the section of values assigned to the first thread, to the phase of the operation that is to be completed by a second thread of the plurality of threads for a neighbouring section of values of the one-dimensional sequence of values; and writing the at least one contribution to a memory; and the second thread of the plurality of threads: reading the at least one contribution from the memory; and completing the phase of the operation for the neighbouring section of values assigned to the second thread in dependence on the at least one contribution read from the memory in order to generate a section of processed values.

The first thread of the plurality of threads may perform at least one part of the phase of the operation on at least one set of one or more values of the section of values assigned to the first thread in order to determine the at least one contribution, from said at least one set of one or more values, to the phase of the operation that is to be completed by the second thread of the plurality of threads for the neighbouring section of values of the one-dimensional sequence of values.

The second thread of the plurality of threads may: perform at least one part of the phase of the operation on at least one set of one or more values of the neighbouring section of values assigned to the second thread in order to determine at least one contribution, from said at least one set of one or more values of the neighbouring section of values, to the phase of the operation that is to be completed by the first thread for the section of values assigned to the first thread; and write the at least one contribution determined by the second thread to the memory; and the first thread of the plurality of threads may: read the at least one contribution determined by the second thread from the memory; and complete the phase of the operation for the section of values assigned to the first thread in dependence on the at least one contribution determined by the second thread read from the memory in order to generate a section of processed values.

Completing the phase of the operation for the neighbouring section of values may comprise: the second thread performing at least one part of the phase of the operation on at least one set of one or more values of the neighbouring section of values assigned to the second thread in order to determine at least one contribution from each of said one or more values of the neighbouring section of values to the phase of the operation; and combining said at least one contribution determined by the second thread for the neighbouring section of values with the at least one contribution read from the memory by the second thread.

The first thread of the plurality of threads may determine one or more values of the section of values assigned to the first thread as the at least one contribution, from the section of values assigned to the first thread, to the phase of the operation that is to be completed by the second thread of the plurality of threads for the neighbouring section of values of the one-dimensional sequence of values.

The second thread of the plurality of threads may: determine one or more values of the neighbouring section of values assigned to the second thread as at least one contribution, from the neighbouring section of values assigned to the second thread, to the phase of the operation that is to be completed by the first thread for the section of values assigned to the first thread; and write the at least one contribution determined by the second thread to the memory; and the first thread of the plurality of threads may: read the at least one contribution determined by the second thread from the memory; and complete the phase of the operation for the section of values assigned to the first thread in dependence on the at least one contribution determined by the second thread read from the memory in order to generate a section of processed values.

Completing the phase of the operation for the neighbouring section of values may comprise: the second thread performing the phase of the operation on the values of the neighbouring section of values assigned to the second thread using the values of the neighbouring section of values assigned to the second thread and the at least one contribution read from the memory in order to generate a section of processed values.

The plurality of threads may be processed by processing logic comprised by a core of the processing unit, the processing logic may be implemented on a chip and the memory being physically located on the same chip as the processing logic.

Each of the plurality of threads may read the values of the section of values assigned to that thread from a further memory that is not physically located on the same chip as the core.

The array of values may be an array of pixel values, an array of audio samples of an audio signal, or an array of signal samples of a transmitted signal.

The array of values may be a two-dimensional array of pixel values, and the operation may be a separable filter operation.

During the phase of the separable filter operation, values of the one-dimensional sequence of values may be filtered in dependence on a one-dimensional filter kernel including the value to be filtered and one or more values of the sequence of values positioned on one or both sides of that value. The radius of the filter kernel may be less than or equal to half of the number of values in each section of values.

The separable filter operation may be a separable Gaussian filter operation or a separable box filter operation.

The one-dimensional sequence of values of the array of values may be a row of values of the array of values; or the one-dimensional sequence of values of the array of values may be a column of values of the array of values.

The sections of processed values generated by the plurality of threads may be written to the memory such that a processed value is written to memory corresponding to each value of the array of values.

Said phase of the operation may be an initial phase of the operation, the array of values may be a two-dimensional array of values, the operation may be a separable operation, and the method may further comprise: so as to perform a subsequent phase of the operation: for each of one or more perpendicular one-dimensional sequences of values of the two-dimensional array of values: assigning, to each of the plurality of threads, a respective plurality of processed values from the memory, said plurality of processed values corresponding to a one-dimensional section of values of the perpendicular one-dimensional sequence of values of the two-dimensional array of values; and a first thread of the plurality of threads: determining at least one contribution, from the plurality of processed values assigned to the first thread, to the subsequent phase of the operation that is to be completed by a second thread of the plurality of threads for a plurality of processed values that correspond with a one-dimensional section of values of the perpendicular one-dimensional sequence of values of the two-dimensional array of values that neighbour the one-dimensional section of values of the perpendicular one-dimensional sequence of values that correspond to the plurality of processed values assigned to the first thread; and writing the at least one contribution determined by the first thread to the memory; and the second thread of the plurality of threads: reading the at least one contribution determined by the first thread from the memory; and completing the subsequent phase of the separable operation for the plurality of processed values assigned to the second thread in dependence on the at least one contribution determined by the first thread in order to generate a section of output values.

The first thread of the plurality of threads may perform at least one part of the subsequent phase of the separable operation on at least one set of one or more values of the plurality of processed values assigned to the first thread in order to determine at least one contribution, from said at least one set of one or more values, to the subsequent phase of the operation that is to be completed by the second thread of the plurality of threads for the plurality of processed values that correspond with the one-dimensional section of values of the perpendicular one-dimensional sequence of values of the two-dimensional array of values that neighbour the one-dimensional section of values of the perpendicular one-dimensional sequence of values that correspond to the plurality of processed values assigned to the first thread.

The first thread of the plurality of threads may determine one or more values of the plurality of processed values assigned to the first thread as the at least one contribution, from the plurality of processed values assigned to the first thread, to the subsequent phase of the operation that is to be completed by the second thread of the plurality of threads for the plurality of processed values that correspond with the one-dimensional section of values of the perpendicular one-dimensional sequence of values of the two-dimensional array of values that neighbour the one-dimensional section of values of the perpendicular one-dimensional sequence of values that correspond to the plurality of processed values assigned to the first thread.

The one-dimensional sequence of values of the two-dimensional array of values is a row of values of the two-dimensional array of values and the perpendicular one-dimensional sequence of values of the two-dimensional array of values is a column of values of the two-dimensional array of values; or the one-dimensional sequence of values of the two-dimensional array of values is a column of values of the two-dimensional array of values and the perpendicular one-dimensional sequence of values of the two-dimensional array of values is a row of values of the two-dimensional array of values.

The method may further comprise: receiving a two-dimensional image; dividing the two-dimensional image into a plurality of overlapping tiles, each tile comprising a two-dimensional array of pixel values; and performing the method described herein on the two-dimensional array of pixel values of each tile.

The operation may be performed on the two-dimensional array of pixel values of each tile of the plurality of overlapping tiles by a different core of the processing unit.

According to a second aspect of the present invention there is provided a processing unit for performing an operation on an array of values, the processing unit comprising processing logic and a memory, the processing logic being configured to so as to perform a phase of the operation: for each of one or more one-dimensional sequences of values of the array of values: assign a respective section of values of the one-dimensional sequence of values to each of a plurality of threads; and by a first thread of the plurality of threads: determine at least one contribution, from the section of values assigned to the first thread, to the phase of the operation that is to be completed by a second thread of the plurality of threads for a neighbouring section of values of the one-dimensional sequence of values; and write the at least one contribution to the memory; and by the second thread of the plurality of threads: read the at least one contribution from the memory; and complete the phase of the operation for the neighbouring section of values assigned to the second thread in dependence on the at least one contribution read from the memory in order to generate a section of processed values.

The processing logic may be comprised by a core of the processing unit, the processing logic may be implemented on a chip and the memory being physically located on the same chip as the processing logic.

There may also be provided a computer-implemented method of performing a separable operation on a two-dimensional array of values at a processing unit comprising a memory, the memory comprising a plurality of memory banks, wherein in each writing or reading step each memory bank can be written into or read from by only one respective thread, the method comprising: dividing the two-dimensional array of values into a plurality of two-dimensional sub-arrays of values; for each of the plurality of sub-arrays: performing, using a plurality of threads, an initial phase of the separable operation for said sub-array of values in order to generate a respective processed value for each value of said sub-array of values; each of the plurality of threads writing a respective first plurality of processed values to the memory over a plurality of writing steps, said first plurality of processed values corresponding to a one-dimensional sequence of values of said sub-array of values; each of the plurality of threads reading a respective second plurality of processed values from the memory over a plurality of reading steps, said second plurality of processed values corresponding to a perpendicular one-dimensional sequence of values of a sub-array of values in a transposed position within the array of values relative to said sub-array of values; and performing, using the plurality of threads, a subsequent phase of the separable operation for the plurality of processed values read by the plurality of threads in order to generate a respective output value for each value of the sub-array of values in the transposed position; wherein a respective processed value is written into each of the memory banks of the memory in at least one of the plurality of writing steps, and a respective processed value is read from each of the memory banks of the memory in at least one of the plurality of reading steps.

There may also be provided a processing unit for performing a separable operation on a two-dimensional array of values, the processing unit comprising: a memory comprising a plurality of memory banks, wherein the memory is configured so that in each writing or reading step each memory bank can be written into or read from by only one respective thread; and processing logic configured to: divide the two-dimensional array of values into a plurality of two-dimensional sub-arrays of values; for each of the plurality of sub-arrays: perform, using a plurality of threads, an initial phase of the separable operation for said sub-array of values in order to generate a respective processed value for each value of said sub-array of values; using each of the plurality of threads, write a respective first plurality of processed values to the memory over a plurality of writing steps, said first plurality of processed values corresponding to a one-dimensional sequence of values of said sub-array of values; using each of the plurality of threads, read a respective second plurality of processed values from the memory over a plurality of reading steps, said second plurality of processed values corresponding to a perpendicular one-dimensional sequence of values of a sub-array of values in a transposed position within the array of values relative to said sub-array of values; and perform, using the plurality of threads, a subsequent phase of the separable operation for the plurality of processed values read by the plurality of threads in order to generate a respective output value for each value of the sub-array of values in the transposed position; wherein a respective processed value is written into each of the memory banks of the memory in at least one of the plurality of writing steps, and a respective processed value is read from each of the memory banks of the memory in at least one of the plurality of reading steps.

A processing unit as described in any of the examples herein may be embodied in hardware on an integrated circuit. There may be provided a method of manufacturing, at an integrated circuit manufacturing system, a processing unit as described in any of the examples herein. There may be provided an integrated circuit definition dataset that, when processed in an integrated circuit manufacturing system, configures the system to manufacture a processing unit as described in any of the examples herein. There may be provided a non-transitory computer readable storage medium having stored thereon a computer readable description of a processing unit as described in any of the examples herein that, when processed in an integrated circuit manufacturing system, causes the integrated circuit manufacturing system to manufacture an integrated circuit embodying the processing unit.

There may be provided an integrated circuit manufacturing system comprising: a non-transitory computer readable storage medium having stored thereon a computer readable description of a processing unit as described in any of the examples herein; a layout processing system configured to process the computer readable description so as to generate a circuit layout description of an integrated circuit embodying the processing unit; and an integrated circuit generation system configured to manufacture the processing unit according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIGS. 12A and 12B illustrate processed values in memory.

FIG. 13 shows a method of performing a separable operation on a two-dimensional array of values at a processing unit comprising a memory according to the principles described herein.

FIGS. 15A to 15D illustrate processed values and padding in memory.

Figure 1A:
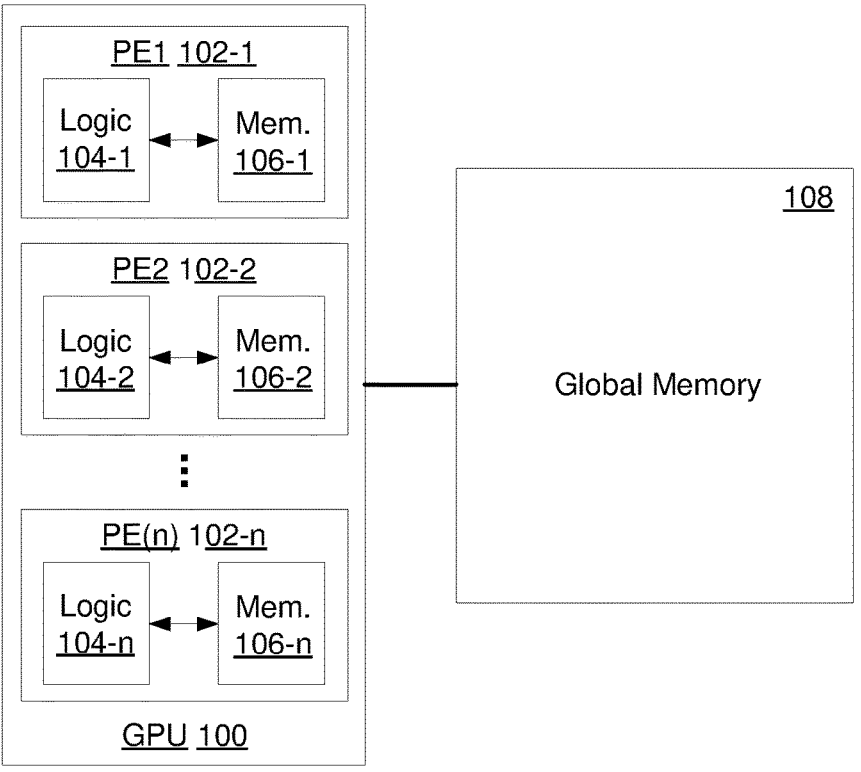
FIG. 1A shows an example graphics processing unit (GPU) and memory.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

FIG. 1A shows an example graphics processing unit (GPU) 100 and memory 108. Graphics processing unit 100 is described herein as an example of a processing unit capable of (e.g. configured to perform) parallel processing. It is to be understood that the principles described herein could also be applied to any other suitable type of processing unit that is capable of (e.g. configured to perform) parallel processing—such as a digital signal processing unit (e.g. DSP), or a suitable type of central processing unit (CPU) that is capable of parallel processing.

Graphics processing unit 100 may have any suitable architecture. Graphics processing unit 100 may be operable to perform any kind of graphics, image or video processing, general processing and/or any other type of data processing—such as the processing of general computing tasks, particularly those which can be readily parallelised. Examples of general computing tasks include signal processing, audio processing, computer vision, physical simulations, statistical calculations, neural networks and cryptography.

A graphics processing unit typically comprises one or more processing elements. In FIG. 1A, the graphics processing unit 100 is shown comprising three processing elements—labelled as 102-1, 102-2 and 102-n. It is to be understood that a processing unit configured in accordance with the principles described herein could comprise any suitable number of processing elements.

Each processing element 102 may be a different core of the graphics processing unit 100. Each processing element 102 comprises processing logic 104 and a memory 106. That is, in FIG. 1A: processing element 102-1 comprises processing logic 104-1 and memory 106-1; processing element 102-2 comprises processing logic 104-2 and memory 106-2; and processing element 102-n comprises processing logic 104-n and memory 106-n. Each memory 106 may be available for the storage of data exclusively by/for the processing logic 104 of the processing element 102 that it is comprised by. Each memory 106 may be physically located on the same chip (e.g. on the same semiconductor die and/or in the same integrated circuit package) as the processing logic 104 of the processing element 102 that it is comprised by. As such, each memory 106 may be referred to as "local memory", "on-chip memory" or "internal memory". The processing logic 104 of each processing element 102 may be able to access its local memory 106 without consuming memory bandwidth to the memory 108. That said, relative to the storage capacity of memory 108, each local memory 106 may have a small storage capacity, e.g. 60 kB (kilobytes).

Memory 108 may also be accessible to the processing logic 104 of each processing element 102, e.g. over a system bus. Graphics processing unit 100 may be implemented on a chip (e.g. semiconductor die and/or integrated circuit package) and memory 108 may not be physically located on the same chip (e.g. semiconductor die and/or integrated circuit package) as the graphics processing unit 100. As such, memory 108 may be referred to as "off-chip memory" and/or "external memory". Memory 108 may also be used to store data for other processing units of the system at which the graphics processing unit is implemented, e.g. a central processing unit (CPU—not shown in FIG. 1A), and so may also be referred to as "system memory" and/or "global memory". Memory 108 may be a dynamic random access memory (e.g. DRAM). Relative to the storage capacity of each local memory 106, global memory 108 may have a large storage capacity, e.g. 10 GB (gigabytes). That said, the latency associated with processing logic 104 reading from/writing to global memory 108 may be greater (e.g. significantly greater) than with the latency associated with processing logic 104 reading from/writing to its local memory 106.

As described in further detail herein, other types of memory (e.g. caches, registers or any other suitable type of memory—not shown in FIG. 1A for ease of illustration) may also be accessible to the processing logic 104 of each processing element 102.

Work to be performed by a processing unit that is capable of (e.g. configured to perform) parallel processing can be arranged into so called "workgroups", "warps" and "threads". A workgroup may comprise one or more warps. A warp may comprise a plurality of threads, where that plurality of threads can be processed in parallel (e.g. at a single core of a graphics processing unit). In examples where a workgroup comprises more than one warp, each of those warps can be processed in series at a single core of a graphics processing unit. Workgroups may be processed independently of each other (e.g. at different cores of a graphics processing unit, or in series at a single core of a graphics processing unit). Threads within the same workgroup (e.g. threads within the same warp of a workgroup, and threads within different warps of the same workgroup) may be able to share access during their processing to memory dedicated to the processing element (e.g. core) of the processing unit processing those threads (e.g. local memory 106 dedicated to the processing logic 104 processing those threads). That is, threads within the same warp may be able to share access during their processing to memory dedicated to the processing element (e.g. core) of the processing unit processing those threads (e.g. local memory 106 dedicated to the processing logic 104 processing those threads). Further, warps within the same workgroup may be able to share access during their processing to memory dedicated to the processing element (e.g. core) of the processing unit processing those threads (e.g. local memory 106 dedicated to the processing logic 104 processing those warps). By contrast, different workgroups may not be able to share access during their processing to memory dedicated to a certain processing element (e.g. core) of the processing unit.

A warp may be arranged as an array of threads (e.g. a one-dimensional, two-dimensional or three-dimensional array of threads). The number of threads comprised by a warp may be limited. The limit on the number of threads comprised by a warp may be caused by a hardware restriction (e.g. a limit on how many threads can be processed in parallel on the available processing hardware). In an example, a warp may comprise up to 128 threads. In this example, if more than 128 threads are to be perform the same operation, then more than one warp will be associated with that operation. For example, if 2048 threads are to perform the same operation, then sixteen warps may be associated with that operation. Said sixteen warps may be comprised by the same workgroup, or may be divided between a plurality of workgroups (e.g. up to sixteen different workgroups). It is to be understood that the "workgroup", "warp" and "thread" terminology used herein is not intended to be limiting, and that other terminology could be used to describe the same concepts. For example, a "thread" as described herein could alternatively be referred to as an "invocation" or a "work-item", whilst a "workgroup" as described herein could alternatively be referred to as a "thread block" or a "threadgroup".

Figure 1B:
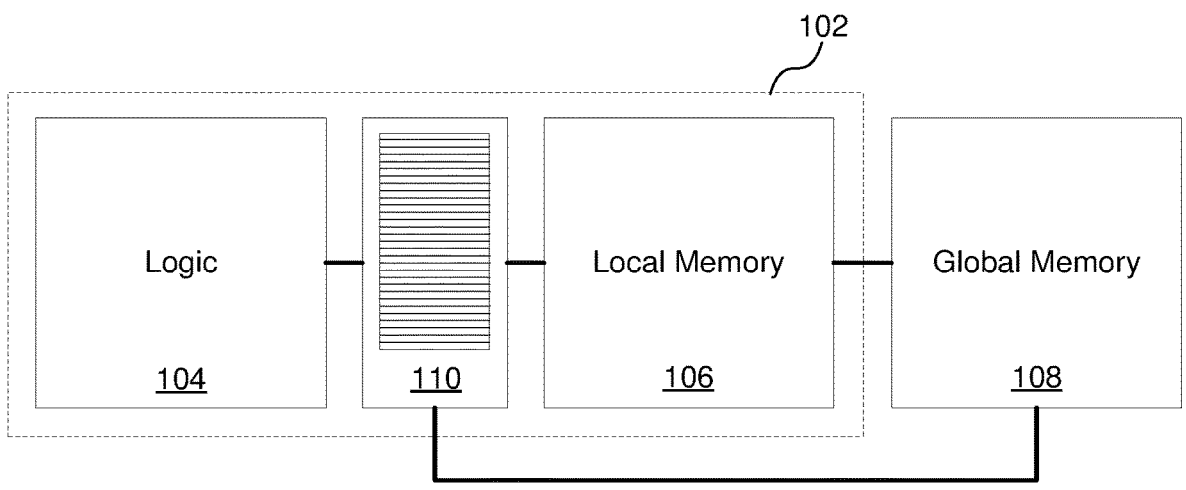
FIG. 1B shows an example memory hierarchy accessible by processing logic.

FIG. 1B shows an example memory hierarchy accessible by the processing logic 104 of a processing element 102. In FIG. 1B, for ease of illustration, the memory hierarchy associated with a single processing element 102 of a processing unit (e.g. processing unit 100 of FIG. 1A) is shown. It is to be understood that each processing element 102 of a processing unit (e.g. processing unit 100 of FIG. 1A) may be associated with an equivalent memory hierarchy to that shown in FIG. 1B.

In FIG. 1B, processing logic 104, local memory 106 and global memory 108 have the same properties as the processing logic 104, local memory 106 and global memory 108 described with reference to FIG. 1A. Also shown in FIG. 1B is a register bank 110 comprised by the processing element 102. Register bank 110 comprises a plurality of registers (e.g. register memories). Relative to the storage capacity of local memory 106, each register of the register bank 108 has a small storage capacity, e.g. 32 bits. That said, the latency associated with processing logic 104 reading from/writing to the register bank 110 may be less than with the latency associated with processing logic 104 reading from/writing to local memory 106. The register bank 110 may be physically located on the same chip (e.g. on the same semiconductor die and/or in the same integrated circuit package) as the processing logic 104 of the processing element 102 that it is comprised by. The register bank 110 may be physically located on the same chip (e.g. on the same semiconductor die and/or in the same integrated circuit package) as the local memory 106 of the processing element 102 that it is comprised by.

When processing logic 104 is processing a warp comprising a plurality of threads, a respective one or more registers of the register bank 110 may be dedicated to (e.g. accessible exclusively by) each thread of that warp. That is, values to be processed in accordance with (e.g. "by") a thread may be stored in the one or more registers accessible by that thread. Other threads within the same warp may not be able to access those values within the one or more registers accessible by that thread.

For example, a warp comprising a plurality of threads (e.g. 128 threads) can be processed at processing element 102 (e.g. a core of a processing unit) so as to perform an operation on an array of values (e.g. 1024 values). With reference to FIG. 1B, the array of values may initially be stored in global memory 108. Each thread of the warp may be configured to perform the operation on a group of values (e.g. 8 values) of the array of values (e.g. 1024 values). The limit on the number of values that can be processed by a thread may be caused by the amount of register memory in register bank 110 accessible by (e.g. dedicated to) each thread. In order to perform the operation, the processing logic 104 may cause, for each thread of the warp, a respective group of values (e.g. 8 values) to be processed by that thread to be read from global memory 108 into the one or more registers dedicated to that thread. The values written into the one or more registers dedicated to a thread can be processed by the processing logic 104 in accordance with that thread. Thereafter, the processed values can be output from the processing element 102 by writing those processed values from the respective one or more registers dedicated to each thread into global memory 108. Alternatively, if further processing is to be performed on those processed values at the processing element 102, those values can be written from the respective one or more registers dedicated to each thread into local memory 106. The plurality of threads within the warp can share access to local memory 106. That is, the plurality of threads within the warp can access the processed values written into local memory 106. As such, the processing logic 104 may cause, for each thread of the warp, a respective group of processed values (e.g. 8 processed values) to be further processed by that thread to be read from local memory 106 into the one or more registers dedicated to that thread. The processed values written into the one or more registers dedicated to a thread can be further processed by the processing logic 104 in accordance with that thread. Thereafter, the further processed values can be output from the processing element 102 by writing those further processed values from the respective one or more registers dedicated to each thread into global memory 108. Alternatively, yet further processing iterations can be performed at the processing element 102 in the same manner.

Processing units, such as graphics processing unit 100, can perform operations on arrays of values (e.g. one-dimensional or multi-dimensional arrays of values). In examples, the values of said arrays of values can be pixels values, audio samples of an audio signal, signal samples of a transmitted signal, or any other suitable type of values.

Figure 2:
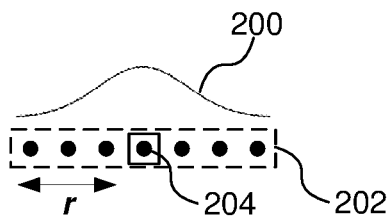
FIG. 2 shows an example operation.

FIG. 2 shows an example operation. In FIG. 2, the operation is a one-dimensional Gaussian filter operation, in which a value 204 is filtered in dependence on a one-dimensional kernel 202 of values including the value 204 to be filtered and one or more values on one or both sides of that value 204. A one-dimensional Gaussian filter operation can use a filter kernel 202 including an odd number of values, the centre value 204 being the value to be filtered. In FIG. 2, the filter kernel 202 is symmetrical. In the specific example shown in FIG. 2, the filter kernel 202 comprises seven values, including the value 204 to be filtered, and three values on either side of that value 204. In this example, the filter kernel 202 can be said to have a radius r of three values. That is, for a symmetrical filter kernel, the radius r of the filter kernel 202 can be said to be the number of values on either side of the central value to be filtered. It is to be understood that, in other examples, the filter kernel need not be symmetrical. That is, the filter kernel may include more values on one side of the value to be filtered than on the other side).

In a one-dimensional Gaussian filter operation, a filtered output for the centre value 204 may be determined by performing a weighted sum of the values in the kernel 202. The respective weight for each value in the kernel 202 can be determined in dependence on a Gaussian function 200 centred on the value 204 to be filtered. That is, as would be understood by the skilled person, in dependence on the Gaussian function 200, a value further from the value 204 to be filtered will be weighted lower (e.g. with a value closer to 0) in the weighted sum than a value closer to the value 204 to be filtered.

The one-dimensional Gaussian filter operation shown in FIG. 2 may be performed for each value of a one-dimensional sequence of values. That is, each value in a one-dimensional sequence of values may be filtered in dependence on a one-dimensional kernel 202 of values in which it is the value to be filtered. As an aside, the skilled person would be aware of numerous different techniques for operating on the values at the start and end of a sequence of values—such as when the value to be filtered is the first value in the sequence of values. In one example, this edge case may be addressed by duplicating the first value in the sequence of values such that the filter kernel includes the value to be filtered, a number of values from the sequence of values on one side of the value to be filtered, and a number of copies of the value to be filtered on the other side of the value to be filtered. Typically, the number of values at the start and end of a sequence of values to which an "edge case technique" is applied during filtering is equal to the radius r of the filter kernel. The skilled person would be aware of various other techniques for addressing edge cases such as this, and so these techniques will not be discussed further herein for conciseness.

In examples where the array of values to be operated on is a one-dimensional array of values (e.g. a sequence of audio samples of an audio signal, or a sequence of signal samples of a transmitted signal), the output of said filtering of each value in the one-dimensional sequence of values may be the output of a one-dimensional Gaussian filter operation. In other examples where the array of values to be operated on is a multi-dimensional array of values (e.g. a two-dimensional array of pixel values), said filtering of each value in a one-dimensional sequence of values may be the first phase of a separable multi-phase Gaussian filter operation. As would be understood by the skilled person, a separable filter operation is one in which a multi-dimensional operation is decomposed into a sequence of lesser-dimensional filtering operations. For example, a separable two-dimensional Gaussian filter operation can be implemented by performing an initial phase in which a one-dimensional Gaussian filter operation (as shown in FIG. 2) is performed horizontally across each row of a two-dimensional array of values, followed by performing a subsequent phase in which the same one-dimensional Gaussian filter operation is performed vertically along each column of the horizontally filtered two-dimensional array of values—or vice versa (i.e. vertically, followed by horizontally). Separable filter operations are often used to process images (e.g. two-dimensional arrays of pixel values). For example, a separable filter operation may be used to blur an image.

A Gaussian filter operation is described herein as an example of an operation that can be performed on an array of values (e.g. a one-dimensional or multi-dimensional arrays of values). It is to be understood that the principles described herein could be applied to other types of operation that can be performed on one- or multi-dimensional array of values—e.g. a box filter operation, a convolution operation, a fast integral calculation operation or any other suitable type of operation. As with a one-dimensional Gaussian filter operation, a one-dimensional box filter operation can be performed in one phase as a one-dimensional operation on a one-dimensional array of values, or in multiple phases so as to implement a separable operation on a multi-dimensional array of values. In a one-dimensional box filter operation, a value can be filtered in dependence on a one-dimensional kernel of values including the value to be filtered and one or more other values positioned on one or both sides of that value. A filtered output for the value to be filtered can be determined by averaging the values in the kernel. Box filter operations are well understood by the skilled person, and so will not be discussed further herein for conciseness. In a convolution operation an array of activation values is convolved with (e.g. filtered by) an array of coefficients (e.g. filter weights)—e.g. so as to implement a so-called "convolution layer" of a neural network. Convolution operations are well understood by the skilled person, and so will not be discussed herein for conciseness. Fast integral calculation operations are discussed in further detail below.

In a simple approach, a phase of a separable two-dimensional Gaussian filter operation can be performed on an array of values by assigning each value of the array of values to be filtered to a thread for processing. As an illustrative example, consider a separable two-dimensional Gaussian filter operation to be performed on a two-dimensional array of values comprising 1024 values. In this example, in order to perform the initial (e.g. horizontal) phase of said operation, each of said 1024 values could be assigned to a respective one of 1024 threads. In order to filter each value, the processing logic 104 processing each thread can read all of the values included in the one-dimensional filter kernel used to filter that value (i.e. the value to be filtered and the one or more values on one or both sides of that value) from global memory 108 into the one or more registers accessible by that thread. The processing logic 104 processing each thread can then generate a filtered value for its value by performing a weighted sum of the values in the kernel in the manner descried above, and write that filtered value back to global memory 108, such that the global memory 108 stores a once-filtered (e.g. horizontally filtered) value for each value of the two-dimensional array of values. In order to perform the subsequent (e.g. vertical) phase of said operation, each of said 1024 once-filtered values could be assigned to a respective one of 1024 threads. In order to further filter each once-filtered value, the processing logic 104 processing each thread can read all of the once-filtered values included in the one-dimensional filter kernel used to further filter that once-filtered value (i.e. the once-filtered value to be further filtered and the one or more once-filtered values on one or both sides of that value) from global memory 108 into the one or more registers accessible by that thread. The one-dimensional filter kernels used in the subsequent (e.g. vertical) phase are perpendicular to the one-dimensional filter kernels used in the initial (e.g. horizontal) phase. The processing logic 104 processing each thread can then generate a further filtered value for its one-filtered value by performing a weighted sum of the values in the kernel in the manner descried above, and write that further filtered value back to global memory 108, such that the global memory 108 stores a further filtered (e.g. horizontally and vertically filtered) value for each value of the two-dimensional array of values. Performing a separable two-dimensional Gaussian filter operation in this way is relatively slow, as it involves performing two sets of reads and two sets of writes to global memory 108—each of which, as described above, has a greater latency associated with it than a read from/write to a local memory 106. Further, each value is read from memory many times. This is because, in each phase, each value is read from memory (e.g. global memory 108) by the processing logic 104 processing each thread that is assigned to filter that value into the one or more registers accessible by that thread, and also read from memory (e.g. a cache memory into which it is written after being read from global memory 108) by the processing logic 104 processing each of the threads that are assigned to filter other values using a filter kernel that includes that value into the one or more registers accessible by each of those threads. In addition, this simple approach does not take advantage of the ability of threads within the same workgroup to share access during their processing to local memory 106 dedicated to the processing logic 104 processing those threads.

Figure 10:
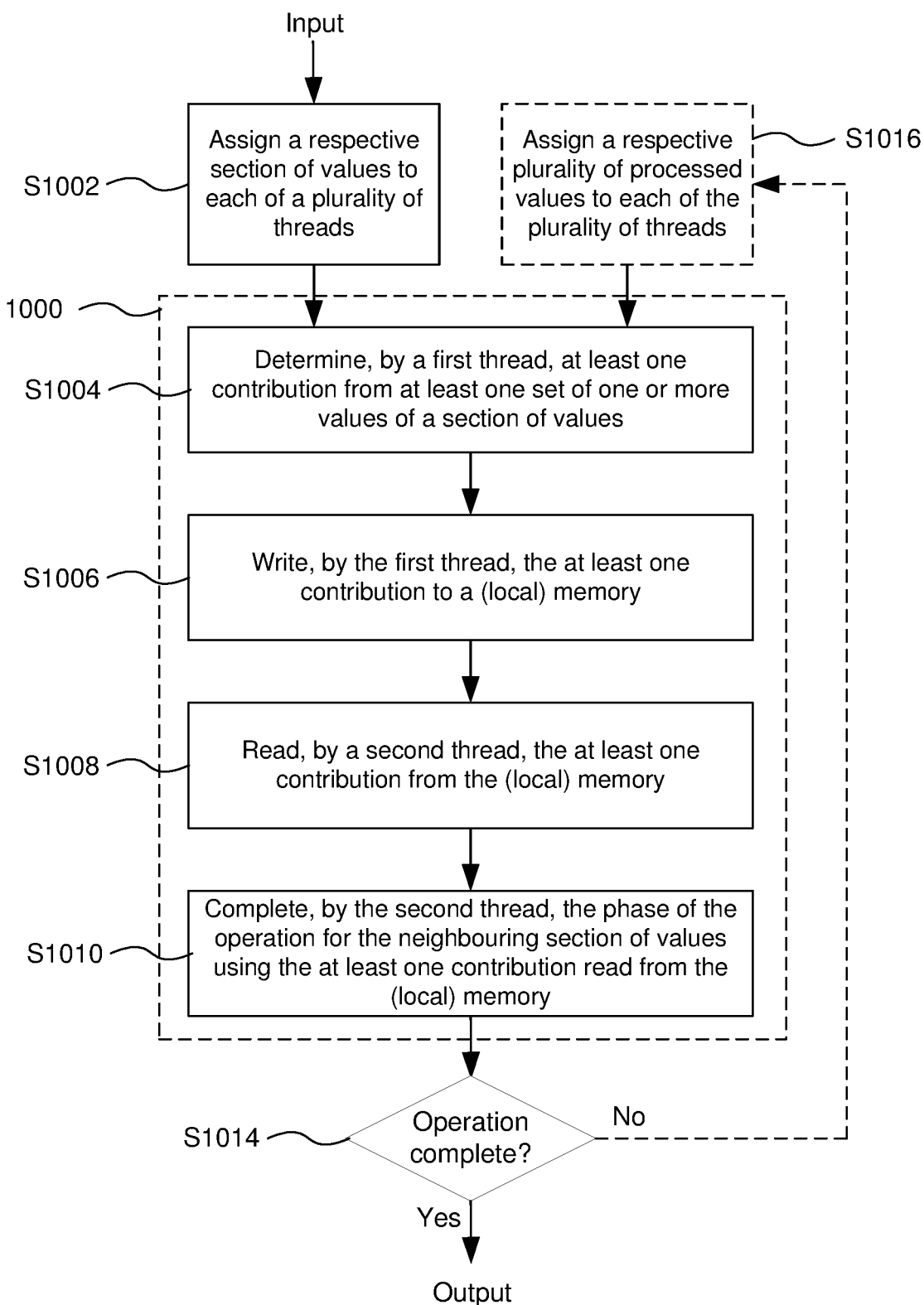
FIG. 10 shows a method of performing an operation on an array of values at a processing unit according to the principles described herein.

Described herein with reference to the graphics processing unit 100 shown in FIG. 1A and the flow diagram shown in FIG. 10 is a computer-implemented method of performing an operation on an array of values at a processing unit 100. Said method can address one or more of the problems with the simple approach as described in the preceding paragraph. In the following, the method is described primarily with reference to an illustrative example in which the array of values is a two-dimensional array of pixel values and the operation is a separable two-dimensional Gaussian filter operation.

In this illustrative example, the input to the method shown in FIG. 10 is a two-dimensional array of pixel values—such as a two-dimensional image, or a portion of (e.g. a tile or block of) a two-dimensional image. In examples, said two-dimensional image may be representative of: a still image; a frame of a video; a computer generated two-dimensional representation of a three-dimensional scene (e.g. such as an image rendered using path or ray tracing); or any other suitable type of image. A pixel value may represent one or more characteristics of its respective pixel within an image. For example, a pixel value may represent one or more of luma, luminance, chroma, chrominance, brightness, lightness, hue, saturation, colourfulness, any colour component (e.g. red, green or blue colour components), or any other suitable characteristic of its respective pixel. In other examples, a pixel value may represent a characteristic associated with its respective pixel, such as a characteristic indicated in a depth map, a normal map or a surface texture map (e.g. an albedo map) or any combination (e.g. element-wise product) of these at the position of its respective pixel. The input may be stored in global memory 108. As would be understood by the skilled person, the input may be written to global memory 108 by an application (e.g. process) running at the computer system at which the graphics processing unit 100 is implemented (not shown in FIG. 1A).

In some examples in which a received two-dimensional image is sufficiently small, one warp of threads may be capable of performing the desired operation for all of the pixel values of that two-dimensional image. This means that one processing element 102 of the processing unit 100 could perform the desired operation on that two-dimensional image by processing the threads of that warp in parallel. By way of non-limiting example, a warp may comprise up to 128 threads, each thread being capable of completing the desired operation for up to eight pixel values. In this case, the received two-dimensional image may be considered to be sufficiently small if it comprises 1024 or fewer pixel values. In these examples, the entire two-dimensional image can be input to the method shown in FIG. 10 as a two-dimensional array of pixel values.

Figure 3:
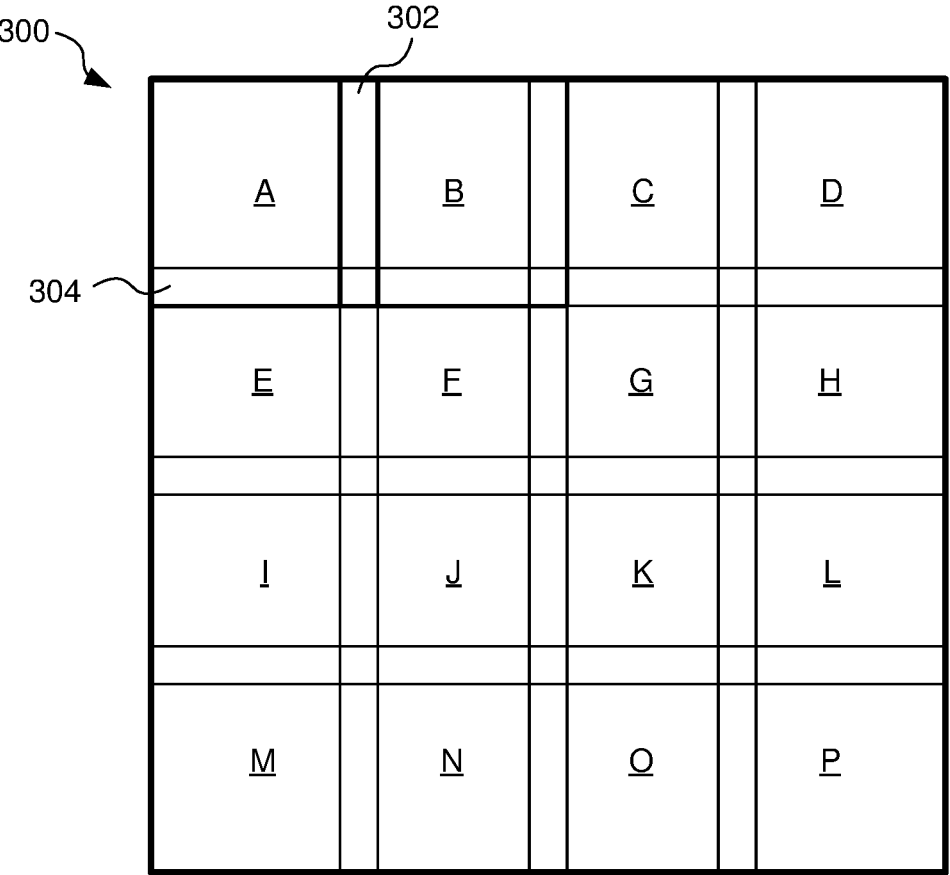
FIG. 3 shows an example image divided into a plurality of overlapping tiles.

In other examples, optionally, a received two-dimensional image can be divided into a plurality of overlapping tiles. FIG. 3 shows an example two-dimensional image 300 divided into a plurality of overlapping tiles A-P. The overlap between tiles A and B is labelled 302. The overlap between tiles A and E is labelled 304. Each of said plurality of overlapping tiles A-P comprises a respective two-dimensional array of pixel values. The tiles may be sized so that one warp of threads is capable of performing the desired operation for all of the pixel values comprised by a tile. This means that a processing element 102 of the processing unit 100 could perform the desired operation on one of the plurality of overlapping tiles by processing the threads of a warp in parallel. By way of non-limiting example, a warp may comprise up to 128 threads, each thread being capable of completing the desired operation for up to eight pixel values. In this case, the received two-dimensional image may be divided into a plurality of overlapping tiles, each tile comprising 1024 or fewer pixel values (e.g. each tile having pixels dimensions of 32×32 or smaller). In these examples, the two-dimensional array of pixel values of each overlapping tile can be input to the method shown in FIG. 10. The two-dimensional array of pixel values of each appropriately sized overlapping tile can be independently processed according to the method shown in FIG. 10 by a respective processing element 102 of the processing unit 100.

Preferably, but optionally, the width of the overlap between overlapping tiles is greater than or equal to twice the radius r of the filter kernel that will be used in the filter operation to be performed on each of those overlapping tiles. For example, in FIG. 2, the filter kernel has a radius r of three values, and so the width of the overlap between overlapping tiles on which the operation shown in FIG. 2 is to be performed should preferably be six or more values. This is because, as described herein, the number of values at the start and end of a sequence of values to which an "edge case technique" is applied during filtering is equal to the radius r of the filter kernel. Thus, the width of the overlap between overlapping tiles is preferably greater than or equal to twice the radius r of the filter kernel so that the filtered image output by the method need not include any pixel values in the areas where the tiles overlapped that have been filtered using a technique that addresses an edge case occurring at the edge of a tile. That is, continuing the example started earlier in this paragraph, when overlapping tiles A and B are recombined after filtering to form a filtered image, the three values at the end of each row of values in tile A to which an "edge case technique" is applied during filtering can be replaced by the fourth, fifth and sixth values of each row of values in tile B that are filtered without using an "edge case technique". Similarly, the three values at the start of each row of values in tile B to which an "edge case technique" is applied during filtering can be replaced by the fourth, fifth and sixth from last values of each row of values in tile A that are filtered without using an "edge case technique".

Returning to FIG. 10, an array of values comprises one or more one-dimensional sequences of values. For example, a one-dimensional array of values may comprise a single one-dimensional sequence of values (e.g. a single row or column of values). A two-dimensional array of values, as in the illustrative example, may comprise a plurality of horizontal sequences of values (e.g. rows) and a plurality of vertical sequences of values (e.g. columns).

In the illustrative example, each phase of the separable two-dimensional Gaussian filter operation involves performing a one-dimensional Gaussian filter operation. So as to perform a phase of that operation, in step S1002, for each of the one or more one-dimensional sequences of values of the array of values, a respective section of values of the one-dimensional sequence of values is assigned to each of a plurality of threads. Said sections of values may be non-overlapping sections of values. This step can be understood with reference to FIGS. 4 and 5—which illustrate step S1002 being performed for each of one or more horizontal sequences of values (e.g. rows) of a two-dimensional array of values. It is to be understood that step S1002 could alternatively be performed for each of one or more vertical sequences of values (e.g. columns) of a two-dimensional array of values.

Figures 4, 5:
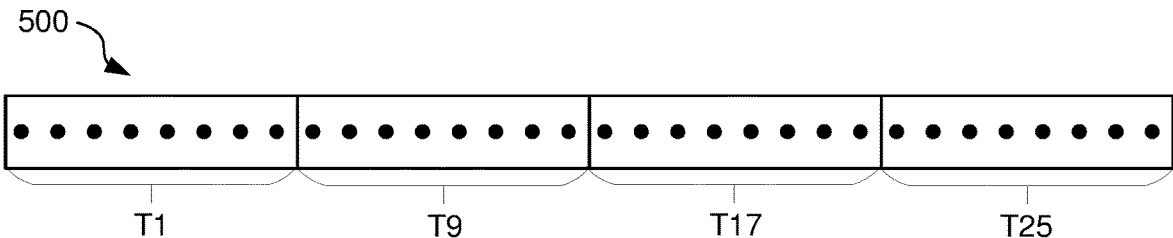
FIG. 4 shows an example assignment of sections of values to a plurality of threads.
FIG. 5 shows a one-dimensional sequence of values.

FIG. 4 shows an example assignment of sections of values to a plurality of threads. In FIG. 4, each one-dimensional sequence of values of the array of values 400 is a row of values of the array of values 400. In FIG. 4, the array of values comprises 32 rows of values. Each row of values comprises 32 values. In examples described herein, each thread may be capable of completing the desired operation for up to eight values. This limit may be caused by the amount of register memory in register bank 110 accessible by (e.g. dedicated to) each thread—and it is to be understood that, in other examples, each thread may be capable of completing the desired operation for a different number of values (e.g. in some examples, any suitable number of values up to 100, of even more, values). In this example, each row of values is divided into four non-overlapping sections of values, each section of values comprising eight values. Each of said sections of values is assigned to a thread. In FIG. 4, the two-dimensional array of values is divided into 128 sections of values (i.e. 32 rows×4 sections per row), each section of values being assigned to a respective one of 128 threads—labelled in FIG. 4 as T1 to T128. As described herein, in an example, a warp may comprise up to 128 threads. As such, in this example, one processing element 102 of the processing unit 100 can process, in parallel, said 128 threads to which values of the array of values have been assigned. That is, said 128 threads (i.e. T1 to T128 shown in FIG. 4) can be comprised by one warp to be processed by a processing element 102 of the processing unit 100.

FIG. 5 shows a one-dimensional sequence of values 500 in further detail. In particular, FIG. 5 shows the first row of values 500 of the array of values 400. The row of values 500 has been divided into four sections, each section comprising eight values. Those sections of values have been assigned to threads T1, T9, T17 and T25, respectively. The section of values assigned to thread T1 neighbour the section of values assigned to thread T9. The section of values assigned to thread T9 neighbour the section of values assigned to thread T1, and also neighbour the section of values assigned to thread T17. The section of values assigned to thread T17 neighbour the section of values assigned to thread T9, and also neighbour the section of values assigned to thread T25. The section of values assigned to thread T25 neighbour the section of values assigned to thread T17.

It is to be understood that each thread may alternatively be assigned more than one section of values. That is, a thread may be assigned a section of values from each of more than one one-dimensional sequence of values. For example, a thread may be capable of completing the desired operation for up to eight values, and that thread may be assigned two sections of values from different one-dimensional sequences of values (e.g. rows), each section of values comprising four values. Said one-dimensional sequences of values (e.g. rows) may be contiguous within the two-dimensional array of values—although this need not be the case.

In the method described herein, each thread is to complete the phase of the operation for each of the values of the section of values that it has been assigned. To achieve this, first, each thread causes each of the values included in the section of values assigned to that thread to be read from global memory 108 into the one or more registers in register bank 110 dedicated to that thread (e.g. "its registers"). That is, with reference to FIG. 5, thread T1 reads all eight of the values in the section it has been assigned from global memory 108 into its registers, thread T9 reads all eight of the values in the section it has been assigned from global memory 108 into its registers, thread T17 reads all eight of the values in the section it has been assigned from global memory 108 into its registers, and thread T25 reads all eight of the values in the section it has been assigned from global memory 108 into its registers. Where it is described herein that a thread reads to/writes from a memory, it can be understood that it is that thread causing the processing logic 104 that is processing it to perform said reading to/writing from that memory.

Figure 6:
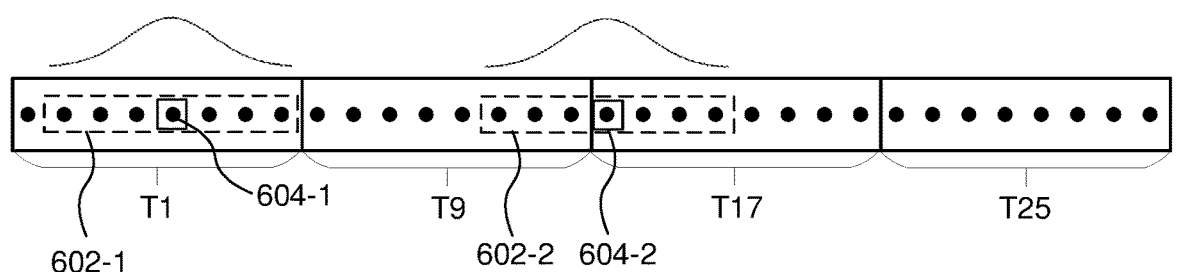
FIG. 6 shows example filter kernels overlayed on a one-dimensional sequence of values.

As described herein, in the illustrative example, each phase of the separable two-dimensional Gaussian filter operation involves performing a one-dimensional Gaussian filter operation. Said one-dimensional Gaussian filter operation uses a filter kernel including seven values, including the value 204 to be filtered, and three values on either side of that value 204, as shown in FIG. 2. FIG. 6 shows examples of said filter kernels overlayed on certain values of the one-dimensional sequence of values shown in FIG. 5. As will be understood with reference to FIG. 6, for some of the values of the respective section of values assigned to each thread, that thread may be capable of completing the one-dimensional Gaussian filter operation for that value using only the values of the section of values that have been read into the one or more registers accessible by that thread (e.g. "its registers"). For example, in FIG. 6, thread T1 can independently complete the one-dimensional Gaussian filter operation for value 604-1, as all of the values within filter kernel 602-1 have been read into its registers. In other words, thread T1 can independently calculate a weighted sum, as described herein, of all of the values within filter kernel 602-1—as it has access to all of those values within its registers. That said, in another example, thread T17 cannot independently complete the one-dimensional Gaussian filter operation for value 604-2, as only read a subset of (i.e. four of) the values within filter kernel 602-2 have been read into the one or more registers accessible by thread T17. The other three values within filter kernel 602-2 have been read into the one or more registers accessible by thread T9. In other words, neither thread T9, nor thread T17, can independently calculate a weighted sum, as described herein, of all of the values within filter kernel 602-2—as neither of those threads has access to all of those values within its registers. As such, in this example, threads T9 and T17 must cooperate in order to complete the one-dimensional Gaussian filter operation for value 604-2. The manner in which two threads cooperate so as to complete the one-dimensional Gaussian filter operation for certain values, such as value 604-2, is described in the following with reference to FIGS. 7a to 7c and 10.

The steps of a phase 1000 of the operation are shown in FIG. 10. In step S1004, a first thread of the plurality of threads determines at least one contribution, from the section of values assigned to the first thread, to the phase of the operation that is to be completed by a second thread of the plurality of threads for a neighbouring section of values of the one-dimensional sequence of values. In a first example, in step S1004, the first thread of the plurality of threads can perform at least one part of the phase of the operation on at least one set of one or more values of the section of values assigned to the first thread in order to determine the at least one contribution, from said at least one set of one or more values, to the phase of the operation that is to be completed by the second thread of the plurality of threads for a neighbouring section of values of the one-dimensional sequence of values. In a second example, in step S1004, the first thread of the plurality of threads can determine one or more values of the section of values assigned to the first thread as the at least one contribution, from the section of values assigned to the first thread, to the phase of the operation that is to be completed by a second thread of the plurality of threads for a neighbouring section of values of the one-dimensional sequence of values.

Figure 7A:
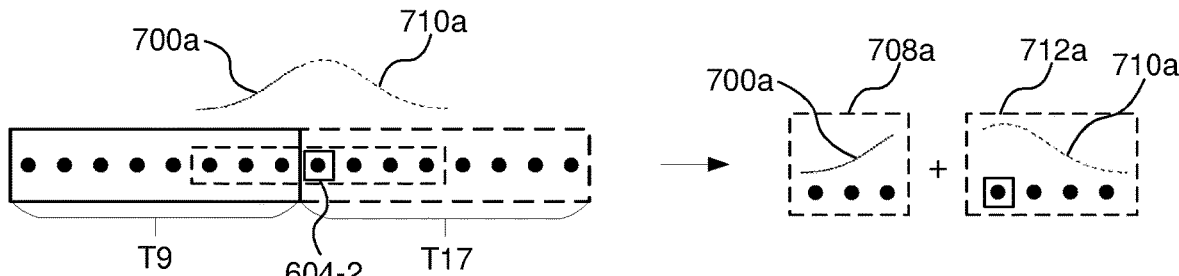
FIGS. 7a to 7c show example contributions from values of a section of values to a phase of an operation to be completed for a neighbouring a section of values.
Figure 7B:
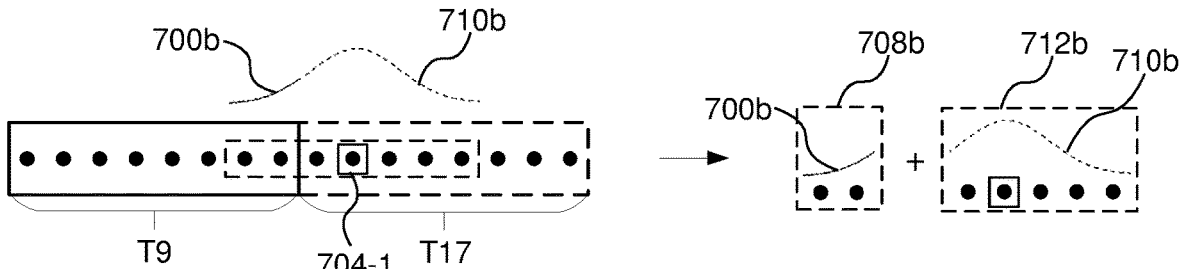
Figure 7C:
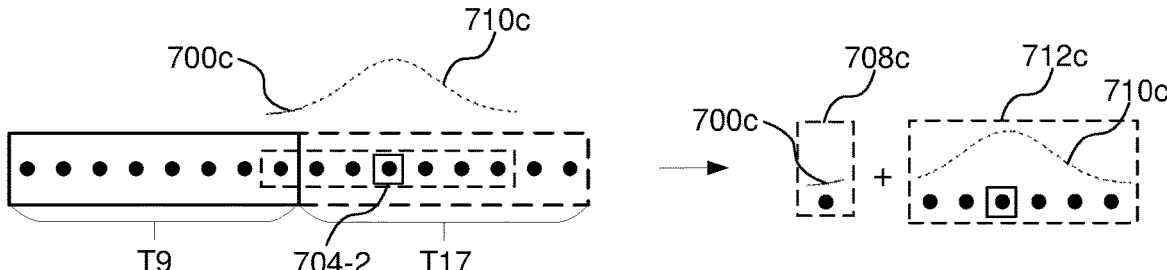

The first example of step S1004 can be understood with reference to FIGS. 7a to 7c—which shows example contributions from sets of one or more values of a section of values to a phase of a separable Gaussian filter operation to be completed for a neighbouring section of values. In FIGS. 7a to 7c, thread T9 is the "first thread" and thread T17 is the "second thread".

FIG. 7a shows how threads T9 and T17 from FIG. 6 can cooperate so as to complete a phase of a separable Gaussian filter operation for value 604-2. In FIG. 7a, in the first example of step S1004, thread T9 performs a part of the one-dimensional Gaussian filter operation on a set of three values (e.g. the $6^{th}$, $7^{th}$ and $8^{th}$ values) of the section of values it has been assigned so as to determine a contribution 708a. Performing this part of the Gaussian filter operation on these three values involves performing a weighted sum of those three values. The respective weight for each of those three values is determined in dependence on a part 700a of the Gaussian function centred on the value 604-2 to be filtered.

FIG. 7b shows how threads T9 and T17 can cooperate so as to complete a phase of a separable Gaussian filter operation for value 704-1. In FIG. 7b, in the first example of step S1004, thread T9 performs a part of the Gaussian filter operation on a set of two values (e.g. the $7^{th}$ and $8^{th}$ values) of the section of values it has been assigned so as to determine a contribution 708b. Performing this part of the Gaussian filter operation on these two values involves performing a weighted sum of those two values. The respective weight for each of those two values is determined in dependence on a part 700b of the Gaussian function centred on the value 704-1 to be filtered.

FIG. 7c shows how threads T9 and T17 can cooperate so as to complete a phase of a separable Gaussian filter operation for value 704-2. In FIG. 7c, in the first example of step S1004, thread T9 performs a part of the Gaussian filter operation on a set of one value (e.g. the $8^{th}$ value) of the section of values it has been assigned so as to determine a contribution 708c. Performing this part of the Gaussian filter operation on this value involves weighting that value. The weight by which that value is multiplied is determined in dependence on a part 700c of the Gaussian function centred on the value 704-2 to be filtered.

That is, in the first example of step S1004 of the illustrative example, thread T9 determines three contributions 708a, 708b and 708c, from three sets of one or more values (e.g. (i) the $6^{th}$, $7^{th}$ and $8^{th}$ values, (ii) the $7^{th}$ and $8^{th}$ values, and (iii) the $8^{th}$ value) of the section of values that it has been assigned, to the phase of the operation that is to be completed by thread T17 for a neighbouring section of values of the one-dimensional sequence of values. In this illustrative example, the number of contributions determined in the first example of step S1004 by a first thread to the phase of an operation that is to be completed a second thread may be equal to the radius r of the filter kernel.

It is to be understood that, in the first example of step S1004 of the illustrative example, in an analogous way to that described with reference to FIGS. 7a to 7c: thread T9 can also determine three contributions (not shown in FIGS. 7a to 7c), from three sets of one or more values (e.g. (i) the $1^{st}$ value, (ii) the 1st and $2^{nd}$ values, and (iii) the 1st $2^{nd}$ and $3^{rd}$ values) of the section of values that it has been assigned, to the phase of the operation that is to be completed by thread T1 (as shown in FIG. 6); thread T17 can determine three contributions (not shown in FIGS. 7a to 7c), from three sets of one or more values (e.g. (i) the $1^{st}$ value, (ii) the $1^{st}$ and $2^{nd}$ values, and (iii) the 1st $2^{nd}$ and 3rd values) of the section of values that it has been assigned, to the phase of the operation that is to be completed by thread T9; and thread T17 can determine three contributions (not shown in FIGS. 7a to 7c), from three sets of one or more values (e.g. (i) the $6^{th}$, $7^{th}$ and $8^{th}$ values, (ii) the $7^{th}$ and $8^{th}$ values, and (iii) the $8^{th}$ value) of the section of values that it has been assigned, to the phase of the operation that is to be completed by thread T25 (as shown in FIG. 6). In other words, each of the threads of the plurality of threads (e.g. each thread shown in FIG. 4) can determine at least one contribution to the phase of the operation to be completed by at least one other thread by performing the actions of the "first thread" described with reference to the first example of step S1004 of FIG. 10.

The second example of step S1004 can also be understood with reference to FIGS. 7a to 7c. As will be understood with reference to FIGS. 7a to 7c: the $6^{th}$, $7^{th}$ and $8^{th}$ values of the section of values assigned to thread T9 will contribute to the operation that is to be completed by thread T17 for value 604-2 (see FIG. 7a); the $7^{th}$ and $8^{th}$ values of the section of values assigned to thread T9 will contribute to the operation that is to be completed by thread T17 for value 704-1 (see FIG. 7b); and the $8^{th}$ value of the section of values assigned to thread T9 will contribute to the operation that is to be performed by thread T17 for value 704-2 (see FIG. 7c). Thus, in the second example of step S1004, the $6^{th}$, $7^{th}$ and $8^{th}$ values of the section of values assigned to thread T9 can be determined as contributions to the phase of the operation that is to be completed by thread T17 for the neighbouring section of values. That is, in the second example, the contributions are unprocessed values. In other words, in the second example, thread T9 does not perform at least one part of the phase of the operation in step S1004—but rather identifies one or more of the unprocessed values of the section of values that it has been assigned as contributions to the phase of the operation that is to be completed by thread T17 for the neighbouring section of values. Thread T9 may identify the number of the values within the section of values that it has been assigned that will contribute to the phase of the operation that is to be completed by thread T17 in dependence on the number of values on the "left-hand-side" of the value to be filtered in the filter kernel to be used during the operation (e.g., in this example, three values). In an analogous way, referring to FIG. 6: the $6^{th}$, $7^{th}$ and $8^{th}$ values of the section of values assigned to thread T1 can be determined as contributions to the phase of the operation that is to be completed by thread T9; the 1st, $2^{nd}$ and $3^{rd}$ values of the section of values assigned to thread T9 can be determined as contributions to the phase of the operation that is to be completed by thread T1; the 1st $2^{nd}$ and $3^{rd}$ values of the section of values assigned to thread T17 can be determined as contributions to the phase of the operation that is to be completed by thread T9; the $6^{th}$, $7^{th}$ and $8^{th}$ values of the section of values assigned to thread T17 can be determined as contributions to the phase of the operation that is to be completed by thread T25; and the $1^{st}$, $2^{nd}$ and $3^{rd}$ values of the section of values assigned to thread T25 can be determined as contributions to the phase of the operation that is to be completed by thread T17. In other words, each of the threads of the plurality of threads (e.g. each thread shown in FIG. 4) can determine at least one contribution to the phase of the operation to be completed by at least one other thread by performing the actions of the "first thread" described with reference to the second example of step S1004 of FIG. 10.

In step S1006, the first thread writes the at least one contribution that it has determined to a memory. In particular, the first thread may write the at least one contribution to local memory 106. For example, referring to FIGS. 7a to 7c, in the first example, thread T9 writes contributions 708a, 708b and 708c to local memory 106. In the second example, thread T9 writes the $6^{th}$, $7^{th}$ and $8^{th}$ values of the section of values it has been assigned to local memory 106. In step S1006, each of the other threads of the plurality of threads can also write any contributions they have determined in step S1004 to local memory 106. As described herein, the plurality of threads within the warp can share access to local memory 106.

As an aside, it can be advantageous for the radius r of the filter kernel used in each phase of the operation to be less than or equal to half of the number of values in each section of values. This can be advantageous because it means that the number of contributions generated by a thread in step S1004 does not exceed the number of values in the section of values assigned to that thread—which can limit the number of memory locations required in local memory 106 to store the contributions to no more than the number of memory locations in local memory 106 required to store the values of the array of values. As described herein, relative to the storage capacity of memory 108, each local memory 106 may have a small storage capacity, e.g. 60 kB (kilobytes)—and so limiting the number of memory locations of the local memory 106 required to store the contributions can be advantageous.

In step S1008, the second thread reads the at least one contribution determined by the first thread from the memory. In particular, the second thread may read the at least one contribution from local memory 106. As described herein, the plurality of threads within the warp can share access to local memory 106. The second thread may cause the at least one contribution to be read into the one or more registers accessible by the second thread—such that said registers include the at least one contribution as well as the values of the neighbouring section of values assigned to the second thread. For example, referring to FIGS. 7a to 7c, in the first example, thread T17 reads contributions 708a, 708b and 708c from local memory 106 into its registers. In the second example, thread T17 reads the $6^{th}$, $7^{th}$ and $8^{th}$ values of the section of values assigned to thread T9 from local memory 106 into its registers. In step S1008, each of the other threads of the plurality of threads can also read any contributions determined by thread(s) assigned its neighbouring section(s) of values from local memory 106 into its registers.

In step S1010, the second thread completes the phase of the operation for the neighbouring section of values assigned to the second thread in dependence on the at least one contribution read from the memory in order to generate a section of processed values.

In the first example, in step S1010, completing the phase of the operation for the neighbouring section of values may comprise the second thread performing at least one part of the phase of the operation on at least one set of one or more values of the neighbouring section of values assigned to the second thread in order to determine at least one contribution from each of said one or more values of the neighbouring section of values to the phase of the operation, and combining said at least one contribution determined by the second thread for the neighbouring section of values with the at least one contribution read from the memory by the second thread. This first example of step S1010 can be understood with reference to FIGS. 7a to 7c, in which thread T9 is the "first thread" and thread T17 is the "second thread".

In FIG. 7a, in the first example of step S1010, thread T17 performs a part of the one-dimensional Gaussian filter operation on a set of four values (e.g. the $1^{st}$, $2^{nd}$, $3^{rd}$ and $4^{th}$ values) of the section of values it has been assigned, which neighbour the section of values assigned to thread T9, so as to determine a contribution 712a. Performing this part of the Gaussian filter operation on these four values involves performing a weighted sum of those four values. The respective weight for each of those three values is determined in dependence on a part 710a of the Gaussian function centred on the value 604-2 to be filtered. Then, in order to complete the phase of the Gaussian filter operation so as to generate a processed value for value 604-2, thread T17 combines (e.g. sums) the contribution 708a that it read from the memory and contribution 712a that it determined.

In FIG. 7b, in the first example of step S1010, thread T17 performs a part of the Gaussian filter operation on a set of five values (e.g. the $1^{st}$, $2^{nd}$, $3^{rd}4^{th}$ and$5^{th}$ values) of the section of values it has been assigned, which neighbour the section of values assigned to thread T9, so as to determine a contribution 712b. Performing this part of the Gaussian filter operation on these five values involves performing a weighted sum of those five values. The respective weight for each of those five values is determined in dependence on a part 710b of the Gaussian function centred on the value 704-1 to be filtered. Then, in order to complete the phase of the Gaussian filter operation so as to generate a processed value for value 704-1, thread T17 combines (e.g. sums) the contribution 708b that it read from the memory and contribution 712b that it determined.

In FIG. 7c, in the first example of step S1010, thread T17 performs a part of the Gaussian filter operation on a set of six values (e.g. e.g. the $1^{st}$, $2^{nd}$, $3^{rd}$, $4^{th}$, $5^{th}$ and $6^{th}$ values) of the section of values it has been assigned, which neighbour the section of values assigned to thread T9, so as to determine a contribution 712c. Performing this part of the Gaussian filter operation on these six values involves performing a weighted sum of those six values. The respective weight for each of those six values is determined in dependence on a part 710c of the Gaussian function centred on the value 704-2 to be filtered. Then, in order to complete the phase of the Gaussian filter operation so as to generate a processed value for value 704-2, thread T17 combines (e.g. sums) the contribution 708c that it read from the memory and contribution 712c that it determined.

In the first example, in step S1010, thread T17 can independently (e.g. without cooperating with another thread) complete the phase of the Gaussian filter operation so as to generate a respective processed value for each of the $4^{th}$ and $5^{th}$ values in the section of values it has been assigned—as, in an analogous way to value 604-1 of thread T1 described with reference to FIG. 6, thread T17 has access to all of the values within the filter kernel used to filter said $4^{th}$ and $5^{th}$ values within its registers. Thread T17 can complete the phase of the Gaussian filter operation so as to generate a respective processed value for each of the $6^{th}$, $7^{th}$ and $8^{th}$ values in the section of values it has been assigned by cooperating with thread T25 in an analogous way to its cooperation with thread T9 described with reference to FIGS. 7a to 7c. As such, using the method described herein, in the first example, thread T17 can complete the phase of the Gaussian filter operation for each of the values of the section of values that it has been assigned in order to generate a section of processed values.

In the second example, in step S1010, completing the phase of the operation for the neighbouring section of values may comprise the second thread performing the phase of the operation on the values of the neighbouring section of values assigned to the second thread using the values of the neighbouring section of values assigned to the second thread and the at least one contribution read from the memory in order to generate a section of processed values. That is, in the second example, in step S1010, each thread will have access to all of the values within the filter kernel used to filter each of the values within the section of values assigned to that thread within its registers. For example, after performing step S1008, with reference to FIG. 6, thread T17 will have access within its registers to: the $6^{th}$, $7^{th}$ and $8^{th}$ values of the section of values assigned to thread T9; each of the values of the section of values assigned to thread T17; and the $1^{st}$, $2^{nd}$ and $3^{rd}$ values of the section of values assigned to thread T25. As such, in the second example of step S1010, thread T17 can independently complete the phase of the Gaussian filter operation so as to generate a respective processed value for each of the values in the section of values it has been assigned. In an analogous way, in the second example of step S1010, each of the threads of the plurality of threads (e.g. each thread shown in FIG. 4) can independently complete the phase of the Gaussian filter operation so as to generate a respective processed value for each of the values in the section of values it has been assigned.

It is to be understood that, in order to perform a phase 1000 of the operation, each of the threads of the plurality of threads (e.g. each thread shown in FIG. 4) may perform the actions of the "first thread" in steps S1004 to S1006 so as to determine at least one contribution to the phase of the operation to be completed by at least one other thread, and then perform the actions of the "second thread" in steps S1008 to S1010 so as to complete the phase of the operation in dependence on at least one contribution determined by at least one other thread.

In step S1014, it is determined whether the operation is complete. In examples where the array of values to be operated on is a one-dimensional array of values (e.g. a sequence of audio samples of an audio signal, or a sequence of signal samples of a transmitted signal), and the phase 1000 of the operation performed in steps S1004 to S1010 is a one-dimensional operation (e.g. a one-dimensional Gaussian filter operation), the operation may be determined to be complete after completing a single phase 1000 of steps S1004 to S1010. In this case, the second thread can write the section of processed values it has generated to global memory 108. Each of the plurality of threads (e.g. each thread shown in FIG. 4) can write the section of processed values that it has generated to global memory 108, such that a processed value is written to global memory 108 corresponding to each value of the array of values on which the operation is to be performed. The processed values written to global memory 108 corresponding to each value of the array of values can be the output of the method.

In the illustrative example, in which the array of values to be operated on is a two-dimensional array of pixel values, the operation is a separable two-dimensional Gaussian filter operation, and the phase 1000 of the operation performed in steps S1004 to S1010 is a one-dimensional Gaussian filter operation, the operation may be determined to not be complete after completing a single (e.g. initial) phase 1000 of steps S1004 to S1010. In this case, the second thread can write the section of processed values it has generated to local memory 106. Each of the plurality of threads (e.g. each thread shown in FIG. 4) can write the section of processed values that it has generated to local memory 106, such that a processed value is written to local memory 106 corresponding to each value of the array of values on which the operation is to be performed. As described herein, the plurality of threads within the warp can share access to local memory 106. The method then continues to step S1016.

So as to perform a subsequent phase of the operation, in step S1016, for each of one or more perpendicular one-dimensional sequences of values of the array of values, a respective plurality of processed values from the memory (e.g. local memory 106), said plurality of processed values corresponding to a one-dimensional section of values of the perpendicular one-dimensional sequence of values of the two-dimensional array of values, is assigned to each of the plurality of threads. Said sections of values may be non-overlapping sections of values.

Figures 8, 9:
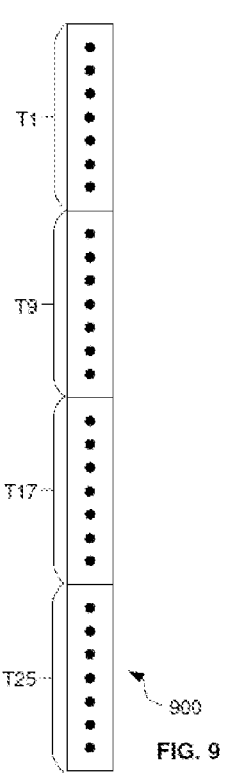
FIG. 8 shows, in an example, the sections of values to which the plurality of processed values assigned in the subsequent phase of the operation correspond.
FIG. 9 shows a perpendicular one-dimensional sequence of values.

This step can be understood with reference to FIG. 8—which shows, in an example, the sections of values to which the plurality of processed values assigned in the subsequent phase of the operation correspond. In the example shown in FIG. 8, step 1016 has been performed for each of one or more vertical sequences of values (e.g. columns) of the two-dimensional array of values that are perpendicular to the one or more horizontal sequences of values (e.g. rows) from which sections of values were assigned to the plurality of threads in step S1002. It is to be understood that step S1016 could alternatively be performed for each of one or more horizontal sequences of values (e.g. rows) of the two-dimensional array of values, were step S1002 to have been performed for one or more vertical sequences of values (e.g. columns) of the two-dimensional array of values.

In FIG. 8, each perpendicular one-dimensional sequence of values of the array of values 800 is a column of values of the array of values 800. In FIG. 8, the array of values comprises 32 columns of values. Each column of values comprises 32 values. As described herein, each thread may be capable of completing the desired operation for up to eight pixel values. This limit may be caused by the amount of register memory accessible by each thread—and it is to be understood that in other examples each thread may be capable of completing the desired operation for a different number of pixel values (e.g. in some examples, any suitable number of pixel values up to 100, or even more, pixel values). In this example, each column of values is divided into four non-overlapping sections of values, each section of values comprising eight values. The plurality of processed values stored in local memory 106 corresponding to each of said sections of values is assigned to a thread. In FIG. 8, the two-dimensional array of values is divided into 128 sections of values (i.e. 32 columns×4 sections per column), the plurality of processed values stored in local memory 106 corresponding to each section of values being assigned to a respective one of 128 threads—labelled in FIG. 8 as T1 to T128. As described herein, in an example, a warp may comprise up to 128 threads. As such, in this example, one processing element 102 of the processing unit 100 can process, in parallel, said 128 threads to which processed values corresponding to values of the array of values have been assigned. That is, said 128 threads (i.e. T1 to T128 shown in FIG. 8) can be comprised by a warp to be processed by a processing element 102 of the processing unit 100.

FIG. 9 shows a perpendicular one-dimensional sequence of values 900 in further detail. In particular, FIG. 9 shows the first column of values 900 of the array of values 800. The column of values 900 has been divided into four sections, each section comprising eight values. The plurality of processed values stored in local memory 106 corresponding to the values of each of those sections of values have been assigned to threads T1, T9, T17 and T25, respectively. The plurality of processed values assigned to thread T1 correspond to a section of values that neighbour the section of values that correspond to a plurality of processed values assigned to thread T9. The plurality of processed values assigned to thread T9 correspond to a section of values that neighbour the section of values that correspond to the plurality of processed values assigned to thread T1, and also correspond to a section of values that neighbour the section of values that correspond to a plurality of processed values assigned to thread T17. The plurality of processed values assigned to thread T17 correspond to a section of values that neighbour the section of values that correspond to the plurality of processed values assigned to thread T9, and also correspond to a section of values that neighbour the section of values that correspond to a plurality of processed values assigned to thread T25. The plurality of processed values assigned to thread T25 correspond to a section of values that neighbour the section of values that correspond to the plurality of processed values assigned to T17.

In the examples described herein, the same plurality of threads (e.g. threads T1 to T128 shown in FIGS. 4 and 8) are used in the subsequent phase of the operation as are used in the initial phase of the operation. That said, it is be understood that, although convenient to perform the assignments as shown in FIGS. 4 and 8 such that the number of values assigned to each thread in the subsequent phase of the operation is equal to the number of values assigned to each thread in the initial phase of the operation, this need not be the case.

In an alternative example, step S1016 may comprise assigning the processed values generated by a thread in the initial phase of the operation back to that thread for further processing in the subsequent phase of the operation. For example, as described herein, in some examples, a thread may be assigned a section of values from each of more than one one-dimensional sequence of values. Thus, in an alternative example, in step S1002, each of the sections of values labelled T1 to T8 in FIG. 4 may be assigned to one thread (not shown in the Figures). More generally, in this alternative example, in step S1002, a thread may be assigned a number of (e.g. eight) contiguous sections of values in different one-dimensional sequences of values that equals the number of (e.g. eight) values in each section of values that it is assigned. In this alternative example, during the initial phase of the operation, that thread may cooperate according to the principles described herein with one or more neighbouring threads "to its right" in order to generate a plurality of processed values (e.g. one or more neighbouring threads to which the sections of values labelled T9 to T16 in FIG. 4 have been assigned). In this alternative example, in step S1016, the processed values generated by that thread in the initial phase of the operation may be assigned back to that thread for further processing in the subsequent phase of the operation (e.g. that thread may be "assigned" the plurality of processed values corresponding to each of the perpendicular sections of values labelled T1 to T8 in FIG. 8). In this alternative example, said processed values need not be written to local memory 106 between the initial phase and the subsequent phase, and can instead be retained within the one or more registers accessible by that thread between the initial phase and the subsequent phase. In this alternative example, during the subsequent phase of the operation, that thread can cooperate according to the principles described herein with one or more neighbouring threads "from below" in order to generate a plurality of output values (e.g. one or more neighbouring threads to which the sections of values labelled T9 to T16 in FIG. 8 have been assigned).

Returning to FIG. 10, in the method described herein, each thread is to complete the subsequent phase of the operation for each of the values of the plurality of processed values that it has been assigned. To achieve this, first, each thread causes each of the processed values assigned to that thread to be read from local memory 106 into the one or more registers accessible by that thread.

The method then continues to a second pass of steps S1004 to steps S1010 in order to perform the subsequent phase 1000 of the operation. In the subsequent phase of the operation, the same one-dimensional Gaussian filter operation is performed for the plurality of processed values assigned to each of the plurality of threads as was performed for the sections of values assigned to each of the plurality of threads in the initial phase of the operation.

In the subsequent phase, in step S1004, a first thread of the plurality of threads determines at least one contribution, from the plurality of processed values assigned to the first thread, to the subsequent phase of the operation that is to be completed by a second thread of the plurality of threads for a plurality of processed values that correspond with a one-dimensional section of values of the perpendicular one-dimensional sequence of values of the two-dimensional array of values that neighbour the one-dimensional section of values of the perpendicular one-dimensional sequence of values that correspond to the plurality of processed values assigned to the first thread. In a first example, the first thread of the plurality of threads can perform at least one part of the subsequent phase of the separable operation on at least one set of one or more values of the plurality of processed values assigned to the first thread in order to determine at least one contribution, from said at least one set of one or more values, to the subsequent phase of the operation that is to be completed by the second thread of the plurality of threads for the plurality of processed values that correspond with the one-dimensional section of values of the perpendicular one-dimensional sequence of values of the two-dimensional array of values that neighbour the one-dimensional section of values of the perpendicular one-dimensional sequence of values that correspond to the plurality of processed values assigned to the first thread. In a second example, the first thread of the plurality of threads can determine one or more values of the plurality of processed values assigned to the first thread as the at least one contribution, from the plurality of processed values assigned to the first thread, to the subsequent phase of the operation that is to be completed by the second thread of the plurality of threads for the plurality of processed values that correspond with the one-dimensional section of values of the perpendicular one-dimensional sequence of values of the two-dimensional array of values that neighbour the one-dimensional section of values of the perpendicular one-dimensional sequence of values that correspond to the plurality of processed values assigned to the first thread. Step S1004 of the subsequent phase is performed in an analogous way to step S1004 of the initial phase, as described with reference to FIGS. 7a to 7c. That is, for example, threads T9 and T17 as shown in FIG. 8 cooperate with each other in the subsequent phase of the operation in an analogous way to threads T9 and T17 as shown in FIG. 4 cooperate with each other in the initial phase of the operation.

In the subsequent phase, in step S1006, the first thread of the plurality of threads writes the at least one contribution it has determined to the memory. In particular, the first thread of the plurality of threads can write the at least one contribution it has determined to the local memory 106. As described herein, the plurality of threads within the warp can share access to local memory 106.

In the subsequent phase, in step S1008, the second thread of the plurality of threads reads the at least one contribution determined by the first thread from the memory. In particular, the second thread of the plurality of threads can read the at least one contribution determined by the first thread from the local memory 106. The second thread may cause the at least one contribution to be read into the one or more registers accessible by the second thread—such that said registers include the at least one contribution as well as the values assigned to the second thread.

In the subsequent phase, in step S1010, the second thread of the plurality of threads completes the subsequent phase of the separable operation for the plurality of processed values assigned to the second thread in dependence on the at least one contribution determined by the first thread in order to generate a section of output values. Step S1010 of the subsequent phase is performed in an analogous way to step S1010 of the initial phase, as described with reference to FIGS. 7a to 7c. That is, for example, threads T9 and T17 as shown in FIG. 8 cooperate with each other in the subsequent phase of the operation in an analogous way to threads T9 and T17 as shown in FIG. 4 cooperate with each other in the initial phase of the operation.

It is to be understood that, in order to perform the subsequent phase of the operation, each of the threads of the plurality of threads (e.g. each thread shown in FIG. 8) may perform the actions of the "first thread" in steps S1004 to S1006 of the subsequent phase so as to determine at least one contribution to the subsequent phase of the operation to be completed by at least one other thread, and then perform the actions of the "second thread" in steps S1008 to S1010 of the subsequent phase so as to complete the subsequent phase of the operation in dependence on at least one contribution determined by at least one other thread.

In the subsequent phase, in step S1014, it is determined whether the operation is complete. In the illustrative example, in which the array of values to be operated on is a two-dimensional array of pixel values, the operation is a separable two-dimensional Gaussian filter operation, and the initial and subsequent phases of the operation performed in steps S1004 to S1010 were perpendicular one-dimensional Gaussian filter operations, the operation may be determined to be complete after completing the subsequent phase 1000 of steps S1004 to S1010. In this case, the second thread can write the section of output values it has generated to global memory 108. Each of the plurality of threads (e.g. each thread shown in FIG. 8) can write the section of output values that it has generated to global memory 108, such that an output value is written to global memory 108 corresponding to each value of the array of values on which the operation is to be performed. The output values written to global memory 108 corresponding to each value of the array of values can be the output of the method. In examples where a received two-dimensional image has been divided into a plurality of overlapping tiles for inputting to the method, the outputs of the method for each overlapping tile may be re-combined as described herein so as to form a filtered two-dimensional image.

It is advantageous to perform a separable two-dimensional Gaussian filter operation using the method of FIG. 10, rather than using the simple approach described herein. This is because the method described herein is relatively fast, as it involves performing just one sets of reads and one set of writes to global memory 108 to perform the operation—relative to the two sets of reads and two sets of writes to global memory 108 required in the simple approach. Further, in the method of FIG. 10, each value is read from global memory 108 only once—regardless of the number of phases of the operation that are to be performed. This is because each thread completes each phase of the operation for each of the plurality of values it is assigned, and the processed values are stored in local memory 106 between phases. This is in contrast to the simple approach where each value is read from memory many times so that each thread can complete each phase for a single value. The method described herein takes advantage of the ability of threads within the same warp to share access during their processing to local memory 106 dedicated to the processing logic 104 processing those threads.

It is to be understood that the method described herein with reference to FIG. 10 could also be applied to separable multi-dimensional operations performed on arrays of values having more than two dimensions. In these examples, further passes of steps S1016, and S1004 to S1010 may be performed so as to perform further phases of the operation.

Fast Integral Calculations

It is to be understood that method described herein with reference to FIG. 10 is not limited to use in performing separable filter operations, such as separable Gaussian or box filter operations. The method described herein with reference to FIG. 10 could be used to perform other types of separable operation, such as a fast integral calculation operation or any other suitable type of separable operation.

As with a one-dimensional filter operation, a one-dimensional fast integral calculation operation can be performed in multiple phases so as to implement a separable operation on a multi-dimensional array of values. In a one-dimensional fast integral calculation operation, the values in a one-dimensional sequence of values are successively summed such that the first processed value in the processed sequence is equal to the first input value in the input sequence, the second processed value in the processed sequence is equal to a sum of the first and second input values in the input sequence, the third processed value in the processed sequence is equal to a sum of the first, second and third input values in the input sequence, and so on to the final processed value in the processed sequence that is equal to a sum of all of the input values in the input sequence.

A fast integral image calculation operation is a type of fast integral calculation operation that is performed in two phases on a two-dimensional image. When performing a fast integral image calculation operation, the input to the method of FIG. 10 can be two-dimensional array of pixel values.

In some examples in which a received two-dimensional image is sufficiently small, one warp of threads may be capable of performing the desired operation for all of the pixel values of that two-dimensional image. In these examples, the entire two-dimensional image can be input to the method shown in FIG. 10 as a two-dimensional array of pixel values.

In other examples, optionally, a received two-dimensional image can be divided into a plurality of tiles. Each of said plurality of tiles comprises a respective two-dimensional array of pixel values. Unlike in the filter operation examples given above, the tiles need not be overlapping, as edge cases do not occur at the start/end of each sequence of values when performing fast integral image calculation operations. That said, unlike in the filter operation examples given above, it is not always possible for all of the tiles to be processed in parallel when performing fast integral image calculation operations. This is because, in an example where the initial phase is performed horizontally, the final output value of each row of the tile(s) in a first "tile column" of the image is an input to each respective row of the tile(s) in a second "tile column" of the image, the final output value of each row of the tile(s) in a second "tile column" of the image is an input to each respective row of the tile(s) in a third "tile column" of the image, and so on. Hence, when performing fast integral image calculation operations, some of the tiles may be processed in series at a processing unit. The skilled person would be aware of numerous techniques for propagating output values from the processing of a tile in the first "tile column" or "tile row" of an input image for use in the subsequent processing of tiles in the second "tile column" or "tile row" of that image, and so on—e.g. by processing a workgroup comprising a plurality of warps at a processing element of a processing unit, where each of the tiles in a row or column of tiles is processed by a warp of the plurality of warps, and the plurality of warps are processed in series at that processing element, such that a tile in the first "tile column" or "tile row" is processed by a first warp of that workgroup, which then shares its output values via local memory with a second warp of that workgroup that then processes a tile in the second "tile column" or "tile row", and so on—and so these techniques will not be discussed further herein for conciseness.

In the following, an example is discussed in which an entire two-dimensional image can be input to the method shown in FIG. 10 as a two-dimensional array of pixel values to be processed by threads of a warp running in parallel at a single processing element (e.g. core) of a processing unit.

So as to perform an initial phase of the fast integral image calculation operation, in step S1002, for each of the one or more one-dimensional sequences of values of the array of values, a respective section of values of the one-dimensional sequence of values is assigned to each of a plurality of threads. Step S1002 for a fast integral image calculation operation can be performed in the same way as step S1002 is performed for a separable filter operation, as described herein with reference to FIGS. 4 and 5. Each thread causes each of the values included in the section of values assigned to that thread to be read from global memory 108 into the one or more registers in register bank 110 dedicated to that thread (e.g. "its registers").

In step S1004, a first thread of the plurality of threads performs at least one part of the phase of the operation on at least one set of one or more values of the section of values assigned to the first thread in order to determine at least one contribution, from said at least one set of one or more values, to the phase of the operation that is to be completed by a second thread of the plurality of threads for a neighbouring section of values of the one-dimensional sequence of values. For example, with reference to FIGS. 4 and 5, thread T1 can perform a sum of all of the values (e.g. all eight values) in the section of values it has been assigned. This sum is a contribution to the phase of the fast integral image calculation that thread T9 is to complete. When performing fast integral image calculation operation, this sum is also a contribution to the phase of the fast integral calculation that threads T17 and T25 are to complete. Each of threads T1 to T24, T33 to T56, T65 to T88 and T97 to T120 (as shown in FIG. 4) can determine a contribution in this way by performing a sum of all of the values (e.g. all eight values) in the section of values it has been assigned.

In step S1006, the first thread writes the at least one contribution that it has determined to a memory. In particular, the first thread (e.g. T1 in this example) may write the at least one contribution to local memory 106. As described herein, the plurality of threads within the warp can share access to local memory 106. In step S1006, each of the other threads of the plurality of threads can also write any contributions they have determined in step S1004 to local memory 106.

In step S1008, the second thread reads the at least one contribution determined by the first thread from the memory. In particular, the second thread (e.g. T9 in this example) may read the at least one contribution from local memory 106. The second thread may cause the at least one contribution to be read into the one or more registers accessible by the second thread—such that said registers include the at least one contribution as well as the values of the neighbouring section of values assigned to the second thread. For example, thread T9 can read the contribution determined by thread T1 from memory. Also, when performing fast integral image calculation operation: thread T17 can read the contributions determined by threads T1 and T9 from memory, and thread T25 can read the contributions determined by threads T1, T9 and T17 from memory. The same principles apply to the other one dimensional sequences of values (e.g. rows) of the two-dimensional array of values.

In step S1010, the second thread completes the phase of the operation for the neighbouring section of values assigned to the second thread in dependence on the at least one contribution determined by the memory in order to generate a section of processed values. For example: thread T9 can determine a processed value for the first value in the section of values it has been assigned by summing the contribution determined by thread T1 and the first value in the section of values it has been assigned; thread T9 can determine a processed value for the second value in the section of values it has been assigned by summing the contribution determined by thread T1, the first value and the second value in the section of values it has been assigned; and so on, through to thread T9 can determine a processed value for the final (e.g. eighth) value in the section of values it has been assigned by summing the contribution determined by thread T1, and the all of the values in the section of values it has been assigned. Also: thread T17 can determine a processed value for the first value in the section of values it has been assigned by summing the contribution determined by thread T1, the contribution determined by T9 and the first value in the section of values it has been assigned; thread T17 can determine a processed value for the second value in the section of values it has been assigned by summing the contribution determined by thread T1, the contribution determined by T9, the first value and the second value in the section of values it has been assigned; and so on, through to thread T17 can determine a processed value for the final (e.g. eighth) value in the section of values it has been assigned by summing the contribution determined by thread T1, the contribution determined by T9 and all of the values in the section of values it has been assigned. Also: thread T25 can determine a processed value for the first value in the section of values it has been assigned by summing the contribution determined by thread T1, the contribution determined by T9, the contribution determined by T17 and the first value in the section of values it has been assigned; thread T25 can determine a processed value for the second value in the section of values it has been assigned by summing the contribution determined by thread T1, the contribution determined by T9, the contribution determined by T17, the first value and the second value in the section of values it has been assigned; and so on, through to thread T25 can determine a processed value for the final (e.g. eighth) value in the section of values it has been assigned by summing the contribution determined by thread T1, the contribution determined by T9, the contribution determined by T17 and all of the values in the section of values it has been assigned. The same principles apply to the other one dimensional sequences of values (e.g. rows) of the two-dimensional array of values.

In step S1014, it is determined whether the operation is complete. In this example, in which the array of values to be operated on is a two-dimensional array of pixel values, the operation is a separable two-dimensional fast integral image calculation operation, and the phase 1000 of the operation performed in steps S1004 to S1010 is a one-dimensional fast integral image calculation operation, the operation may be determined to not be complete after completing a single (e.g. initial) phase 1000 of steps S1004 to S1010. In this case, the second thread (e.g. thread T9 in this example) can write the section of processed values it has generated to local memory 106. Each of the plurality of threads (e.g. each thread shown in FIG. 4) can write the section of processed values that it has generated to the local memory 106, such that a processed value is written to local memory 106 corresponding to each value of the array of values on which the operation is to be performed. As described herein, the plurality of threads within the warp can share access to local memory 106. Then, the method continues to step S1016.

So as to perform a subsequent phase of the operation, in step S1016, for each of one or more perpendicular one-dimensional sequences of values of the array of values, a respective plurality of processed values from the memory (e.g. local memory 106), said plurality of processed values corresponding to a one-dimensional section of values of the perpendicular one-dimensional sequence of values of the two-dimensional array of values, is assigned to each of the plurality of threads. Step S1016 for a fast integral image calculation operation can be performed in the same way as step S1016 is performed for a separable filter operation, as described herein with reference to FIGS. 8 and 9. As described herein, in some alternative examples, step S1016 may comprise assigning the processed values generated by a thread in the initial phase of the operation back to that thread for further processing in the subsequent phase of the operation.

The method then continues to a second pass of steps S1004 to steps S1010 in order to perform the subsequent phase 1000 of the fast integral image calculation operation. In the subsequent phase of the operation, the same one-dimensional fast integral image calculation operation is performed for the plurality of processed values assigned to each of the plurality of threads as was performed for the sections of values assigned to each of the plurality of threads in the initial phase of the operation. Steps S1004 to steps S1010 of the subsequent phase 1000 of a fast integral image calculation operation are performed in an analogous manner to steps S1004 to steps S1010 of the initial phase 1000 of a fast integral image calculation operation, as described herein.

In step S1014 of the subsequent phase, it is determined whether the operation is complete. In this example, in which the array of values to be operated on is a two-dimensional array of pixel values, the operation is a separable two-dimensional fast integral calculation operation, and the initial and subsequent phases of the operation performed in steps S1004 to S1010 were perpendicular one-dimensional fast integral calculation operations, the operation may be determined to be complete after completing the subsequent phase 1000 of steps S1004 to S1010. In this case, each of the plurality of threads (e.g. each thread shown in FIG. 8) can write the section of output values that it has generated to the global memory 108, such that an output value is written to global memory 108 corresponding to each value of the array of values on which the operation is to be performed. The output values written to global memory 108 corresponding to each value of the array of values can be the output of the method.

It is to be understood that the method described herein with reference to FIG. 10 could also be applied to one-dimensional fast integral calculation operations performed on one-dimensional arrays of values (e.g. a sequence of audio samples of an audio signal, or a sequence of signal samples of a transmitted signal). In these examples, a single pass of steps S1002 to S1014 may be performed so as to perform a single phase of the fast integral calculation operation.

It is also to be understood that the method described herein with reference to FIG. 10 could also be applied to separable multi-dimensional fast integral calculation operations performed on arrays of values having more than two dimensions. In these examples, further passes of steps S1016, and S1004 to S1014 may be performed so as to perform further phases of the fast integral calculation operation.

Writing to/Reading from Memory Between Phases of a Separable Operation

As described herein with reference to FIG. 10, in step S1014 of the initial phase of a separable operation, each of a plurality of threads can cause the values it has processed to be written to memory (e.g. local memory 106). In step S1016, the processed values to be operated on in the subsequent phase of the separable operation can be assigned to the plurality of threads. Then, step S1004 of the subsequent phase of the separable operation can begin with each of the plurality of threads causing the processed values that it has been assigned to be read from memory (e.g. local memory 106) into its registers (e.g. its registers in register bank 110).

Optionally, the latency of a separable operation can be decreased by writing the processed values to memory (e.g. local memory 106) after the initial phase of that separable operation in a prescribed manner—as will be described herein.

Figure 11:
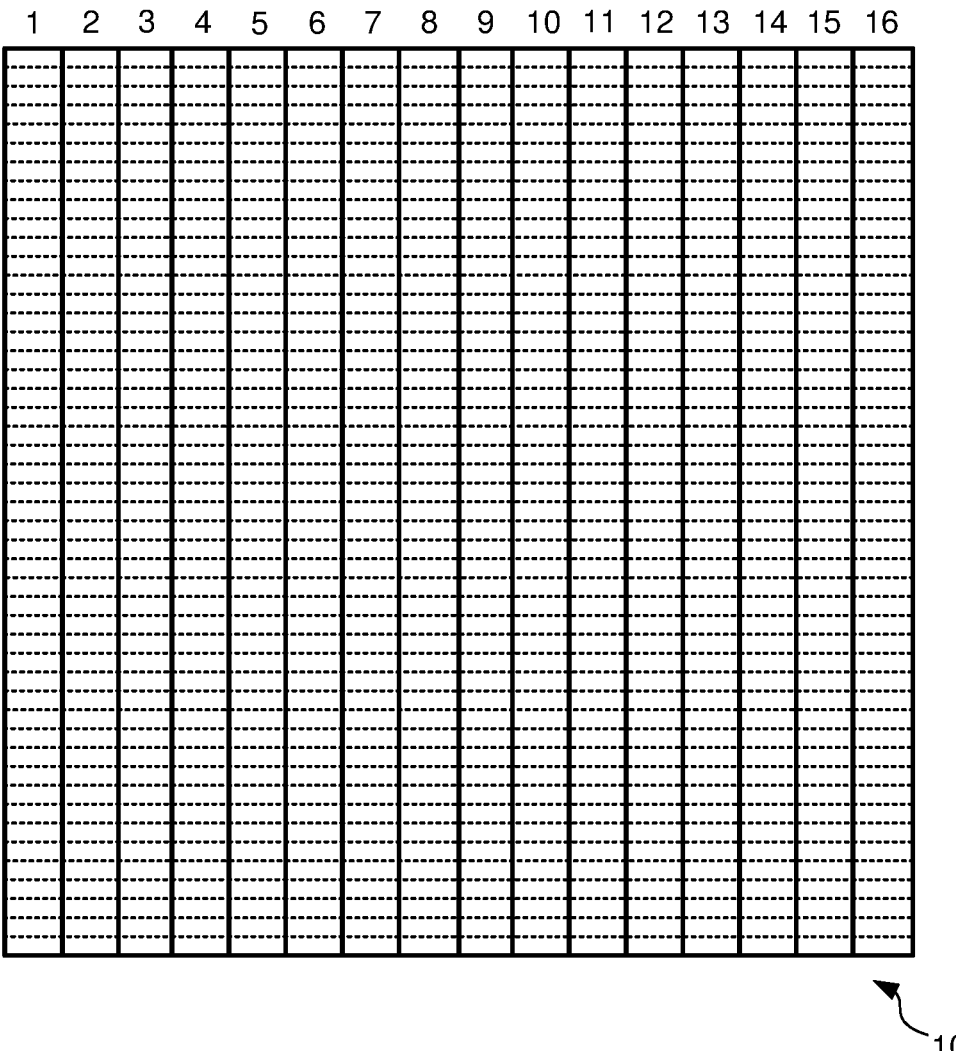
FIG. 11 shows an example memory comprising a plurality of memory banks.

FIG. 11 shows an example memory 106 comprising a plurality of memory banks. Memory 106 shown in FIG. 11 may be "local" memory 106—as defined previously herein with reference to FIGS. 1A and 1B. In particular, memory 106 may be comprised by a processing element (e.g. core) of a processing unit. Memory 106 may be accessible by processing logic of that processing element.

Local memory 106 described herein with reference to FIGS. 1A and 1B may have the same properties as memory 106, as will be described herein with reference to FIG. 11.

Memory 106 shown in FIG. 11 comprises sixteen memory banks—labelled as 1 to 16 in FIG. 11. The sixteen memory banks in FIG. 11 are illustrated as sixteen columns of memory locations. A memory location is a portion of memory into which one value (e.g. one pixel value) can be written. It is to be understood that one value may comprise more than one bit of information. It is to be understood that a memory could comprise any suitable number of memory banks (e.g. 8, 32, 64 or any other suitable number of memory banks). It is to be understood that the number of memory locations illustrated in FIG. 11 is not intended to be limiting—a memory could comprise any suitable number of memory locations. The sixteen memory banks shown in FIG. 11 are each one memory location "wide". That is, each memory bank shown in FIG. 11 can store one value in each of its rows. It is to be understood that a memory bank could be more than one memory location "wide" (e.g. a memory bank could be 2, 4 or any other suitable number of memory locations "wide"). That is, a memory bank could store more than one value in each of its rows.

As described herein, a warp comprising a plurality of threads can be processed by a processing element (e.g. core) comprising processing logic and a memory 106. The plurality of threads within the warp can share access to the memory 106. In other words, each thread of the plurality of threads can cause the processing logic to write values to and/or read values from memory 106.

Excessive Bank Conflicts when Writing Processed Values to Memory after the Initial Phase of a Separable Operation In each writing step (e.g. clock, or instruction) a thread can cause only one value (e.g. pixel value) to be written into memory 106. In each writing step each memory bank can be written into by only one respective thread. A "bank conflict" occurs when each of a plurality of threads attempt to write a respective value into one memory bank in a single writing step. When a bank conflict occurs, said writes into that memory bank are performed over a plurality of writing steps. That said, in each writing step, each of a plurality of different threads can write a respective value into a respective bank of a plurality of different memory banks of the memory. As such, the most efficient (e.g. lowest latency) way for a plurality of threads to write their processed values into a memory is for, in each writing step, a number of different threads equal to the number of memory banks in the memory to each write one respective value into a respective bank of the plurality of memory banks. For example, the most efficient (e.g. lowest latency) way for the plurality of threads shown in FIG. 4 to write their processed values into the memory 106 of FIG. 11 after performing the initial phase of a separable operation is for, in each writing step, 16 different threads to each write one respective value into a respective bank of the 16 different memory banks of memory 106.

In examples where the number of processed values to be written by each thread of a plurality of threads is a factor of or equal to the number of memory banks in a memory, unnecessary bank conflicts can occur when that plurality of threads write their processed values into that memory. This means that, in each writing step, not all of the memory banks of that memory can be written to. This can be understood with reference to FIG. 12A, which shows a plurality of processed values written to memory 106 using a first simple approach. The processed values shown in FIG. 12A are values processed by the plurality of threads as illustrated in FIGS. 4 and 5—in which threads T1 to T128 each process eight respective values (e.g. pixels P1 to P8) in the initial phase of a separable operation as described herein. In this example, the number (i.e. 8) of processed values to be written by each thread of the plurality of threads after performing the initial phase of a separable operation is a factor of the number of memory banks (i.e. 16) in the memory 106. A number of rows of memory locations are omitted for ease of illustration.

The memory bank into which a processed value is to be written can be determined in dependence on a write buffer array. In the first simple approach illustrated in FIG. 12A, the write buffer array may be a one-dimensional sequence of elements comprising: elements corresponding to each the 8 processed values to be written by thread T1 (i.e. T1P1, T1P2 . . . T1P8); followed by elements corresponding to the 8 processed values to be written by thread T2 (i.e. T2P1, T2P2 . . . T2P8); followed by elements corresponding to the 8 processed values to be written by thread T3 (i.e. T3P1, T3P2 . . . T3P8); and so on through to elements corresponding to the 8 processed values to be written by thread T128 (i.e. T128P1, T128P2 . . . T128P8). The write buffer array can be mapped to the memory 106 by mapping the first 16 elements (e.g. the $1^{st}$ to $16^{th}$ values) in the write buffer array to the first row of 16 memory locations, mapping the second 16 elements (e.g. the $17^{th}$ to $32^{nd}$ values) in the write buffer array to the second row of 16 memory locations, and so on. The write buffer array is mapped to the memory such that processed values are written into the memory in the memory locations to which the corresponding elements of the write buffer array are mapped.

As described herein, in each writing step (e.g. clock, or instruction) each thread can cause only one value to be written into memory 106. Thus, in a first writing step, each of threads T1 to T128 attempt to write a respective processed value for their first value (i.e. P1) to memory (i.e. the processed values T1P1, T2P1, T3P1, T4P1, T5P1, T6P1, T7P1, T8P1 through to T128P1). Although it is not possible for all 128 threads to write to the 16 memory banks in memory 106 in a single writing step, it would be preferable if groups of 16 threads of the 128 threads were able to write to the 16 memory banks in memory 106 in each writing step (i.e. such that all 128 of the P1 values are written over 8 writing steps). However, this is also not possible using the first simple approach—as will be understood with reference to FIG. 12A. For example, in a first writing step, thread T1 is attempting to write T1P1 to the same memory bank (e.g. memory bank 1 in FIG. 12A) as: thread T3 is attempting to write T3P1, T5 is attempting to write T5P1, thread T7 is attempting to write T7P1, thread T9 is attempting to write T9P1, thread T11 is attempting to write T11P1, thread T13 is attempting to write T13P1 and thread T15 is attempting to write T15P1. Also in that first writing step, thread T2 is attempting to write T2P1 to the same memory bank (e.g. memory bank 9 in FIG. 12A) as: thread T4 is attempting to write T4P1, T6 is attempting to write T6P1, thread T8 is attempting to write T8P1, T10 is attempting to write T10P1, thread T12 is attempting to write T12P1, T14 is attempting to write T14P1 and thread T16 is attempting to write T16P1. This means that, rather than this group of 16 threads (i.e. threads T1 to T16) writing to 16 different memory banks in one writing step, in this first simple approach the same number of writes are performed by pairs of these 16 threads (i.e. threads (i) T1 and T2, (ii) T3 and T4 and so on to (viii) T15 and T16) writing to two different memory banks over eight writing steps. This is inefficient, as in each writing step only two out of the sixteen memory banks are being written to. A further eight writing steps are required for each of threads T17 to T32 to write a respective processed value for their P1 to memory, and so on through to threads T113 to T128 requiring eight writing steps to write a respective processed value for their P1 to memory. This means that 64 writing steps are required for all 128 of the P1 values to be written into memory 106—rather than 8 writing steps were all 16 memory banks to be written to in each writing step. This inefficient writing process is then repeated seven further times in order for each of the plurality of threads to write each of its other seven processed values (i.e. each of P2 to P8).

Excessive Bank Conflicts when Reading Processed Values from Memory Prior to the Subsequent Phase of a Separable Operation In each reading step (e.g. clock, or instruction) a thread can cause only one value (e.g. pixel value) to be read from memory 106. In each reading step each memory bank can be read from by only one respective thread. A "bank conflict" occurs when each of a plurality of threads attempt to read a respective value from one memory bank in a single reading step. When a bank conflict occurs, said reads from that memory bank are performed over a plurality of reading steps. That said, in each reading step, each of a plurality of different threads can read a respective value from a respective bank of a plurality of different memory banks of the memory. As such, the most efficient (e.g. lowest latency) way for a plurality of threads to read processed values from a memory is for, in each reading step, a number of different threads equal to the number of memory banks in the memory to each read one respective value from a respective bank of the plurality of memory banks. For example, the most efficient (e.g. lowest latency) way for the plurality of threads shown in FIG. 8 to read processed values from the memory 106 of FIG. 11 prior to performing the subsequent phase of a separable operation is for, in each reading step, 16 different threads to each read one respective value from a respective bank of the 16 different memory banks of memory 106.

In examples where the number of processed values to be read by each thread of a plurality of threads is a factor of or equal to the number of memory banks in a memory, unnecessary bank conflicts can occur when that plurality of threads read their processed values from that memory. This means that, in each reading step, not all of the memory banks of that memory can be read from. This can be understood with reference to FIG. 12B, which shows a plurality of processed values written to memory 106 using a second simple approach. The processed values shown in FIG. 12B are values processed by the plurality of threads as illustrated in FIGS. 4 and 5—in which threads T1 to T128 each process eight respective values (e.g. pixels P1 to P8) in the initial phase of a separable operation as described herein. In this example, the number (i.e. 8) of values to be read by each thread of the plurality of threads (e.g. arranged as shown in FIG. 8) prior to performing the subsequent phase of the separable operation is a factor of the number of memory banks (i.e. 16) in the memory. A number of rows of memory locations are omitted for ease of illustration.

As described herein, the memory bank into which a processed value is to be written can be determined in dependence on a write buffer array. In the second simple approach illustrated in FIG. 12B, the write buffer array may be a one-dimensional sequence of elements comprising: elements corresponding to the first processed value P1 of each of threads T1 to T8 (i.e. T1P1, T2P1 . . . T8P1); followed by elements corresponding to the second processed value P2 for each of threads T1 to T8 (i.e. T1P2, T2P2 . . . T8P2); and so on through to elements corresponding to the eighth processed value P8 for each of threads T1 to T8 (i.e. T1P8, T2P8 . . . T8P8); followed by elements corresponding to the first processed value P1 of each of threads T9 to T16 (i.e. T9P1, T10P1 . . . T16P1); followed by elements corresponding to the second processed value P2 of each of threads T9 to T16 (i.e. T9P2, T10P2 . . . T16P2); and so on through to elements corresponding to the eighth processed value P8 for each of threads T9 to T16 (i.e. T9P8, T10P8 . . . T16P8); and so on through to elements corresponding to the eighth processed value P8 for each of threads T121 to T128 (i.e. T121P8, T122P8 . . . T128P8). The write buffer array can be mapped to the memory 106 by mapping the first 16 elements (e.g. the $1^{st}$ to $16^{th}$ values) in the write buffer array to the first row of 16 memory locations, mapping the second 16 elements (e.g. the $17^{th}$ to $32^{nd}$ values) in the write buffer array to the second row of 16 memory locations, and so on. The write buffer array is mapped to the memory such that processed values are written into the memory in the memory locations to which the corresponding elements of the write buffer array are mapped.

Prior to the subsequent phase of the operation, thread T1 shown in FIG. 8 reads processed values T1P1, T2P1, T3P1, T4P1, T5P1, T6P1, T7P1 and T8P1 from memory 106. This can be understood by comparing the positions within the array of the values assigned to threads T1 to T8 in the initial phase as shown in FIG. 4, with the positions within the array of the values corresponding to the processed values assigned to thread T1 in the subsequent phase as shown in FIG. 8. Applying the same principles: thread T2 shown in FIG. 8 reads processed values T1P2, T2P2, T3P2, T4P2, T5P2, T6P2, T7P2 and T8P2; thread T3 shown in FIG. 8 reads processed values T1P3, T2P3, T3P3, T4P3, T5P3, T6P3, T7P3 and T8P3; thread T4 shown in FIG. 8 reads processed values T1 P4, T2P4, T3P4, T4P4, T5P4, T6P4, T7P4 and T8P4; thread T5 shown in FIG. 8 reads processed values T1 P5, T2P5, T3P5, T4P5, T5P5, T6P5, T7P5 and T8P5; thread T6 shown in FIG. 8 reads processed values T1 P6, T2P6, T3P6, T4P6, T5P6, T6P6, T7P6 and T8P6; thread T7 shown in FIG. 8 reads processed values T1P7, T2P7, T3P7, T4P7, T5P7, T6P7, T7P7 and T8P7; and thread T8 shown in FIG. 8 reads processed values T1P8, T2P8, T3P8, T4P8, T5P8, T6P8, T7P8 and T8P8. For conciseness, the processed values read by each of the other threads shown in FIG. 8 prior to the subsequent phase of the separable operation will not be exhaustively listed here. The skilled person would have no difficulty determining which processed values are read by each of the other threads shown in FIG. 8 by comparing FIGS. 4 and 8 as described herein.

As described herein, in each reading step (e.g. clock, or instruction) a thread can cause only one value (e.g. pixel value) to be read from memory 106. Thus, in a first reading step, each of threads T1 to T128 as shown in FIG. 8 attempt to read a respective processed value from memory. Although it is not possible for all 128 threads to read from the 16 memory banks in memory 106 in a single reading step, it would be preferable if groups of 16 threads of the 128 threads were able to read from the 16 memory banks in memory 106 in each reading step (i.e. such that all 128 of the threads read in a respective processed value over 8 reading steps). However, this is also not possible using the second simple approach—as will be understood with reference to FIG. 12B. For example, in a first reading step, thread T1 is attempting to read T1P1 from the same memory bank (e.g. memory bank 1 in FIG. 12B) as: thread T3 is attempting to read T1 P3; thread T5 is attempting to read T1 P5; thread T7 is attempting to read T1 P7; thread T33 is attempting to read T9P1; thread T35 is attempting to read T9P3; thread T37 is attempting to read T9P5; and thread T39 is attempting to read T9P7. Also in that first reading step, thread T2 is attempting to read T1P2 from the same memory bank (e.g. memory bank 9 in FIG. 12B) as: thread T4 is attempting to read T1 P4; thread T6 is attempting to read T1 P6; thread T8 is attempting to read T1 P8; thread T34 is attempting to read T9P2; thread T36 is attempting to read T9P4; thread T38 is attempting to read T9P6; and thread T40 is attempting to read T9P8. This means that, rather than this group of 16 threads (i.e. threads T1 to T8 and T33 to T40) reading from 16 different memory banks in one reading step, in this second simple approach the same number of reads are performed by pairs of these 16 threads (i.e. threads (i) T1 and T2, (ii) T3 and T4 and so on to (viii) T39 and T40) reading from two different memory banks over eight reading steps. This is inefficient, as in each reading step only two out of the sixteen memory banks are being read from. This means that 64 reading steps are required for all 128 of the threads to read in one respective processed value—rather than 8 reading steps were all 16 memory banks to be read from in each reading step. This inefficient reading process is then repeated seven further times in order for each of the plurality of threads to read in the other seven of the processed values assigned to it.

Avoiding Excessive Bank Conflicts when Writing to/Reading from Memory Between Phases of a Separable Operation Described herein with reference to FIG. 13 is a computer-implemented method of performing a separable operation on a two-dimensional array of values at a processing unit comprising a memory. The separable operation may be any of the separable operations described herein (e.g. a separable Gaussian filter operation, a separable box filter operation or a separable fast integral calculation operation) or any other suitable type of separable operation. Said method can be used to both: (i) minimise the number of bank conflicts caused when writing processed values to memory (e.g. local memory 106) after the initial phase of a separable operation; and (ii) minimise the number of bank conflicts caused when reading those processed values from that memory (e.g. local memory 106) prior to the subsequent phase of that separable operation. As such, said method can reduce the latency associated with performing the separable operation.

The input to the method shown in FIG. 13 is a two-dimensional array of values. The two-dimensional array of values input to the method shown in FIG. 13 can have the same properties as any of the two-dimensional array of values as discussed herein that can be input to the method shown in FIG. 10.

Figure 14:
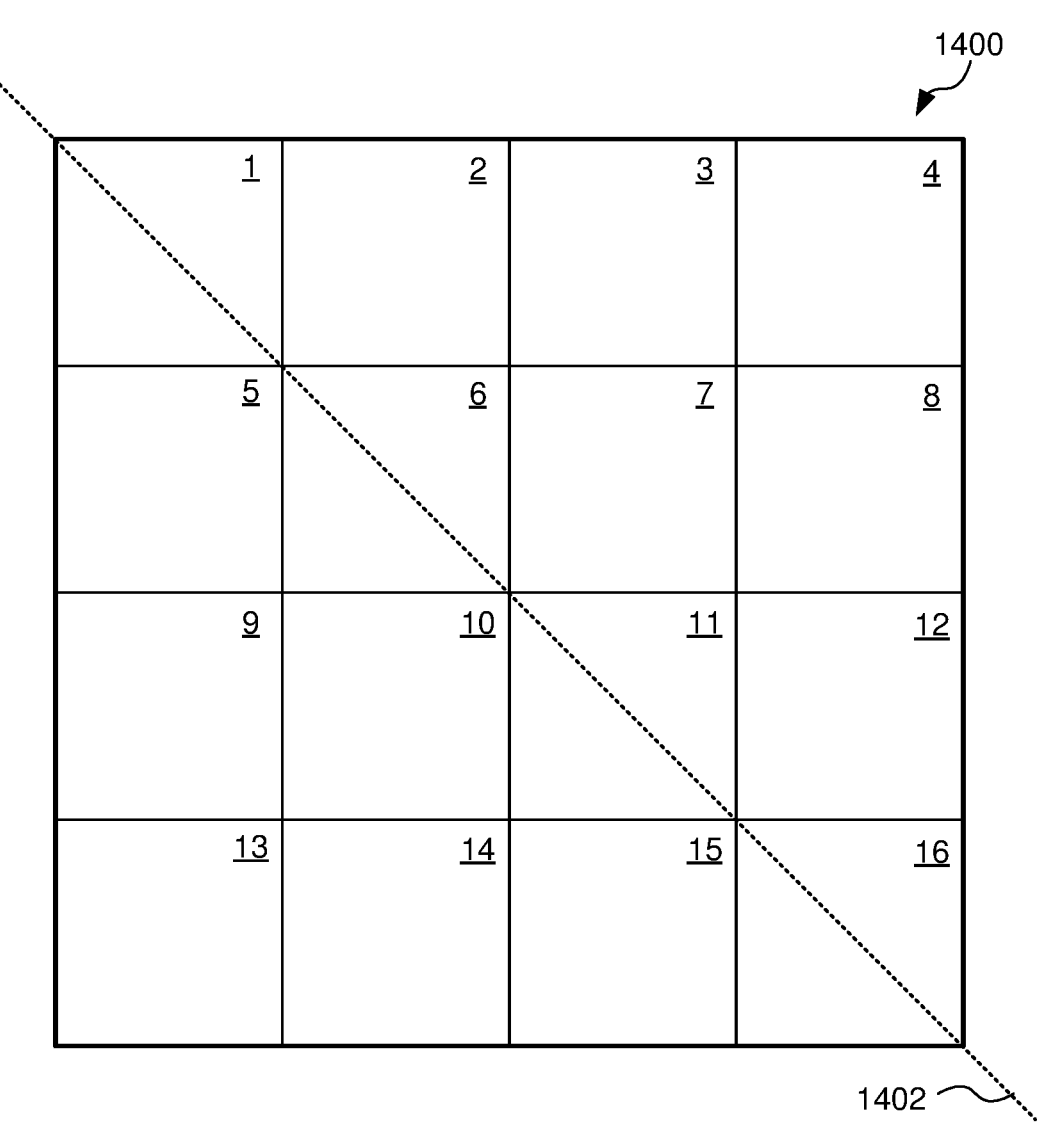
FIG. 14 shows an array of values divided into a plurality of sub-arrays of values.

In step S1302, the two-dimensional array of values input to the method is divided into a plurality of two-dimensional sub-arrays of values (e.g. cells). This step can be understood with reference to FIG. 14—which shows a two-dimensional array of values 1400 divided into a plurality of two-dimensional sub-arrays of values 1 to 16. The two-dimensional sub-arrays of values may be non-overlapping. In FIG. 14, the two-dimensional array of values is square and each of the two-dimensional sub-arrays of values are square. In FIG. 14, the number of sub-arrays in each row of the array equals the number of sub-arrays in each column of the array. The two-dimensional array of values divided into a plurality of two-dimensional sub-arrays of values can be represented by a multidimensional array [I][J][K][M], where I and J represent the number of sub-arrays of values within the array of values in each of the two dimensions and K and M represent the number of values within each of the sub-arrays of values in each of the two dimensions. For example, in the illustrative example described herein with reference to FIGS. 4, 5, 8, 9 and 14, the multidimensional array can be represented by [4][4][8][8]. That is, I represents the number of rows of sub-arrays, J represents the number of columns of sub-arrays, K represents the number of rows within each sub-array, and M represents the number of columns within each sub-array.

In step S1304, for each of the plurality of sub-arrays, using a plurality of threads, an initial phase of the separable operation is performed for said sub-array of values in order to generate a respective processed value for each value of said sub-array of values. Step S1304 can be performed by performing steps S1002 to S1010 as described herein with reference to FIG. 10. For example: an initial phase of the separable operation can be performed for sub-array 1 as shown in FIG. 14 by using threads T1 to T8 as shown in FIG. 4; an initial phase of the separable operation can be performed for sub-array 2 as shown in FIG. 14 by using threads T9 to T16 as shown in FIG. 4; and so on through to an initial phase of the separable operation can be performed for sub-array 16 as shown in FIG. 14 by using threads T121 to T128 as shown in FIG. 4.

In step S1306, for each of the plurality of sub-arrays, each of the plurality of threads writes a respective first plurality of processed values to a memory (e.g. memory 106 shown in FIG. 11) over a plurality of writing steps, said first plurality of processed values corresponding to a one-dimensional sequence of values of said sub-array of values. For example, with reference to FIGS. 4, 5 and 14, thread T1 writes eight processed values (e.g. T1P1, T1P2, T1P3, T1P4, T1P5, T1P6, T1 P7 and T1 P8) corresponding to the eight values within a one-dimensional sequence of values (e.g. row) of sub-array 1 for which it performed the initial phase of the separable operation. For conciseness, the processed values written by each of the other threads shown in FIG. 4 for each of the sub-arrays shown in FIG. 14 will not be exhaustively listed here. By referring to FIGS. 4 and 14, the skilled person would have no difficulty determining which processed values are written for each of the sub-arrays by each of the other threads.

As described herein, the memory bank into which a processed value is to be written can be determined in dependence on a write buffer array. According to the principles described herein, in step S1306, the memory bank into which a processed value is to be written can be determined in dependence on a write buffer array having a number of elements greater than the number of elements in the two-dimensional array of values. For example, in the illustrative example described herein, the two-dimensional array of values comprises 1024 elements, and so the write buffer array used in step S1306 comprises greater than 1024 elements. The write buffer array may comprise value elements corresponding to values of the two-dimensional array, and padding elements corresponding to memory padding. More specifically, the write buffer array may comprise groups of contiguous value elements corresponding to values of the two-dimensional array, and padding elements interspersed between said groups. The number of value elements in each group may be (i) equal to, (ii) a multiple of, or (iii) a factor of the number of memory banks comprised by the memory. For example, memory 106 comprises 16 memory banks, and so the number of value elements in each group may be (i) 16, (ii) a multiple of 16, such as 32, 64 or 128, or (iii) a factor of 16 such as 8. The number of value elements in each group may be equal to or less than the number of threads used to perform the separable operation for the array of values. For example, in the illustrative example described herein, 128 threads are used to perform the separable operation for the array of values. In this example, the number of value elements in each group of the write buffer array may be equal to or less than 128.

In examples where each memory bank in the memory is one memory location "wide" (e.g. as in memory 106 shown in FIG. 11), at least one padding element may be interspersed between the groups of value elements. In examples where each memory bank in the memory is more than one memory location "wide", a plurality of contiguous padding elements may be interspersed between the groups of contiguous value elements. In other words, the number of contiguous padding elements interspersed between the groups of contiguous value elements may be greater than or equal to the number of memory locations in each row of a memory bank in the memory.

The write buffer array may be a one-dimensional array—e.g. a one-dimensional sequence of elements. In order to determine which memory bank each processed value is to be written into, the write buffer array may be mapped to the structure of the memory accessible by the processing logic. For example, the write buffer array can be mapped to the structure of memory 106 of FIG. 11 by mapping the first 16 elements (e.g. the $1^{st}$ to $16^{th}$ values) in the write buffer array to the first row of 16 memory locations, mapping the second 16 elements (e.g. the $17^{th}$ to $32^{nd}$ values) in the write buffer array to the second row of 16 memory locations, and so on. It is to be understood that the write buffer array need not be mapped to the structure of memory 106 starting from the first (e.g. "top-left") memory location of the memory 106. That is, the write buffer array can be mapped to the structure of memory 106 starting from any suitable memory location in memory 106.

In step S1306, the write buffer array can be mapped to the memory such that processed values corresponding to values of the two-dimensional array are written into the memory in memory locations to which the value elements of the write buffer array are mapped, and processed values corresponding to values of the two-dimensional array are not written to the memory in memory locations to which the padding elements of the write buffer array are mapped. Any other information (e.g. one or more "0" bits, or any arbitrary value) may be written to the memory in memory locations to which the padding elements of the write buffer array are mapped. Alternatively, the memory locations to which the padding elements of the write buffer array are mapped may not be written to at all (e.g. those memory locations may be "left blank").

The memory location into which a thread writes a processed value in step S1306 can be determined in dependence on a base memory address, a writing offset amount and a writing padding amount. The memory location into which a thread writes a processed value may be determined in dependence on a sum of the base memory address, the writing offset amount and the writing padding amount. Said sum may be used to determine the element of the write buffer array to which the processed value to be written corresponds. The base memory address may be the first element within the write buffer array.

The writing offset amount and the writing padding amount can be dependent on the position of the value within the array of values to which the processed value that is to be written to memory corresponds. For example, each value in the array of values may be assigned a coordinate [i][j][k][m]—defined using zero indexing (i.e. so that the first sub-array or value in a row or column is assigned a "0" coordinate for that row or column dimension)—which defines its position within the multidimensional array [I][J][K][M] as defined herein. The writing offset amount for a processed value to be written may be a function of the coordinate [i][j][k][m] of the value to which that processed value corresponds. That is, i represents the row of sub-arrays in which the sub-array comprising the value is positioned, j represents the column of sub-arrays in which the sub-array comprising the value is positioned, k represents the row of the sub-array in which the value is positioned, and m represents the column of the sub-array in which the value is positioned. In some examples, referring to FIG. 4, value T1P1 has a coordinate [0][0][0][0], value T1P2 has a coordinate [0][0][0][1], value T9P1 has a coordinate [0][1][0][0], value T78P3 has a coordinate [2][1][5][2], and value T128T6 has as a coordinate [3][3][7][5].

Non-limiting examples of suitable writing offset amounts are provided below.

The writing padding amount can be equal to the writing offset amount divided by a padding frequency. Said division may be an integer division. An integer division comprises dividing a first number by a second number and returning the integer part of the result as the output. For example, an integer division of 53 by 8 would equal 6 (e.g. the "remainder" of 5 is not returned as part of the output). The padding frequency may be (i) equal to, (ii) a multiple of, or (iii) a factor of the number of memory banks comprised by the memory. For example, memory 106 comprises 16 memory banks, and so the padding frequency may be (i) 16, (ii) a multiple of 16, such as 32, 64 or 128, or (iii) a factor of 16 such as 8. The padding frequency may be equal to or less than the number of threads used to perform the separable operation for the array of values. For example, in the illustrative example described herein, 128 threads used to perform the separable operation for the array of values. In this example, the padding frequency may be equal to or less than 128. The padding frequency may also be a power of two, i.e. it is $2^n$ where n is an integer. This means that the division of 1 by this number can be performed as a right shift of the bits, rather than having to perform a full division calculation which is inefficient to implement in hardware.

It is to be understood that the write buffer array may exist in a physical memory (e.g. may be implemented in registers in register bank 110) such that the processed values generated by the treads in step S1304 are physically written into that write buffer array, before the contents of that write buffer array are transferred to the memory (e.g. memory 106). Alternatively, the write buffer array may be a construct that is conceptually used by the threads to determine which memory location in memory each processed value generated in step S1304 is to be written, where the processed values are physically written directly from the respective one or more registers accessible by each thread into the determined memory locations in memory (e.g. memory 106).

In step S1306, by applying the principles described herein, a respective processed value is written into each of the memory banks of the memory (e.g. memory 106 of FIG. 11) in at least one of the plurality of writing steps. In particular, by applying the principles described herein, a respective processed value may be written into each of the memory banks of the memory (e.g. memory 106 of FIG. 11) in each of the plurality of writing steps. That is, excessive bank conflicts are avoided during writing in step S1306.

In the following, four specific examples are provided which illustrate the memory locations in memory 106 to which the plurality of threads could write processed values by applying the principles described herein. It is to be understood that these specific implementations are provided by way of example only, and that the principles described herein could be applied differently.

Example 1

Example 1 can be understood with reference to FIG. 15A—which shows a plurality of processed values written to memory 106 using a first approach according to the principles described herein. The processed values shown in FIG. 15A are values processed by the plurality of threads as illustrated in FIGS. 4 and 5—in which threads T1 to T128 each process eight respective values (e.g. pixels P1 to P8) in the initial phase of a separable operation as described herein.

In Example 1, the write buffer array used to determine which memory location in memory 106 each processed value is to be written to comprises groups of eight contiguous value elements corresponding to values of the two-dimensional array, with one padding element interspersed between each of said groups. In Example 1, the write buffer array is a one-dimensional sequence of elements comprising: value elements corresponding to the 8 processed values to be written by thread T1 (i.e. T1P1, T1P2 . . . T1P8); followed by a padding element; followed by value elements corresponding to the 8 processed values to be written by thread T2 (i.e. T2P1, T2P2 . . . T2P8); followed by a padding element; followed by value elements corresponding to the 8 processed values to be written by thread T3 (i.e. T3P1, T3P2 . . . T3P8); followed by a padding element; and so on through to value elements corresponding to the 8 processed values to be written by thread T128 (i.e. T128P1, T128P2 . . . T128P8).

As described herein, the memory location into which a thread writes a processed value in step S1306 can be determined in dependence on a sum of a base memory address, a writing offset amount and a writing padding amount. Said sum may be used to determine the element of the write buffer array to which the processed value to be written corresponds—where the base memory address is the first element within that write buffer array. In Example 1, for a value having a coordinate [i][j][k][m] within a multidimensional array [I][J][K][M], the writing offset amount is equal to $(i \times J \times K \times M)+(j \times K \times M)+(k \times M)+m$, and the writing padding amount is equal to the writing offset amount divided by 8 (the padding frequency). Said division may be an integer division.

FIG. 15A illustrates the contents of the memory 106 when this write buffer array is mapped to the memory 106 such that processed values corresponding to values of the two-dimensional array are written into the memory 106 in memory locations to which the corresponding value elements of the write buffer array are mapped, and processed values corresponding to values of the two-dimensional array are not written to the memory 106 in memory locations to which the padding elements of the write buffer array are mapped. In FIG. 15A, memory locations to which the padding elements of the write buffer array are mapped are indicated by "X". A number of rows of memory locations are omitted for ease of illustration.

In Example 1, a respective processed value can be written into each of the memory banks of the memory (e.g. memory 106 of FIG. 11) in at least one of the plurality of writing steps. For example, referring to FIG. 15A, in one writing step: thread T1 can write T1P1 into memory bank 1; thread T2 can write T2P1 into memory bank 10; thread T3 can write T3P1 into memory bank 3; thread T4 can write T4P1 into memory bank 12; thread T5 can write T5P1 into memory bank 5; thread T6 can write T6P1 into memory bank 14; thread T7 can write T7P1 into memory bank 7; thread T8 can write T8P1 into memory bank 16; thread T9 can write T9P1 into memory bank 9; thread T10 can write T10P1 into memory bank 2; thread T11 can write T11 P1 into memory bank 11; thread T12 can write T12P1 into memory bank 4; thread T13 can write T13P1 into memory bank 13; thread T14 can write T14P1 into memory bank 6; thread T15 can write T15P1 into memory bank 15; and thread T16 can write T16P1 into memory bank 8.

This first approach is efficient, as groups of 16 threads of the 128 threads are able to write to the 16 memory banks in memory 106 in each writing step (i.e. such that all 128 of the P1 values are written over 8 writing steps). This efficient writing process can then be repeated seven further times in order for each of the plurality of threads to write each of its other seven processed values (i.e. each of P2 to P8).

Example 2

Example 2 can be understood with reference to FIG. 15B—which shows a plurality of processed values written to memory 106 using a second approach according to the principles described herein. The processed values shown in FIG. 15B are values processed by the plurality of threads as illustrated in FIGS. 4 and 5—in which threads T1 to T128 each process eight respective values (e.g. pixels P1 to P8) in the initial phase of a separable operation as described herein.

In Example 2, the write buffer array used to determine which memory location in memory 106 each processed value is to be written to comprises groups of sixteen contiguous value elements corresponding to values of the two-dimensional array, with one padding element interspersed between each of said groups. In Example 2, the write buffer array is a one-dimensional sequence of elements comprising: value elements corresponding to the 8 processed values to be written by thread T1 (i.e. T1P1, T1 P2 . . . T1 P8); followed by value elements corresponding to the 8 processed values to be written by thread T2 (i.e. T2P1, T2P2 . . . T2P8); followed by a padding element; followed by value elements corresponding to the 8 processed values to be written by thread T3 (i.e. T3P1, T3P2 . . . T3P8); followed by value elements corresponding to the 8 processed values to be written by thread T4 (i.e. T4P1, T4P2 . . . T4P8); followed by a padding element; and so on through to value elements corresponding to the 8 processed values to be written by thread T128 (i.e. T128P1, T128P2 . . . T128P8).

As described herein, the memory location into which a thread writes a processed value in step S1306 can be determined in dependence on a sum of a base memory address, a writing offset amount and a writing padding amount. Said sum may be used to determine the element of the write buffer array to which the processed value to be written corresponds—where the base memory address is the first element within that write buffer array. In Example 2, for a value having a coordinate [i][j][k][m] within a multidimensional array [I][J][K][M], the writing offset amount is equal to $(i{\times}J{\times}K{\times}M)+(j{\times}K{\times}M)+(k{\times}M)+m$, and the writing padding amount is equal to the writing offset amount divided by 16 (the padding frequency). Said division may be an integer division.

FIG. 15B illustrates the contents of the memory 106 when this write buffer array is mapped to the memory 106 such that processed values corresponding to values of the two-dimensional array are written into the memory 106 in memory locations to which the corresponding value elements of the write buffer array are mapped, and processed values corresponding to values of the two-dimensional array are not written to the memory 106 in memory locations to which the padding elements of the write buffer array are mapped. In FIG. 15B, memory locations to which the padding elements of the write buffer array are mapped are indicated by "X". A number of rows of memory locations are omitted for ease of illustration.

In Example 2, a respective processed value can be written into each of the memory banks of the memory (e.g. memory 106 of FIG. 11) in at least one of the plurality of writing steps. For example, referring to FIG. 15B, in one writing step: thread T1 can write T1P1 into memory bank 1; thread T2 can write T2P1 into memory bank 9; thread T3 can write T3P1 into memory bank 2; thread T4 can write T4P1 into memory bank 10; thread T5 can write T5P1 into memory bank 3; thread T6 can write T6P1 into memory bank 11; thread T7 can write T7P1 into memory bank 4; thread T8 can write T8P1 into memory bank 12; thread T9 can write T9P1 into memory bank 5; thread T10 can write T10P1 into memory bank 13; thread T11 can write T11 P1 into memory bank 6; thread T12 can write T12P1 into memory bank 14; thread T13 can write T13P1 into memory bank 7; thread T14 can write T14P1 into memory bank 15; thread T15 can write T15P1 into memory bank 8; and thread T16 can write T16P1 into memory bank 16.

This second approach is efficient, as groups of 16 threads of the 128 threads are able to write to the 16 memory banks in memory 106 in each writing step (i.e. such that all 128 of the P1 values are written over 8 writing steps). This efficient writing process can then be repeated seven further times in order for each of the plurality of threads to write each of its other seven processed values (i.e. each of P2 to P8).

Example 3

Example 3 can be understood with reference to FIG. 15C—which shows a plurality of processed values written to memory 106 using a third approach according to the principles described herein. The processed values shown in FIG. 15C are values processed by the plurality of threads as illustrated in FIGS. 4 and 5—in which threads T1 to T128 each process eight respective values (e.g. pixels P1 to P8) in the initial phase of a separable operation as described herein.

In Example 3, the write buffer array used to determine which memory location in memory 106 each processed value is to be written to comprises groups of 32 contiguous value elements corresponding to values of the two-dimensional array, with one padding element interspersed between each of said groups. In Example 3, the write buffer array is a one-dimensional sequence of elements comprising: value elements corresponding to the 8 processed values to be written by thread T1 (i.e. T1P1, T1 P2 . . . T1 P8); followed by value elements corresponding to the 8 processed values to be written by thread T2 (i.e. T2P1, T2P2 . . . T2P8); followed by value elements corresponding to the 8 processed values to be written by thread T3 (i.e. T3P1, T3P2 . . . T3P8); followed by value elements corresponding to the 8 processed values to be written by thread T4 (i.e. T4P1, T4P2 . . . T4P8); followed by a padding element; followed by value elements corresponding to the 8 processed values to be written by thread T5 (i.e. T5P1, T5P2 . . . T5P8); followed by value elements corresponding to the 8 processed values to be written by thread T6 (i.e. T6P1, T6P2 . . . T6P8); followed by value elements corresponding to the 8 processed values to be written by thread T7 (i.e. T7P1, T7P2 . . . T7P8); followed by value elements corresponding to the 8 processed values to be written by thread T8 (i.e. T8P1, T8P2 . . . T8P8); followed by a padding element; and so on through to value elements corresponding to the 8 processed values to be written by thread T128 (i.e. T128P1, T128P2 . . . T128P8).

As described herein, the memory location into which a thread writes a processed value in step S1306 can be determined in dependence on a sum of a base memory address, a writing offset amount and a writing padding amount. Said sum may be used to determine the element of the write buffer array to which the processed value to be written corresponds—where the base memory address is the first element within that write buffer array. In Example 3, for a value having a coordinate [i][j][k][m] within a multidimensional array [I][J][K][M], the writing offset amount is equal to $(i \times J \times K \times M) + (j \times K \times M) + (k \times M) + m$, and the writing padding amount is equal to the writing offset amount divided by 32 (the padding frequency). Said division may be an integer division.

FIG. 15C illustrates the contents of the memory 106 when this write buffer array is mapped to the memory 106 such that processed values corresponding to values of the two-dimensional array are written into the memory 106 in memory locations to which the corresponding value elements of the write buffer array are mapped, and processed values corresponding to values of the two-dimensional array are not written to the memory 106 in memory locations to which the padding elements of the write buffer array are mapped. In FIG. 15C, memory locations to which the padding elements of the write buffer array are mapped are indicated by "X". A number of rows of memory locations are omitted for ease of illustration.

In Example 3, a respective processed value can be written into each of the memory banks of the memory (e.g. memory 106 of FIG. 11) in at least one of the plurality of writing steps. For example, referring to FIG. 15C, in one writing step: thread T1 can write T1P1 into memory bank 1; thread T2 can write T2P1 into memory bank 9; thread T5 can write T5P1 into memory bank 2; thread T6 can write T6P1 into memory bank 10; thread T9 can write T9P1 into memory bank 3; thread T10 can write T10P1 into memory bank 11; thread T13 can write T13P1 into memory bank 4; thread T14 can write T14P1 into memory bank 12; thread T17 can write T17P1 into memory bank 5; thread T18 can write T18P1 into memory bank 13; thread T21 can write T21 P1 into memory bank 6; thread T22 can write T22P1 into memory bank 14; thread T25 can write T25P1 into memory bank 7; thread T26 can write T26P1 into memory bank 15; thread T29 can write T29P1 into memory bank 8; and thread T30 can write T30P1 into memory bank 16.

This third approach is efficient, as groups of 16 threads of the 128 threads are able to write to the 16 memory banks in memory 106 in each writing step (i.e. such that all 128 of the P1 values are written over 8 writing steps). This efficient writing process can then be repeated seven further times in order for each of the plurality of threads to write each of its other seven processed values (i.e. each of P2 to P8).

Example 4

Example 4 can be understood with reference to FIG. 15D—which shows a plurality of processed values written to memory 106 using a fourth approach according to the principles described herein. The processed values shown in FIG. 15D are values processed by the plurality of threads as illustrated in FIGS. 4 and 5—in which threads T1 to T128 each process eight respective values (e.g. pixels P1 to P8) in the initial phase of a separable operation as described herein.

In Example 4, the write buffer array used to determine which memory location in memory 106 each processed value is to be written to comprises groups of 16 contiguous value elements corresponding to values of the two-dimensional array, with one padding element interspersed between each of said groups. In Example 4, the write buffer array is a one-dimensional sequence of elements comprising: value elements corresponding to the first processed value P1 of each of threads T1 to T8 of sub-array 1 (i.e. T1P1, T2P1 . . . T8P1); followed by value elements corresponding to the second processed value P2 for each of threads T1 to T8 of sub-array 1 (i.e. T1 P2, T2P2 . . . T8P2); followed by a padding element; followed by value elements corresponding to the third processed value P3 of each of threads T1 to T8 of sub-array 1 (i.e. T1P3, T2P3 . . . T8P3); followed by value elements corresponding to the fourth processed value P4 for each of threads T1 to T8 of sub-array 1 (i.e. T1P4, T2P4 . . . T8P4); followed by a padding element; and so on through to value elements corresponding to the eighth processed value P8 for each of threads T1 to T8 of sub-array 1 (i.e. T1P8, T2P8 . . . T8P8); followed by a padding element; followed by value elements corresponding to the first processed value P1 of each of threads T9 to T16 of sub-array 2 (i.e. T9P1, T10P1 . . . T16P1); followed by value elements corresponding to the second processed value P2 of each of threads T9 to T16 of sub-array 2 (i.e. T9P2, T10P2 . . . T16P2); followed by a padding element; and so on through to elements corresponding to the eighth processed value P8 for each of threads T9 to T16 of sub-array 2 (i.e. T9P8, T10P8 . . . T16P8); followed by a padding element; and so on through to elements corresponding to the eighth processed value P8 for each of threads T121 to T128 of sub-array 16 (i.e. T121P8, T122P8 . . . T128P8).

As described herein, the memory location into which a thread writes a processed value in step S1306 can be determined in dependence on a sum of a base memory address, a writing offset amount and a writing padding amount. Said sum may be used to determine the element of the write buffer array to which the processed value to be written corresponds—where the base memory address is the first element within that write buffer array. In Example 4, for a value having a coordinate [i][j][k][m] within a multidimensional array [I][J][K][M], the writing offset amount is equal to $(i \times J \times K \times M) + (j \times K \times M) + (m \times K) + k$, and the writing padding amount is equal to the writing offset amount divided by 16 (the padding frequency). Said division may be an integer division.

FIG. 15D illustrates the contents of the memory 106 when this write buffer array is mapped to the memory 106 such that processed values corresponding to values of the two-dimensional array are written into the memory 106 in memory locations to which the corresponding value elements of the write buffer array are mapped, and processed values corresponding to values of the two-dimensional array are not written to the memory 106 in memory locations to which the padding elements of the write buffer array are mapped. In FIG. 15D, memory locations to which the padding elements of the write buffer array are mapped are indicated by "X". A number of rows of memory locations are omitted for ease of illustration.

In Example 4, a respective processed value can be written into each of the memory banks of the memory (e.g. memory 106 of FIG. 11) in at least one of the plurality of writing steps. For example, referring to FIG. 15D, in one writing step: thread T1 can write T1P1 into memory bank 1; thread T2 can write T2P1 into memory bank 2; thread T3 can write T3P1 into memory bank 3; thread T4 can write T4P1 into memory bank 4; thread T5 can write T5P1 into memory bank 5; thread T6 can write T6P1 into memory bank 6; thread T7 can write T7P1 into memory bank 7; thread T8 can write T8P1 into memory bank 8; thread T17 can write T17P1 into memory bank 9; thread T18 can write T18P1 into memory bank 10; thread T19 can write T19P1 into memory bank 11; thread T20 can write T20P1 into memory bank 12; thread T21 can write T21P1 into memory bank 13; thread T22 can write T22P1 into memory bank 14; thread T23 can write T23P1 into memory bank 15; and thread T24 can write T24P1 into memory bank 16.

This fourth approach is efficient, as groups of 16 threads of the 128 threads are able to write to the 16 memory banks in memory 106 in each writing step (i.e. such that all 128 of the P1 values are written over 8 writing steps). This efficient writing process can then be repeated seven further times in order for each of the plurality of threads to write each of its other seven processed values (i.e. each of P2 to P8).

Returning to FIG. 13, in step S1308, for each of the plurality of sub-arrays, each of the plurality of threads read a respective second plurality of processed values from the memory 106 over a plurality of reading steps, said second plurality of processed values corresponding to a perpendicular one-dimensional sequence of values of a sub-array of values in a transposed position within the array of values relative to said sub-array of values. This can be understood with reference to FIGS. 4, 8, 14 and Table 1.

As shown in FIG. 14, were the array of values 1400 to be transposed, it would effectively be reflected about diagonal line 1402. The sub-arrays intersected by diagonal line 1402 (i.e. sub-arrays 1, 6, 11 and 16 shown in FIG. 14) would not change position during that transpose (although their rows and columns of values would be transposed). So, for example, for sub-array 1, the sub-array in a transposed position within the array 1400 is sub-array 1. For the sub-arrays not intersected by diagonal line 1402, their position would change during a transpose of array 1400. So, for example, for sub-array 2, the sub-array in a transposed position within the array 1400 is sub-array 5. Table 1 defines the sub-array in a transposed position relative to each of the sub-arrays within array 1400.

TABLE 1

| Sub-array of values | Sub-array of values in the transposed position |
|---|---|
| 1 | 1 |
| 2 | 5 |
| 3 | 9 |
| 4 | 13 |
| 5 | 2 |
| 6 | 6 |
| 7 | 10 |
| 8 | 14 |
| 9 | 3 |
| 10 | 7 |
| 11 | 11 |
| 12 | 15 |
| 13 | 4 |
| 14 | 8 |
| 15 | 12 |
| 16 | 16 |

So, in an example, in step S1306, with reference to FIGS. 4 and 14, thread T1 writes eight processed values (e.g. T1P1, T1 P2, T1 P3, T1 P4, T1 P5, T1 P6, T1 P7 and T1 P8) corresponding to the eight values within a one-dimensional sequence of values (e.g. a row) of sub-array 1 for which it performed the initial phase of the separable operation. In step S1308, with reference to FIGS. 4, 8 and 14, thread T1 reads eight processed values (e.g. T1P1, T2P1, T3P1, T4P1, T5P1, T6P1, T7P1 and T8P1) corresponding to the eight values within a perpendicular one-dimensional sequence of values (e.g. a column) of sub-array 1 (the sub-array in a transposed position within the array relative to sub-array 1) for which it will perform the subsequent phase of the separable operation.

In another example, in step S1306, with reference to FIGS. 4 and 14, thread T9 writes eight processed values (e.g. T9P1, T9P2, T9P3, T9P4, T9P5, T9P6, T9P7 and T9P8) corresponding to the eight values within a one-dimensional sequence of values (e.g. a row) of sub-array 2 for which it performed the initial phase of the separable operation. In step S1308, with reference to FIGS. 4, 8 and 14, thread T9 reads eight processed values (e.g. T33P1, T34P1, T35P1, T36P1, T37P1, T38P1, T39P1 and T40P1) corresponding to the eight values within a perpendicular one-dimensional sequence of values (e.g. a column) of sub-array 5 (the sub-array in a transposed position within the array relative to sub-array 2) for which it will perform the subsequent phase of the separable operation.

For conciseness, the processed values written by each of the other threads shown in FIG. 4 for each of the sub-arrays shown in FIG. 14 after performing the initial phase of the separable operation, and the processed values read by each of the other threads shown in FIG. 8 prior to performing the subsequent phase of the separable operation will not be exhaustively listed here. By referring to FIGS. 4 and 14, the skilled person would have no difficulty determining which processed values are written for each of the sub-arrays by each of the other threads. The skilled person would have no difficulty determining which processed values are read by each of the other threads shown in FIG. 8 by comparing FIGS. 4 and 8 as described herein.

The memory bank from which a thread is to read a processed value can be determined in dependence on a read buffer array. The read buffer array used in step S1308 may have the same properties as the write buffer array used in step S1306—as described herein. For example, the read buffer array may be a one-dimensional array. The read buffer array may have a number of elements greater than the number of elements in the two-dimensional array of values. The read buffer array may comprise groups of contiguous value elements corresponding to values of the two-dimensional array, and padding elements interspersed between said groups. The relative number of value and padding elements in the read buffer array used in step S1308 may correspond to the relative number of value and padding elements in the write buffer array used in step S1306.

The contents of memory can be mapped to the structure of the read buffer array such that processed values corresponding to values of the two-dimensional array are read from the memory from memory locations that are mapped onto the value elements of the read buffer array, and values are not read from the memory from memory locations that are mapped onto the padding elements of the read buffer array. For example, the contents of the memory 106 of FIG. 11 can be mapped to the structure of the read buffer array by mapping the first row of 16 memory locations of the memory 106 to the first 16 elements (e.g. the $1^{st}$ to $16^{th}$ values) in the read buffer array, mapping the second row of 16 memory locations of the memory 106 to the second 16 elements (e.g. the $17^{th}$ to $32^{nd}$ values) in the read buffer array, and so on. It is to be understood that the memory 106 need not be mapped to the read buffer array starting from the first ("top-left") memory location of the memory 106. Rather, the memory 106 can be mapped to the read buffer array starting from the first memory location to which a processed value was written in step S1306.

As described herein, each value in the array of values may be assigned a coordinate [i][j][k][m]—which defines its position within the multidimensional array [I][J][K][M] as defined herein. In general, a thread that, in step S1306, wrote a processed value having the coordinate [i][j][k][m] within the multidimensional array [I][J][K][M] to memory can, in step S1308, read in the processed value having the transposed coordinate (e.g. [j][i][m][k]) within the multidimensional array [I][J][K][M] from memory. For example, as described herein, in step S1306 thread T1 writes processed values: T1P1 having coordinate [0][0][0][0]; T1P2 having coordinate [0][0][0][1]; T1P3 having coordinate [0][0][0][2]; T1P4 having coordinate [0][0][0][3]; T1P5 having coordinate [0][0][0][4]; T1P6 having coordinate [0][0][0][5]; T1P7 having coordinate [0][0][0][6]; and T1P8 having coordinate [0][0][0][7]. As described herein, in step S1308, thread T1 reads processed values: T1P1 having coordinate [0][0][0][0]; T2P1 having coordinate [0][0][1][0]; T3P1 having coordinate [0][0][2][0]; T4P1 having coordinate [0][0][3][0]; T5P1 having coordinate [0][0][4][0]; T6P1 having coordinate [0][0][5][0]; T7P1 having coordinate [0][0][6][0]; and T8P1 having coordinate [0][0][7][0].

The memory location from which a thread reads a processed value in step S1308 can be determined in dependence on a base memory address, a reading offset amount and a reading padding amount. The reading offset amount and the reading padding amount may be dependent on the position (e.g. coordinate) of the value within the array of values to which the processed value that is to be read corresponds. The memory location from which a thread is to read a processed value may be determined in dependence on a sum of the base memory address, the reading offset amount and the reading padding amount. Said sum may be used to determine the element of the read buffer array to which the processed value to be read corresponds. Non-limiting examples of suitable reading offset amounts are provided below. The reading padding amount can be equal to the reading offset amount divided by a padding frequency. Said division may be an integer division. The padding frequency used in step S1308 may be equal to the padding frequency used in step S1306— as described herein.

It is to be understood that the read buffer array may exist in a physical memory (e.g. may be implemented in registers in register bank 110) such that the threads cause processed values from the memory to be physically read into that read buffer array, before the contents of that read buffer array are transferred into the respective one or more registers accessible by each thread. Alternatively, the read buffer array may be a construct that is conceptually used by the threads to determine which memory locations in memory those threads are to read values from, where the processed values are physically read directly from the determined memory locations into the respective one or more registers accessible by each thread.

In step S1308, by applying the principles described herein, a respective processed value is read from each of the memory banks of the memory (e.g. memory 106 of FIG. 11) in at least one of the plurality of reading steps. In particular, by applying the principles described herein, a respective processed value may be read from each of the memory banks of the memory (e.g. memory 106 of FIG. 11) in each of the plurality of reading steps. That is, excessive bank conflicts can be avoided during reading in step S1308. This can be understood by returning to the four specific examples described above with reference to FIGS. 15A to 15D.

Example 1

The relative number of value and padding elements in the read buffer array used in Example 1 in step S1308 may correspond to the relative number of value and padding elements in the write buffer array used in Example 1 in step S1306, as described herein. In Example 1, the contents of the memory 106 shown in FIG. 15A can be mapped to the read buffer array. The memory location from which a thread reads a processed value in step S1308 can be determined in dependence on a sum of a base memory address, a writing offset amount and a writing padding amount. Said sum may be used to determine the element of the read buffer array from which the processed value to be read corresponds— where the base memory address is the first element within that read buffer array. As described herein, in general, a thread that, in step S1306, wrote a processed value having the coordinate [i][j][k][m] to memory can, in step S1308, read in the processed value having the transposed coordinate (e.g. [j][i][m][k]) from memory. Thus, in Example 1, the reading offset amount used by a thread that, in step S1306, wrote a processed value having the coordinate [i][j][k][m], is equal to (j×J×K×M)+(i×K×M)+(m×M)+k, and the reading padding amount is equal to the reading offset amount divided by 8 (the padding frequency). Said division may be an integer division.

In Example 1, a respective processed value can be read from each of the memory banks of the memory (e.g. memory 106 of FIG. 11) in at least one of the plurality of reading steps. For example, referring to FIG. 15A, in one reading step: thread T1 can read T1P1 from memory bank 1; thread T2 can read T1P2 from memory bank 2; thread T3 can read T1P3 from memory bank 3; thread T4 can read T1P4 from memory bank 4; thread T5 can read T1P5 from memory bank 5; thread T6 can read T1P6 from memory bank 6; thread T7 can read T1P7 from memory bank 7; thread T8 can read T1P8 from memory bank 8; thread T33 can read T9P1 from memory bank 9; thread T34 can read T9P2 from memory bank 10; thread T35 can read T9P3 from memory bank 11; thread T36 can read T9P4 from memory bank 12; thread T37 can read T9P5 from memory bank 13; thread T38 can read T9P6 from memory bank 14; thread T39 can read T9P7 from memory bank 15; and thread T40 can read T9P8 from memory bank 16. This first approach is efficient, as groups of 16 threads of the 128 threads are able to read from the 16 memory banks in memory 106 in each reading step (i.e. such that all 128 of the threads can read in one respective processed value over 8 reading steps). This efficient reading process can then be repeated seven further times in order for each of the plurality of threads to read each of the other respective seven processed values assigned to it.

Example 2

The relative number of value and padding elements in the read buffer array used in Example 2 in step S1308 may correspond to the relative number of value and padding elements in the write buffer array used in Example 2 in step S1306, as described herein. In Example 2, the contents of the memory 106 shown in FIG. 15B can be mapped to the read buffer array. The memory location from which a thread reads a processed value in step S1308 can be determined in dependence on a sum of a base memory address, a writing offset amount and a writing padding amount. Said sum may be used to determine the element of the read buffer array from which the processed value to be read corresponds— where the base memory address is the first element within that read buffer array. As described herein, in general, a thread that, in step S1306, wrote a processed value having the coordinate [i][j][k][m] to memory can, in step S1308, read in the processed value having the transposed coordinate (e.g. [j][i][m][k]) from memory. Thus, in Example 2, the reading offset amount used by a thread that, in step S1306, wrote a processed value having the coordinate [i][j][k][m], is equal to $(j{\times}J{\times}K{\times}M)+(i{\times}K{\times}M)+(m{\times}M)+k$, and the reading padding amount is equal to the reading offset amount divided by 16 (the padding frequency). Said division may be an integer division.

In Example 2, a respective processed value can be read from each of the memory banks of the memory (e.g. memory 106 of FIG. 11) in at least one of the plurality of reading steps. For example, referring to FIG. 15B, in one reading step: thread T1 can read T1P1 from memory bank 1; thread T2 can read T1 P2 from memory bank 2; thread T3 can read T1 P3 from memory bank 3; thread T4 can read T1P4 from memory bank 4; thread T5 can read T1P5 from memory bank 5; thread T6 can read T1P6 from memory bank 6; thread T7 can read T1P7 from memory bank 7; thread T8 can read T1P8 from memory bank 8; thread T65 can read T17P1 from memory bank 9; thread T66 can read T17P2 from memory bank 10; thread T67 can read T17P3 from memory bank 11; thread T68 can read T17P4 from memory bank 12; thread T69 can read T17P5 from memory bank 13; thread T70 can read T17P6 from memory bank 14; thread T71 can read T17P7 from memory bank 15; and thread T72 can read T17P8 from memory bank 16.

This second approach is efficient, as groups of 16 threads of the 128 threads are able to read from the 16 memory banks in memory 106 in each reading step (i.e. such that all 128 of the threads can read in one respective processed value over 8 reading steps). This efficient reading process can then be repeated seven further times in order for each of the plurality of threads to read each of the respective other seven processed values assigned to it.

Example 3

The relative number of value and padding elements in the read buffer array used in Example 3 in step S1308 may correspond to the relative number of value and padding elements in the write buffer array used in Example 3 in step S1306, as described herein. In Example 3, the contents of the memory 106 shown in FIG. 15C can be mapped to the read buffer array. The memory location from which a thread reads a processed value in step S1308 can be determined in dependence on a sum of a base memory address, a writing offset amount and a writing padding amount. Said sum may be used to determine the element of the read buffer array from which the processed value to be read corresponds— where the base memory address is the first element within that read buffer array. As described herein, in general, a thread that, in step S1306, wrote a processed value having the coordinate [i][j][k][m] to memory can, in step S1308, read in the processed value having the transposed coordinate (e.g. [j][i][m][k]) from memory. Thus, in Example 3, the reading offset amount used by a thread that, in step S1306, wrote a processed value having the coordinate [i][j][k][m], is equal to $(j{\times}J{\times}K{\times}M)+(i{\times}K{\times}M)+(m{\times}M)+k$, and the reading padding amount is equal to the reading offset amount divided by 32 (the padding frequency). Said division may be an integer division.

In Example 3, a respective processed value can be read from each of the memory banks of the memory (e.g. memory 106 of FIG. 11) in at least one of the plurality of reading steps. For example, referring to FIG. 15C, in one reading step: thread T1 can read T1P1 from memory bank 1; thread T2 can read T1 P2 from memory bank 2; thread T3 can read T1 P3 from memory bank 3; thread T4 can read T1P4 from memory bank 4; thread T5 can read T1P5 from memory bank 5; thread T6 can read T1P6 from memory bank 6; thread T7 can read T1P7 from memory bank 7; thread T8 can read T1P8 from memory bank 8; thread T9 can read T33P1 from memory bank 9; thread T10 can read T33P2 from memory bank 10; thread T11 can read T33P3 from memory bank 11; thread T12 can read T33P4 from memory bank 12; thread T13 can read T33P5 from memory bank 13; thread T14 can read T33P6 from memory bank 14; thread T15 can read T33P7 from memory bank 15; and thread T16 can read T33P8 from memory bank 16.

This third approach is efficient, as groups of 16 threads of the 128 threads are able to read from the 16 memory banks in memory 106 in each reading step (i.e. such that all 128 of the threads can read in one respective processed value over 8 reading steps). This efficient reading process can then be repeated seven further times in order for each of the plurality of threads to read each of the respective other seven processed values assigned to it.

Example 4

The relative number of value and padding elements in the read buffer array used in Example 4 in step S1308 may correspond to the relative number of value and padding elements in the write buffer array used in Example 4 in step S1306, as described herein. In Example 4, the contents of the memory 106 shown in FIG. 15D can be mapped to the read buffer array. The memory location from which a thread reads a processed value in step S1308 can be determined in dependence on a sum of a base memory address, a writing offset amount and a writing padding amount. Said sum may be used to determine the element of the read buffer array from which the processed value to be read corresponds— where the base memory address is the first element within that read buffer array. As described herein, in general, a thread that, in step S1306, wrote a processed value having the coordinate [i][j][k][m] to memory can, in step S1308, read in the processed value having the transposed coordinate (e.g. [j][i][m][k]) from memory. Thus, in Example 4, the reading offset amount used by a thread that, in step S1306, wrote a processed value having the coordinate [i][j][k][m], is equal to $(j{\times}J{\times}K{\times}M)+(i{\times}K{\times}M)+(k{\times}K)+m$, and the reading padding amount is equal to the reading offset amount divided by 16 (the padding frequency). Said division may be an integer division.

In Example 4, a respective processed value can be read from each of the memory banks of the memory (e.g. memory 106 of FIG. 11) in at least one of the plurality of reading steps. For example, referring to FIG. 15D, in one reading step: thread T1 can read T1P1 from memory bank 1; thread T2 can read T1 P2 from memory bank 9; thread T3 can read T1 P3 from memory bank 2; thread T4 can read T1P4 from memory bank 10; thread T5 can read T1P5 from memory bank 3; thread T6 can read T1 P6 from memory bank 11; thread T7 can read T1 P7 from memory bank 4; thread T8 can read T1P8 from memory bank 12; thread T33 can read T9P1 from memory bank 5; thread T34 can read T9P2 from memory bank 13; thread T35 can read T9P3 from memory bank 6; thread T36 can read T9P4 from memory bank 14; thread T37 can read T9P5 from memory bank 7; thread T38 can read T9P6 from memory bank 15; thread T39 can read T9P7 from memory bank 8; and thread T40 can read T9P8 from memory bank 16.

This fourth approach is efficient, as groups of 16 threads of the 128 threads are able to read from the 16 memory banks in memory 106 in each reading step (i.e. such that all 128 of the threads can read in one respective processed value over 8 reading steps). This efficient reading process can then be repeated seven further times in order for each of the plurality of threads to read each of the respective other seven processed values assigned to it.

Returning to FIG. 13, in step S1310, for each of the plurality of sub-arrays, using the plurality of threads, a subsequent phase of the separable operation is performed for the plurality of processed values read by the plurality of threads in order to generate a respective output value for each value of the sub-array of values in the transposed position. Step S1310 can be performed by performing steps S1004 to S1010 as described herein with reference to FIG. 10. For example: a subsequent phase of the separable operation can be performed for sub-array 1 as shown in FIG. 14 by using threads T1 to T8 as shown in FIG. 8; a subsequent phase of the separable operation can be performed for sub-array 2 as shown in FIG. 14 by using threads T33 to T40 as shown in FIG. 8; a subsequent phase of the separable operation can be performed for sub-array 3 as shown in FIG. 14 by using threads T65 to T72 as shown in FIG. 8; a subsequent phase of the separable operation can be performed for sub-array 4 as shown in FIG. 14 by using threads T97 to T104 as shown in FIG. 8; and so on through to a subsequent phase of the separable operation can be performed for sub-array 16 as shown in FIG. 14 by using threads T121 to T128 as shown in FIG. 8.

After performing the subsequent phase of the operation, each of the plurality of threads (e.g. each thread shown in FIG. 8) can write the section of output values that it has generated to memory (e.g. global memory 108), such that an output value is written to memory (e.g. global memory 108) corresponding to each value of the array of values on which the operation is to be performed. Said writes can also be performed using the principles described herein, e.g. so as to minimise the number of bank conflicts caused when writing the output values to global memory 108.

The output values written to memory (e.g. global memory 108) corresponding to each value of the array of values can be the output of the method of FIG. 13.

In the illustrative example described above with reference to FIGS. 4, 8, 13 and 14, the initial phase of the separable operation in step S1304 is performed "horizontally", and the subsequent phase of the separable operation in step S1310 is performed "vertically". It is to be understood that, alternatively, the initial phase of the separable operation in step S1304 could be performed "vertically", and the subsequent phase of the separable operation in step S1310 could be performed "horizontally". In other words, in the illustrative example described above with reference to FIGS. 4, 8, 13 and 14, in step S1306 the one dimensional sequence of values of each sub-array of values is a row of values of that sub-array of values and in step S1308 the perpendicular one dimensional sequence of values of each sub-array of values in the transposed position is a column of values of that sub-array of values in the transposed position. It is to be understood that, alternatively, is step S1306 the one dimensional sequence of values of each sub-array of values could be a column of values of said sub-array of values and in step S1308 the perpendicular one dimensional sequence of values of each sub-array of values in the transposed position could be a row of values of that sub-array of values in the transposed position.

In the illustrative example of the method described herein with reference to FIG. 13, in each phase of the separable operation (e.g. in steps S1304 and S1310), each one-dimensional sequence of values of the two-dimensional array can be divided into a plurality of sections of values that are assigned to each of a respective plurality of threads. For example, referring to FIG. 5, the first row of values 500 of the array of values 400 can be divided into four sections that can be assigned to threads T1, T9, T17 and T25 in the initial phase of the operation, and, referring to FIG. 9, the processed values corresponding to the first column of values 900 of the array of values 800 can be divided into four sections that can be assigned to threads T1, T9, T17 and T25 in the subsequent phase of the operation. In this illustrative example, during each phase of the operation, adjacent threads can cooperate so as to complete each phase of the one-dimensional operation—as described herein with reference to steps S1004 to S1010 of FIG. 10. It is to be understood that this need not be the case in the method described herein with reference to FIG. 13. That is, in an alternative example, in each phase of the separable operation (e.g. in steps S1304 and S1310), an entire one-dimensional sequence of values of the two-dimensional array can be assigned to each of a plurality of threads. For example, referring to FIG. 5, the entire first row of values 500 of the array of values 400 could be assigned to a single thread in the initial phase of the operation (i.e. in step S1304), and, referring to FIG. 9, the processed values corresponding to the entire first column of values 900 of the array of values 800 could be assigned to that single thread in the subsequent phase of the operation (i.e. in step S1304). In this alternative example, that thread need not cooperate with another thread in order to complete each phase of the operation—as it will have access within its registers to all of the values of the one-dimensional sequence of values to be operated on in each phase of the operation and so can independently complete each phase of the operation (e.g. a one-dimensional Gaussian operation described herein with reference to FIG. 2).

Figure 16:
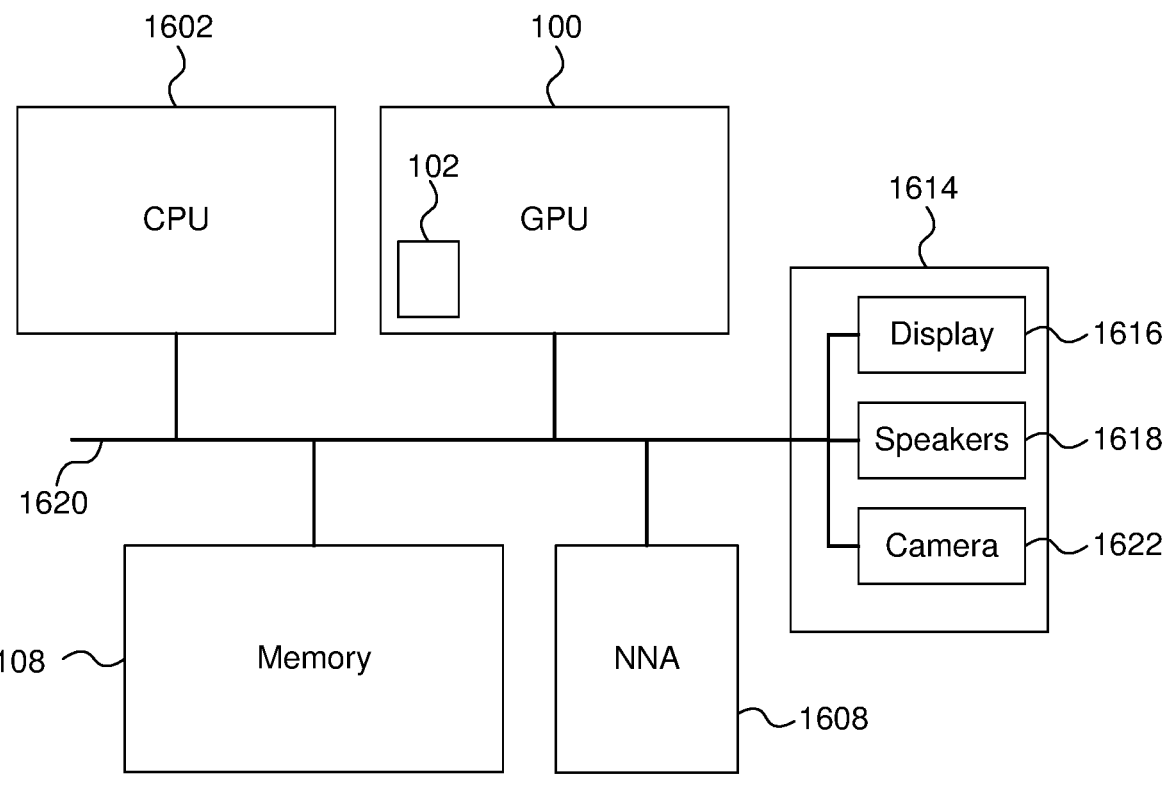
FIG. 16 shows a computer system in which a processing unit is implemented.

FIG. 16 shows a computer system in which the processing unit described herein may be implemented. The computer system comprises a central processing unit (CPU) 1602, a graphics processing unit (GPU) 100, a memory 108, a neural network accelerator (NNA) 1608 and other devices 1614, such as a display 1616, speakers 1618 and a camera 1622. The array of values (e.g. the images and/or audio signals) input to the method described herein may be generated by one or more of said other devices 1614—e.g. the camera 1622 and/or a microphone (not shown in FIG. 14). The output of the method described herein (e.g. the filtered images and/or filtered audio signals) may be provided to one or more of said other devices 1614—e.g. the display 1616 and/or the speakers 1618. One or more processing elements 102 are implemented on the GPU 100. In other examples, one or more of the depicted components may be omitted from the computer system. The components of the computer system can communicate with each other via a communications bus 1620.

The graphics processing unit of FIGS. 1A and 1B, and the computer system of FIG. 16, are shown as comprising a number of functional blocks. This is schematic only and is not intended to define a strict division between different logic elements of such entities. Each functional block may be provided in any suitable manner. It is to be understood that intermediate values described herein as being formed by a processing unit need not be physically generated by the processing unit at any point and may merely represent logical values which conveniently describe the processing performed by the processing unit between its input and output.

The processing unit described herein may be embodied in hardware on an integrated circuit. The processing unit described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a processing unit configured to perform any of the methods described herein, or to manufacture a processing unit comprising any apparatus described herein. An integrated circuit definition dataset may be, for example, an integrated circuit description.

Therefore, there may be provided a method of manufacturing, at an integrated circuit manufacturing system, a processing unit as described herein. Furthermore, there may be provided an integrated circuit definition dataset that, when processed in an integrated circuit manufacturing system, causes the method of manufacturing a processing unit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a processing unit will now be described with respect to FIG. 17.

Figure 17:
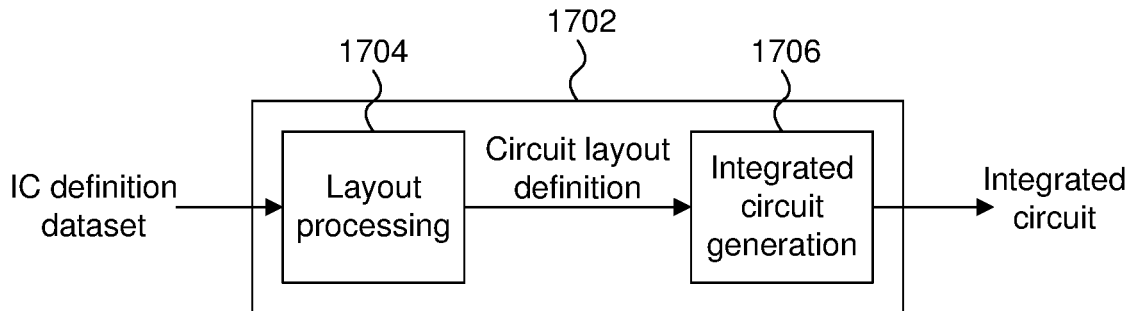
FIG. 17 shows an integrated circuit manufacturing system for generating an integrated circuit embodying a processing unit.

FIG. 17 shows an example of an integrated circuit (IC) manufacturing system 1702 which is configured to manufacture a processing unit as described in any of the examples herein. In particular, the IC manufacturing system 1702 comprises a layout processing system 1704 and an integrated circuit generation system 1706. The IC manufacturing system 1702 is configured to receive an IC definition dataset (e.g. defining a processing unit as described in any of the examples herein), process the IC definition dataset, and generate an IC according to the IC definition dataset (e.g. which embodies a processing unit as described in any of the examples herein). The processing of the IC definition dataset configures the IC manufacturing system 1702 to manufacture an integrated circuit embodying a processing unit as described in any of the examples herein.

The layout processing system 1704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1704 has determined the circuit layout it may output a circuit layout definition to the IC generation system 1706. A circuit layout definition may be, for example, a circuit layout description.

The IC generation system 1706 generates an IC according to the circuit layout definition, as is known in the art. For example, the IC generation system 1706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1706 may be in the form of computer-readable code which the IC generation system 1706 can use to form a suitable mask for use in generating an IC.

The different processes performed by the IC manufacturing system 1702 may be implemented all in one location, e.g. by one party. Alternatively, the IC manufacturing system 1702 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a processing unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 17 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 17, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of performing an operation on an array of values at a processing unit, the method comprising, so as to perform a phase of the operation:

for each of one or more one-dimensional sequences of values of the array of values:

assigning a respective section of values of the one-dimensional sequence of values to each of a plurality of threads;

a first thread of the plurality of threads determining at least one contribution, from the section of values assigned to the first thread, to the phase of the operation that is to be completed by a second thread of the plurality of threads for a neighbouring section of values of the one-dimensional sequence of values, and writing the at least one contribution to a memory; and a second thread of the plurality of threads reading the at least one contribution from the memory, and completing the phase of the operation for the neighbouring section of values assigned to the second thread in dependence on the at least one contribution read from the memory in order to generate a section of processed values.

2. The method of claim 1, further comprising the first thread of the plurality of threads performing at least one part of the phase of the operation on at least one set of one or more values of the section of values assigned to the first thread in order to determine the at least one contribution, from said at least one set of one or more values, to the phase of the operation that is to be completed by the second thread of the plurality of threads for the neighbouring section of values of the one-dimensional sequence of values.

3. The method of claim 2, further comprising:

the second thread of the plurality of threads performing at least one part of the phase of the operation on at least one set of one or more values of the neighbouring section of values assigned to the second thread in order to determine at least one contribution, from said at least one set of one or more values of the neighbouring section of values, to the phase of the operation that is to be completed by the first thread for the section of values assigned to the first thread, and writing the at least one contribution determined by the second thread to the memory; and

57 the first thread of the plurality of threads reading the at
    least one contribution determined by the second thread
    from the memory, and
        completing the phase of the operation for the section of
            values assigned to the first thread in dependence on
            the at least one contribution determined by the
            second thread read from the memory in order to
            generate a section of processed values.

4. The method of claim 2, wherein completing the phase
of the operation for the neighbouring section of values
comprises:
    the second thread performing at least one part of the phase
        of the operation on at least one set of one or more
        values of the neighbouring section of values assigned to
        the second thread in order to determine at least one
        contribution from each of said one or more values of
        the neighbouring section of values to the phase of the
        operation; and
    combining said at least one contribution determined by
        the second thread for the neighbouring section of
        values with the at least one contribution read from the
        memory by the second thread.

5. The method of claim 1, further comprising the first
thread of the plurality of threads determining one or more
values of the section of values assigned to the first thread as
the at least one contribution, from the section of values
assigned to the first thread, to the phase of the operation that
is to be completed by the second thread of the plurality of
threads for the neighbouring section of values of the one-
dimensional sequence of values.

6. The method of claim 1, wherein the plurality of threads
are processed by processing logic comprised by a core of the
processing unit, the processing logic being implemented on
a chip and the memory being physically located on the same
chip as the processing logic.

7. The method of claim 6, further comprising each of the
plurality of threads reading the values of the section of
values assigned to that thread from a further memory that is
not physically located on the same chip as the core.

8. The method of claim 1, wherein the array of values is
an array of pixel values, an array of audio samples of an
audio signal, or an array of signal samples of a transmitted
signal.

9. The method of claim 1, wherein the array of values is
a two-dimensional array of pixel values, and the operation is
a separable filter operation.

10. The method of claim 9, wherein, during the phase of
the separable filter operation, values of the one-dimensional
sequence of values are filtered in dependence on a one-
dimensional filter kernel including the value to be filtered
and one or more values of the sequence of values positioned
on one or both sides of that value.

11. The method of claim 9, wherein the separable filter
operation is a separable Gaussian filter operation or a
separable box filter operation.

12. The method of claim 10, wherein the radius of the
filter kernel is less than or equal to half of the number of
values in each section of values.

13. The method of claim 1, wherein:
    the one-dimensional sequence of values of the array of
        values is a row of values of the array of values; or
    the one-dimensional sequence of values of the array of
        values is a column of values of the array of values.

14. The method of claim 1, further comprising writing the
sections of processed values generated by the plurality of threads to the memory such that a processed value is written
to memory corresponding to each value of the array of
values.

15. The method of claim 14, wherein said phase of the
operation is an initial phase of the operation, the array of
values is a two-dimensional array of values, the operation is
a separable operation, and the method further comprises, so
as to perform a subsequent phase of the operation:
    for each of one or more perpendicular one-dimensional
        sequences of values of the two-dimensional array of
        values:
        assigning, to each of the plurality of threads, a respec-
            tive plurality of processed values from the memory,
            said plurality of processed values corresponding to a
            one-dimensional section of values of the perpendicu-
            lar one-dimensional sequence of values of the two-
            dimensional array of values; and
        a first thread of the plurality of threads determining at
            least one contribution, from the plurality of pro-
            cessed values assigned to the first thread, to the
            subsequent phase of the operation that is to be
            completed by a second thread of the plurality of
            threads for a plurality of processed values that cor-
            respond with a one-dimensional section of values of
            the perpendicular one-dimensional sequence of val-
            ues of the two-dimensional array of values that
            neighbour the one-dimensional section of values of
            the perpendicular one-dimensional sequence of val-
            ues that correspond to the plurality of processed
            values assigned to the first thread, and
            writing the at least one contribution determined by
                the first thread to the memory; and
        the second thread of the plurality of threads reading the
            at least one contribution determined by the first
            thread from the memory, and
            completing the subsequent phase of the separable
                operation for the plurality of processed values
                assigned to the second thread in dependence on
                the at least one contribution determined by the first
                thread in order to generate a section of output
                values.

16. The method of claim 15, further comprising:
the first thread of the plurality of threads performing at
    least one part of the subsequent phase of the separable
    operation on at least one set of one or more values of
    the plurality of processed values assigned to the first
    thread in order to determine at least one contribution,
    from said at least one set of one or more values, to the
    subsequent phase of the operation that is to be com-
    pleted by the second thread of the plurality of threads
    for the plurality of processed values that correspond
    with the one-dimensional section of values of the
    perpendicular one-dimensional sequence of values of
    the two-dimensional array of values that neighbour the
    one-dimensional section of values of the perpendicular
    one-dimensional sequence of values that correspond to
    the plurality of processed values assigned to the first
    thread; or
the first thread of the plurality of threads determining one
    or more values of the plurality of processed values
    assigned to the first thread as the at least one contri-
    bution, from the plurality of processed values assigned
    to the first thread, to the subsequent phase of the
    operation that is to be completed by the second thread
    of the plurality of threads for the plurality of processed
    values that correspond with the one-dimensional sec-
    tion of values of the perpendicular one-dimensional sequence of values of the two-dimensional array of values that neighbour the one-dimensional section of values of the perpendicular one-dimensional sequence of values that correspond to the plurality of processed values assigned to the first thread.

17. The method of claim 15, wherein:

the one-dimensional sequence of values of the two-dimensional array of values is a row of values of the two-dimensional array of values and the perpendicular one-dimensional sequence of values of the two-dimensional array of values is a column of values of the two-dimensional array of values; or the one-dimensional sequence of values of the two-dimensional array of values is a column of values of the two-dimensional array of values and the perpendicular one-dimensional sequence of values of the two-dimensional array of values is a row of values of the two-dimensional array of values.

18. The method of claim 1, further comprising:

receiving a two-dimensional image;

dividing the two-dimensional image into a plurality of overlapping tiles, each tile comprising a two-dimensional array of pixel values; and performing said method on the two-dimensional array of pixel values of each tile.

19. A processing unit for performing an operation on an array of values, the processing unit comprising processing logic and a memory, the processing logic being configured, so as to perform a phase of the operation, to:

for each of one or more one-dimensional sequences of values of the array of values:

assign a respective section of values of the one-dimensional sequence of values to each of a plurality of threads; and by a first thread of the plurality of threads:

determine at least one contribution, from the section of values assigned to the first thread, to the phase of the operation that is to be completed by a second thread of the plurality of threads for a neighbouring section of values of the one-dimensional sequence of values; and write the at least one contribution to the memory; and by the second thread of the plurality of threads:

read the at least one contribution from the memory; and complete the phase of the operation for the neighbouring section of values assigned to the second thread in dependence on the at least one contribution read from the memory in order to generate a section of processed values.

20. A non-transitory computer readable storage medium having stored thereon computer readable instructions that, when executed at a computer system, cause the computer system to perform a computer-implemented method of performing an operation on an array of values at a processing unit, including, so as to perform a phase of the operation:

for each of one or more one-dimensional sequences of values of the array of values:

assigning a respective section of values of the one-dimensional sequence of values to each of a plurality of threads; and a first thread of the plurality of threads:

determining at least one contribution, from the section of values assigned to the first thread, to the phase of the operation that is to be completed by a second thread of the plurality of threads for a neighbouring section of values of the one-dimensional sequence of values; and writing the at least one contribution to a memory; and the second thread of the plurality of threads:

reading the at least one contribution from the memory; and completing the phase of the operation for the neighbouring section of values assigned to the second thread in dependence on the at least one contribution read from the memory in order to generate a section of processed values.

\* \* \* \* \*